US012640981B2

(12) United States Patent
Hu et al.

(10) Patent No.: US 12,640,981 B2
(45) Date of Patent: May 26, 2026

(54) METHOD FOR DETERMINING EDGE CONFIGURATION SERVER AND APPARATUS

(71) Applicant: HUAWEI TECHNOLOGIES CO., LTD., Guangdong (CN)

(72) Inventors: Yajie Hu, Beijing (CN); Cuili Ge, Beijing (CN); Zehao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 18/475,230

(22) Filed: Sep. 27, 2023

(65) Prior Publication Data

US 2024/0022469 A1     Jan. 18, 2024

Related U.S. Application Data

(63) Continuation of application No. PCT/CN2021/084796, filed on Mar. 31, 2021.

(51) Int. Cl.
*H04L 41/0803*          (2022.01)
*H04W 24/02*           (2009.01)

(52) U.S. Cl.
CPC ......... *H04L 41/0803* (2013.01); *H04W 24/02* (2013.01)

(58) Field of Classification Search
CPC ..... H04W 12/06; H04W 24/02; H04W 48/16; H04W 84/02; H04W 84/042; H04W 4/50; H04L 41/0803; H04L 41/5051; H04L 41/122
See application file for complete search history.

(56) References Cited

PUBLICATIONS

3GPP TR 23.748 V17.0.0 (Dec. 2020) (Year: 2020).*
Kim, 3GPP TSG-SA WG6 Meeting #40-e e-meeting, Nov. 16-24, 2020 (Year: 2020).*
Lee, 3GPP TSG-SA WG6 Meeting #34 Reno, Nevada, US Nov. 11-15, 2019 (Year: 2019).*
D. Belli, S. Chessa, L. Foschini and M. Girolami, "Enhancing Mobile Edge Computing Architecture with Human-Driven Edge Computing Model," 2018 14th International Conference on Intelligent Environments (IE), Rome, Italy, 2018, pp. 95-98. (Year: 2018).*
W. Qing, H. Zheng, W. Ming and L. Haifeng, "CACTSE: Cloudlet aided cooperative terminals service environment for mobile proximity content delivery," in China Communications, vol. 10, No. 6, pp. 47-59, Jun. 2013. (Year: 2013).*

(Continued)

*Primary Examiner* — Messeret F Gebre

(57)                ABSTRACT

Embodiments of this application relate to the field of communication technologies, and provide a method for determining an edge configuration server and an apparatus, to select a more proper edge configuration server for a terminal apparatus. The method includes: A core network element determines, based on a mobile network accessed by a terminal apparatus, that an edge configuration server serving the terminal apparatus is a first edge configuration server, where at least one mobile network corresponding to the first edge configuration server includes the mobile network accessed by the terminal apparatus. The core network element sends, to the terminal apparatus, information indicating the first edge configuration server.

15 Claims, 29 Drawing Sheets

(56)     References Cited

PUBLICATIONS

M. Sun and Z. Zhou, "IoT Services Configuration in Edge-Cloud Collaboration Networks," 2020 IEEE International Conference on Web Services (ICWS), Beijing, China, 2020, pp. 468-472. (Year: 2020).*

D. Cocconi and P. Villarreal, "Microservices-based Approach for a Collaborative Business Process Management Cloud Platform," 2020 XLVI Latin American Computing Conference (CLEI), Loja, Ecuador, 2020, pp. 128-137 (Year: 2020).*

3rd Generation Partnership Project; Technical Specification Group Services and System Aspects; Study on enhancement of support for Edge Computing in 5G Core network (5GC) (Release 17). 3GPP TR 23.748v1.2.0 (Nov. 2020). total 250 pages.

Samsung: "Solution 2 update and conclusion for Key Issue #1 and #7." 3GPP TSG-SA WG6 Meeting #34 Reno Nevada, US Nov. 11-15, 2019. S6-192113, total 5 pages.

Samsung: "ECS discovery." 3GPP TSG-SA WG6 Meeting #37e E-meeting, May 14-26, 2020. S6-200895, total 1 page.

Samsung: "ECS discovery for romaing UEs." 3GPP TSG-SA WG6 Meeting #40-e e-meeting. Nov. 16-24, 2020. S6-202243, total 2 pages.

3rd Generation Partnership Project; Technical Specification Group Services and System Aspects;5G System Enhancements for Edge Computing;Stage 2(Release 17),3GPP TS 23.548 V0.1.0 (Mar. 2021),total:32pages.

Huawei, Hisilicon: "ACR when roaming to another PLMN",3GPP TSG-SA WG6 Meeting #40-e, e-meeting, Nov. 16-24, 2020, S6-202184, total 3 pages.

* cited by examiner

Mobile phone 400

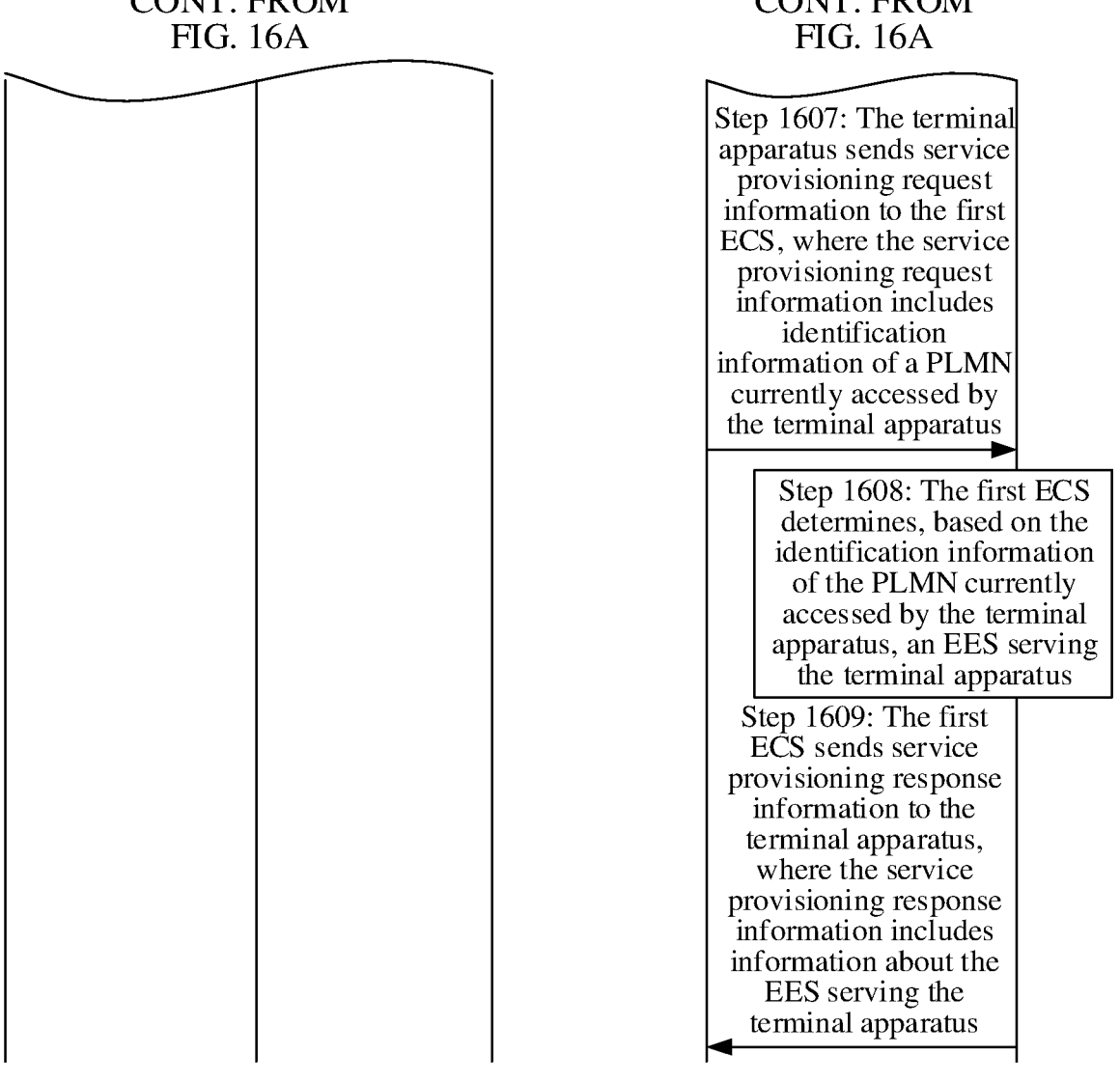

CONT. FROM
FIG. 16A

CONT. FROM
FIG. 16A

Step 1607: The terminal apparatus sends service provisioning request information to the first ECS, where the service provisioning request information includes identification information of a PLMN currently accessed by the terminal apparatus Step 1608: The first ECS determines, based on the identification information of the PLMN currently accessed by the terminal apparatus, an EES serving the terminal apparatus Step 1609: The first ECS sends service provisioning response information to the terminal apparatus, where the service provisioning response information includes information about the EES serving the terminal apparatus

FIG. 16B

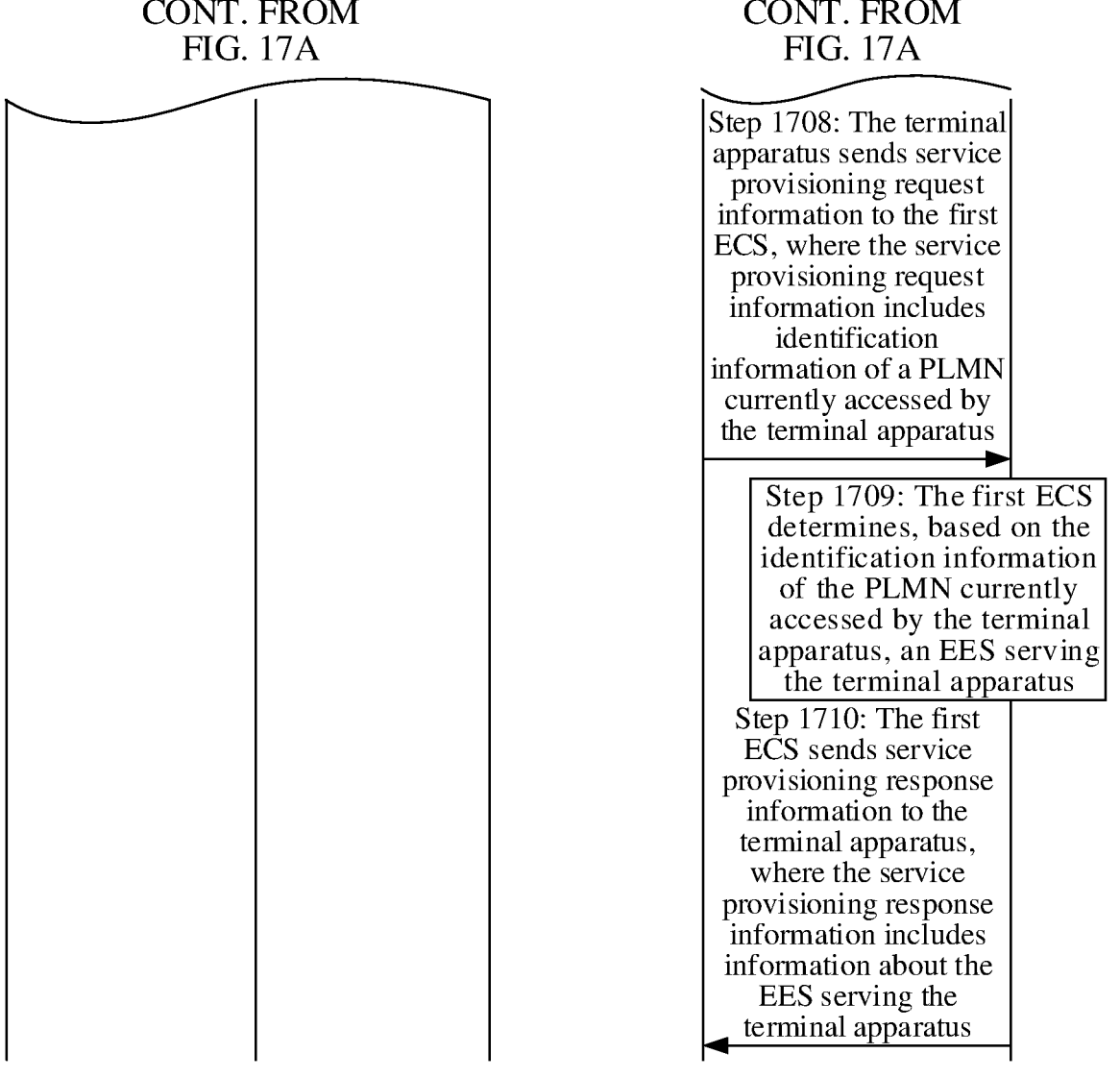

CONT. FROM
FIG. 17A

CONT. FROM
FIG. 17A

Step 1708: The terminal apparatus sends service provisioning request information to the first ECS, where the service provisioning request information includes identification information of a PLMN currently accessed by the terminal apparatus Step 1709: The first ECS determines, based on the identification information of the PLMN currently accessed by the terminal apparatus, an EES serving the terminal apparatus Step 1710: The first ECS sends service provisioning response information to the terminal apparatus, where the service provisioning response information includes information about the EES serving the terminal apparatus

FIG. 17B

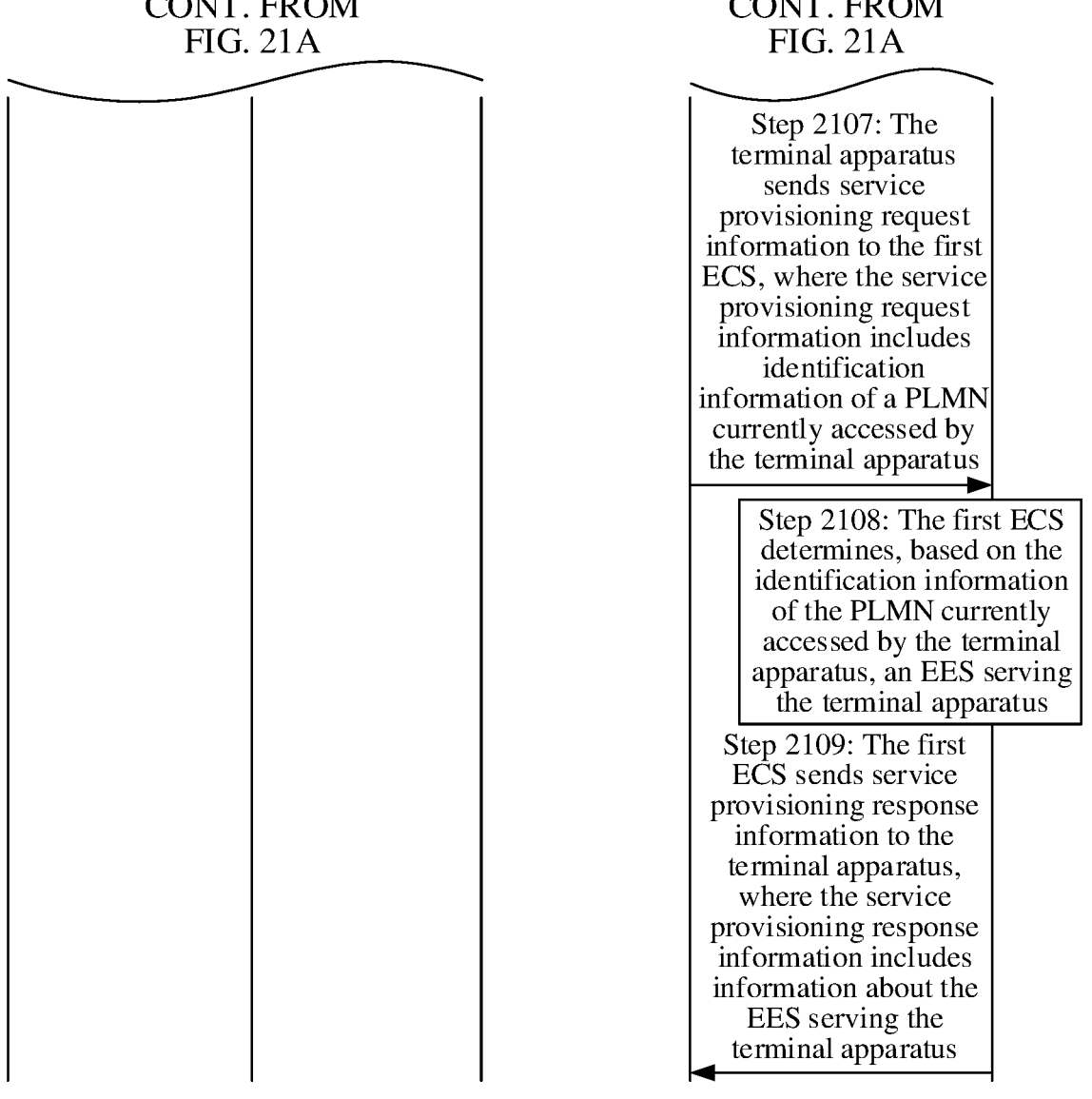

CONT. FROM
FIG. 21A

CONT. FROM
FIG. 21A

Step 2107: The terminal apparatus sends service provisioning request information to the first ECS, where the service provisioning request information includes identification information of a PLMN currently accessed by the terminal apparatus Step 2108: The first ECS determines, based on the identification information of the PLMN currently accessed by the terminal apparatus, an EES serving the terminal apparatus Step 2109: The first ECS sends service provisioning response information to the terminal apparatus, where the service provisioning response information includes information about the EES serving the terminal apparatus

FIG. 21B

METHOD FOR DETERMINING EDGE CONFIGURATION SERVER AND APPARATUS

CROSS-REFERENCE TO RELATED APPLICATIONS

This application is a continuation of International Application No. PCT/CN2021/084796, filed on Mar. 31, 2021, the disclosure of which is hereby incorporated by reference in its entirety.

TECHNICAL FIELD

Embodiments of this application relate to the field of communication technologies, and in particular, to a method for determining an edge configuration server and an apparatus.

BACKGROUND

Multi-access edge computing (MEC) is a technology used to provide a service and a cloud computing function for nearby user equipment through a radio access network. A data network (which may be referred to as an edge data network) is deployed near the access network, to provide the service for the nearby user equipment. This has high performance, low latency, high bandwidth, and the like, and can improve service quality of the user equipment.

In research on the MEC, an edge application architecture is defined. The edge application architecture includes an application client, an edge enabler client, an edge application server, an edge enabler server, an edge configuration server, and the like. The application client and the edge enabler client are deployed on a user equipment side, the edge application server and the edge enabler server are deployed in the edge data network, and a deployment location of the edge configuration server is not limited. For example, the edge configuration server may be deployed in the edge data network or a non-edge data network. A large quantity of edge configuration servers, edge enabler servers, and edge application servers are deployed in an actual network. When user equipment requires an edge data network to provide a service nearby, edge service devices such as an edge configuration server and an edge enabler server may be selected for the user equipment.

However, efficiency of communication between the edge data network and the user equipment may be sometimes low.

SUMMARY

This application provides a method for determining an edge configuration server and an apparatus, to improve efficiency of communication between a terminal apparatus and an edge data network.

To achieve the foregoing objective, the following technical solutions are used in this application.

According to a first aspect, an embodiment of this application provides a method for determining an edge configuration server. The method includes: A core network element determines, based on a mobile network accessed by a terminal apparatus, that an edge configuration server serving the terminal apparatus is a first edge configuration server. At least one mobile network corresponding to the first edge configuration server includes the mobile network accessed by the terminal apparatus. Then, the core network element sends, to the terminal apparatus, information indicating the first edge configuration server.

In this embodiment of this application, in a scenario in which the mobile network accessed by the terminal apparatus is different from a mobile network to which the terminal apparatus belongs, an edge configuration server that supports serving the terminal apparatus may include an edge configuration server in a VPLMN currently accessed by the terminal apparatus, and may further include an edge configuration server in an HPLMN of the terminal apparatus. In addition, at least one edge enabler server corresponding to the edge configuration server supports serving the terminal apparatus.

In determining of the edge configuration server, if information about a PLMN currently accessed by the terminal apparatus is not considered, the selected edge configuration server can serve the terminal apparatus, but can provide only an edge enabler server located in another PLMN to serve the terminal. This causes inter-PLMN communication. As a result, a data path is excessively long, and data transmission efficiency is reduced.

According to the method for determining an edge configuration server provided in this embodiment of this application, an edge configuration server that is located in a same PLMN as the terminal apparatus can be selected from edge configuration servers that support being terminal apparatus servers. In this way, when the terminal apparatus communicates with the edge configuration server, an improper data transmission path such as inter-PLMN communication is avoided. This may save signaling resources, and improve the data transmission efficiency. That is, according to the technical solution provided in this embodiment of this application, an edge configuration server with higher data transmission efficiency can be selected for the terminal apparatus.

In a possible implementation, that a core network element determines, based on a mobile network accessed by a terminal apparatus, that an edge configuration server serving the terminal apparatus is a first edge configuration server includes: The core network element determines, based on the mobile network accessed by the terminal apparatus and a home operator of the terminal apparatus, that the edge configuration server serving the terminal apparatus is the first edge configuration server. The at least one mobile network corresponding to the first edge configuration server includes the mobile network accessed by the terminal apparatus, and a home operator of the first edge configuration server is the home operator of the terminal apparatus.

In a possible implementation, that a core network element determines, based on a mobile network accessed by a terminal apparatus, that an edge configuration server serving the terminal apparatus is a first edge configuration server includes: The core network element determines, based on the mobile network accessed by the terminal apparatus and service indication information of the terminal apparatus, that the edge configuration server serving the terminal apparatus is the first edge configuration server. The at least one mobile network corresponding to the first edge configuration server includes the mobile network accessed by the terminal apparatus, and the first edge configuration server supports a requirement of a service type or service quality indicated by the service indication information.

In a possible implementation, the core network element is a policy control function network element or a unified data management function network element, and the core network element stores edge configuration server information. The edge configuration server information includes identification information of the first edge configuration server and identification information of the at least one mobile network corresponding to the first edge configuration server.

In a possible implementation, the core network element is a session management function network element, and the method further includes: The session management function network element receives edge configuration server information from a unified data management function. The edge configuration server information includes identification information of the first edge configuration server and identification information of the at least one mobile network corresponding to the first edge configuration server.

According to a second aspect, an embodiment of this application provides a method for determining an edge configuration server. The method includes: A terminal apparatus obtains edge configuration server information. The edge configuration server information includes identification information of at least one edge configuration server and identification information of at least one mobile network corresponding to each of the at least one edge configuration server. The terminal apparatus determines, based on a mobile network accessed by the terminal apparatus, a first edge configuration server serving the terminal apparatus in the at least one edge configuration server. At least one mobile network corresponding to the first edge configuration server includes the mobile network accessed by the terminal apparatus.

According to the method for determining an edge configuration server provided in this embodiment of this application, an edge configuration server that is located in a same PLMN as the terminal apparatus can be selected from edge configuration servers that support being terminal apparatus servers. In this way, when the terminal apparatus communicates with the edge configuration server, an improper data transmission path such as inter-PLMN communication is avoided. This may save signaling resources, and improve the data transmission efficiency. That is, according to the technical solution provided in this embodiment of this application, an edge configuration server with higher data transmission efficiency can be selected for the terminal apparatus.

In a possible implementation, that the terminal apparatus determines, based on a mobile network accessed by the terminal apparatus, a first edge configuration server serving the terminal apparatus in the at least one edge configuration server includes: The terminal apparatus determines, based on the mobile network accessed by the terminal apparatus and a home operator of the terminal apparatus, the first edge configuration server serving the terminal apparatus in the at least one edge configuration server. The at least one mobile network corresponding to the first edge configuration server includes the mobile network accessed by the terminal apparatus, and a home operator of the first edge configuration server is the home operator of the terminal apparatus.

In a possible implementation, that the terminal apparatus determines, based on a mobile network accessed by the terminal apparatus, a first edge configuration server serving the terminal apparatus in the at least one edge configuration server includes: The terminal apparatus determines, based on the mobile network accessed by the terminal apparatus and service indication information of the terminal apparatus, the first edge configuration server serving the terminal apparatus in the at least one edge configuration server. The at least one mobile network corresponding to the first edge configuration server includes the mobile network accessed by the terminal apparatus, and the first edge configuration server supports a requirement of a service type or service quality indicated by the service indication information.

In a possible implementation, that a terminal apparatus obtains edge configuration server information includes: The terminal apparatus obtains the edge configuration server information from a unified data management function network element. Alternatively, the terminal apparatus obtains the edge configuration server information from a policy control function network element. Alternatively, the terminal apparatus obtains the edge configuration server information from a session management function network element.

In a possible implementation, the method further includes: The terminal apparatus sends service provisioning request information to the first edge configuration server. The service provisioning request information includes identification information of the mobile network accessed by the terminal apparatus. The terminal apparatus receives, from the first edge configuration server, service provisioning response information in response to the service provisioning request information. The service provisioning response information includes information about a target edge enabler server, and the target edge enabler server is an edge enabler server in the mobile network accessed by the terminal apparatus.

According to a third aspect, an embodiment of this application provides a method for determining an edge configuration server. The method includes: A core network element sends information about an edge configuration server to a terminal apparatus. The core network element may be one of a unified data management function network element, a policy control function network element, and a session management function network element. The information about the edge configuration server is sent to the terminal apparatus, so that the terminal apparatus may select an edge configuration server with high data transmission efficiency based on the information.

According to a fourth aspect, an embodiment of this application provides a method for determining an edge configuration server. The method includes: A core network element determines a first edge configuration server based on first information and second information. The first information includes identification information of a public land mobile network (PLMN) currently accessed by a terminal apparatus. The second information includes address information of an edge configuration server that supports serving the terminal apparatus and identification information of a PLMN corresponding to the address information. Then, the core network element sends the address information of the first edge configuration server to the terminal apparatus.

In this embodiment of this application, when the terminal apparatus is in a roaming state, the edge configuration server that supports serving the terminal apparatus may include an edge configuration server in a VPLMN currently accessed by the terminal apparatus, and may further include an edge configuration server in an HPLMN of the terminal apparatus. In addition, at least one edge enabler server corresponding to the edge configuration server supports serving the terminal apparatus.

In determining of the edge configuration server, if information about the PLMN currently accessed by the terminal apparatus is not considered, the selected edge configuration server can serve the terminal apparatus, but can provide only an edge enabler server located in another PLMN to serve the terminal. This causes inter-PLMN communication. As a result, a data path is excessively long, and data transmission efficiency is reduced.

According to the method for determining an edge configuration server provided in this embodiment of this application, an edge configuration server that is located in a same PLMN as the terminal apparatus can be selected from edge configuration servers that support being terminal apparatus servers. In this way, when the terminal apparatus communicates with the edge configuration server, an improper data transmission path such as inter-PLMN communication is avoided. This may save signaling resources, and improve the data transmission efficiency. That is, according to the technical solution provided in this embodiment of this application, an edge configuration server with higher data transmission efficiency can be selected for the terminal apparatus.

In a possible implementation, the identification information of the PLMN in the second information includes the identification information of the PLMN currently accessed by the terminal apparatus. That a core network element determines a first edge configuration server based on first information and second information specifically includes: The core network element determines that at least one edge configuration server that is in the second information and that is corresponding to the identification information of the PLMN currently accessed by the terminal apparatus is the first edge configuration server.

In a possible implementation, if the core network element is a unified data management function network element, local configuration information of the unified data management function network element includes the second information. Specifically, the second information may be from subscription information or steering of roaming information in the local configuration information.

In a possible implementation, if the core network element is a policy control function network element, policy information that is of the terminal apparatus and that is determined by the policy control function network element includes the second information. Specifically, the second information may be from an access network discovery & selection policy (ANDSP) or a route selection policy in the policy information. The route selection policy may also be referred to as a user equipment route selection policy (UE route selection policy, URSP).

In a possible implementation, if the core network element is a session management function network element, the session management function network element receives the second information from a unified data management function network element. Optionally, the session management function network element may further send, to the terminal apparatus, a data network access identifier (DNAI) corresponding to a cell currently accessed by the terminal apparatus.

In a possible implementation, the first information further includes home operator information and/or service indication information of the terminal apparatus. In this case, the core network element may determine the first edge configuration server based on the identification information of the PLMN currently accessed by the terminal apparatus, the second information, and at least one of the home operator information of the terminal apparatus and the service indication information of the terminal apparatus.

In a possible implementation, the first information includes the identification information of the PLMN currently accessed by the terminal apparatus and the home operator information of the terminal apparatus.

In an implementation, the core network element determines that at least one edge configuration server that is in the second information and that is corresponding to the identification information of the PLMN currently accessed by the terminal apparatus is a candidate edge configuration server. Then, the core network element determines, based on the home operator information of the terminal apparatus, that an edge configuration server that is in the candidate edge configuration server and that belongs to a home operator of the terminal apparatus is the first edge configuration server.

In another implementation, the core network element determines, based on the home operator information of the terminal apparatus, that at least one edge configuration server that belongs to a home operator of the terminal apparatus and that is in the second information is the candidate edge configuration server. Then, the core network element determines that an edge configuration server that is in the candidate edge configuration server and that is corresponding to the identification information of the PLMN currently accessed by the terminal apparatus is the first edge configuration server.

In a possible implementation, the first information includes the identification information of the PLMN currently accessed by the terminal apparatus and the service indication information of the terminal apparatus. Optionally, the service indication information of the terminal apparatus may include service type indication information and/or service quality indication information, and the like. The service type indication information indicates a current service type of the terminal apparatus, for example, a video service, an internet of vehicles service, or a game service. The service quality indication information indicates a requirement of service quality of the terminal apparatus. For example, the service quality indication information indicates quality of service (QoS) information of a service of the terminal apparatus.

In an implementation, the core network element determines that at least one edge configuration server that is in the second information and that is corresponding to the identification information of the PLMN currently accessed by the terminal apparatus is a candidate edge configuration server. Then, the core network element determines, based on the service indication information of the terminal apparatus, that an edge configuration server that meets a service requirement of the terminal apparatus and that is in the candidate edge configuration server is the first edge configuration server.

In another implementation, the core network element may alternatively first determine, based on the service indication information of the terminal apparatus, that at least one edge configuration server that is in the second information and that meets a service requirement of the terminal apparatus is a candidate edge configuration server. Then, the core network element determines that an edge configuration server that is in the candidate edge configuration server and that is corresponding to the identification information of the PLMN currently accessed by the terminal apparatus is the first edge configuration server.

In this embodiment of this application, the core network element may determine a more proper first edge configuration server for the terminal apparatus based on the identification information of the PLMN currently accessed by the terminal apparatus, the second information, and at least one of the home operator information of the terminal apparatus and the service indication information of the terminal apparatus.

In a possible implementation, the first edge configuration server is corresponding to at least one edge enabler server located in the PLMN currently accessed by the terminal apparatus. In this case, when selecting the edge enabler server for the terminal apparatus, the first edge configuration server can ensure that an edge enabler server located in the PLMN currently accessed by the terminal apparatus is selected. When the terminal is in the roaming state, the terminal apparatus may obtain application data from the edge enabler server in the PLMN currently accessed by the terminal, and the terminal apparatus does not need to obtain the application data from the edge enabler server in the HPLMN. This can save signaling resources, and ensure an optimal path between the terminal apparatus and the edge enabler server, to improve service quality of the terminal apparatus.

According to a fifth aspect, an embodiment of this application provides a method for determining an edge configuration server. The method includes: A terminal apparatus obtains third information. The third information includes address information of an edge configuration server that supports serving the terminal apparatus and identification information of a PLMN corresponding to the address information. Then, the terminal apparatus determines a first edge configuration server based on first information and the third information. The first information includes identification information of a PLMN currently accessed by the terminal apparatus.

According to the method for determining an edge configuration server provided in this embodiment of this application, an edge configuration server that is located in a same PLMN as the terminal apparatus can be selected from edge configuration servers that support being terminal apparatus servers. In this way, when the terminal apparatus communicates with the edge configuration server, an improper data transmission path such as inter-PLMN communication is avoided. This may save signaling resources, and improve the data transmission efficiency. That is, according to the technical solution provided in this embodiment of this application, an edge configuration server with higher data transmission efficiency can be selected for the terminal apparatus.

In a possible implementation, the identification information of the PLMN in the third information includes the identification information of the PLMN currently accessed by the terminal apparatus. That the terminal apparatus determines a first edge configuration server based on first information and the third information specifically includes: The terminal apparatus determines that at least one edge configuration server that is in the third information and that is corresponding to the identification information of the PLMN currently accessed by the terminal apparatus is the first edge configuration server.

In a possible implementation, the first information further includes at least one of home operator information and service indication information that are of the terminal apparatus.

In a possible implementation, the first information includes the identification information of the PLMN currently accessed by the terminal apparatus and the home operator information of the terminal apparatus.

In an implementation, the terminal apparatus determines that at least one edge configuration server that is in the third information and that is corresponding to the identification information of the PLMN currently accessed by the terminal apparatus is a candidate edge configuration server. Then, the terminal apparatus determines, based on the home operator information of the terminal apparatus, that an edge configuration server that is in the candidate edge configuration server and that belongs to a home operator of the terminal apparatus is the first edge configuration server.

In another implementation, the terminal apparatus determines, based on the home operator information of the terminal apparatus, that at least one edge configuration server that is in the third information and that belongs to a home operator of the terminal apparatus is a candidate edge configuration server. Then, the terminal apparatus determines that an edge configuration server that is in the candidate edge configuration server and that is corresponding to the identification information of the PLMN currently accessed by the terminal apparatus is the first edge configuration server.

In a possible implementation, the first information includes the identification information of the PLMN currently accessed by the terminal apparatus and the service indication information of the terminal apparatus.

In an implementation, the terminal apparatus determines that at least one edge configuration server that is in the third information and that is corresponding to the identification information of the PLMN currently accessed by the terminal apparatus is a candidate edge configuration server. Then, the terminal apparatus determines, based on the service indication information of the terminal apparatus, that an edge configuration server that meets a service requirement of the terminal apparatus and that is in the candidate edge configuration server is the first edge configuration server.

In another implementation, the terminal apparatus determines, based on the service indication information of the terminal apparatus, that at least one edge configuration server that meets a service requirement of the terminal apparatus and that is in the third information is a candidate edge configuration server. Then, the terminal apparatus determines that an edge configuration server that is in the candidate edge configuration server and that is corresponding to the identification information of the PLMN currently accessed by the terminal apparatus is the first edge configuration server.

In this embodiment of this application, a more proper edge configuration server may be selected for the terminal with reference to at least one of the home operator information and service indication information of the terminal apparatus.

In a possible implementation, a method for obtaining the third information by the terminal apparatus specifically includes: The terminal apparatus obtains local configuration information from a unified data management function network element. The local configuration information of the unified data management function unit includes the third information. The terminal apparatus obtains policy information of the terminal apparatus determined by a policy control function network element. The policy information of the terminal apparatus includes the third information. Alternatively, the terminal apparatus obtains mapping information determined by a session management function network element. The mapping information determined by the session management function network element includes the third information.

Optionally, the terminal apparatus may further receive, from the session management function network element, a data network access identity corresponding to a cell currently accessed by the terminal apparatus.

In a possible implementation, the method for determining an edge configuration server provided in this embodiment of this application further includes: The terminal apparatus sends service provisioning request information to the first edge configuration server. The service provisioning request information includes at least the identification information of the PLMN currently accessed by the terminal apparatus. In addition, the terminal apparatus receives service provisioning response information from the first edge configuration server. The service provisioning response information includes information about a target edge enabler server, and the target edge enabler server is an edge enabler server in the PLMN currently accessed by the terminal apparatus.

In this embodiment of this application, the terminal apparatus includes at least the identification information of the PLMN currently accessed by the terminal apparatus in the service provisioning request information. Then, the first edge configuration server selects the edge enabler server for the terminal apparatus based on the identification information of the PLMN currently accessed by the terminal apparatus. The edge enabler server located in the PLMN currently accessed by the terminal apparatus can be selected to a maximum extent. In this way, when the terminal apparatus is in a roaming state, the terminal apparatus may obtain application data from an EES in the PLMN: a visited public land mobile network (VPLMN), currently accessed by the terminal apparatus, and the terminal apparatus does not need to obtain the application data from an EES in an HPLMN. This can save signaling resources, and ensure an optimal path between the terminal apparatus and the edge enabler server, to improve service quality of the terminal apparatus.

In a possible implementation, the service provisioning request information further includes a data network identifier of the terminal apparatus. The data network identifier may be a DNAI or a service set identifier (SSID).

According to a sixth aspect, an embodiment of this application provides a method for determining an edge enabler server, including: An edge configuration server receives service provisioning request information sent by a terminal apparatus. The service provisioning request information includes at least identification information of a PLMN currently accessed by the terminal apparatus. Then, the edge configuration server determines, based on the identification information of the PLMN currently accessed by the terminal apparatus, an edge enabler server serving the terminal apparatus. The edge configuration server sends service provisioning response information to the terminal apparatus. The service provisioning response information includes information about the edge enabler server serving the terminal apparatus.

According to the method for determining an edge enabler server provided in this embodiment of this application, the edge configuration server can select, to a maximum extent, an edge enabler server located in the PLMN currently accessed by the terminal apparatus. In this way, when the terminal apparatus is in a roaming state, the terminal apparatus may obtain application data from an EES in the PLMN (namely, a VPLMN) currently accessed by the terminal, and the terminal apparatus does not need to obtain the application data from an EES in an HPLMN. This can save signaling resources, and ensure an optimal path between the terminal apparatus and the edge enabler server, to improve service quality of the terminal apparatus. That is, according to the technical solution provided in this embodiment of this application, it can be ensured that a more proper edge enabler server is selected for the terminal apparatus.

In a possible implementation, the service provisioning request information further includes a data network identifier of the terminal apparatus, and the data network identifier may be a DNAI or an SSID.

Optionally, the edge configuration server may determine, based on location information of the terminal apparatus (for example, based on a cell ID and a TAI of the terminal apparatus) and the identification information of the PLMN currently accessed by the terminal apparatus, the edge enabler server serving the terminal apparatus.

Optionally, the edge configuration server may alternatively determine, based on location information of the terminal apparatus (for example, based on a cell identity (cell ID) and/or a tracking area identity (TAI) of the terminal apparatus), the identification information of the PLMN currently accessed by the terminal apparatus, and the data network identifier (for example, the SSID or the DNAI) of the terminal apparatus, the edge enabler server serving the terminal apparatus.

In a possible implementation, before the edge configuration server receives the service provisioning request information sent by the terminal apparatus, the method for determining an edge enabler server provided in this embodiment of this application further includes: The edge configuration server receives registration request information sent by the edge enabler server. The registration request information includes network identification information of a network that can be served by the edge enabler server. The network identification information of the network that can be served by the edge enabler server includes the identification information of the PLMN, or includes the identification information of the PLMN and the data network identifier.

According to a seventh aspect, this application provides a core network element, including a determining module and a sending module. The determining module is configured to determine a first edge configuration server based on first information and second information. The first information includes identification information of a PLMN currently accessed by a terminal apparatus. The second information includes address information of an edge configuration server that supports serving the terminal apparatus and identification information of a PLMN corresponding to the address information. The sending module is configured to send address information of the first edge configuration server to the terminal apparatus.

In a possible implementation, the identification information of the PLMN in the second information includes the identification information of the PLMN currently accessed by the terminal apparatus. The determining module is specifically configured to determine that at least one edge configuration server that is in the second information and that is corresponding to the identification information of the PLMN currently accessed by the terminal apparatus is the first edge configuration server.

In a possible implementation, if the core network element is a policy control function network element, policy information that is of the terminal apparatus and that is determined by the policy control function network element includes the second information.

In a possible implementation, if the core network element is a session management function network element, the session management function network element further includes a receiving module. The receiving module is configured to receive the second information from a unified data management function network element.

In a possible implementation, the first information further includes at least one of service indication information and home operator information that are of the terminal apparatus.

In a possible implementation, the first edge configuration server is corresponding to at least one edge enabler server located in the PLMN currently accessed by the terminal apparatus.

According to an eighth aspect, an embodiment of this application provides a terminal apparatus, including an obtaining module and a determining module. The obtaining module is configured to obtain third information. The third information includes address information of an edge configuration server that supports serving a terminal apparatus and identification information of a PLMN corresponding to the address information. The determining module is configured to determine a first edge configuration server based on first information and the third information. The first information includes identification information of a PLMN currently accessed by the terminal apparatus.

In a possible implementation, the identification information of the PLMN in the third information includes the identification information of the PLMN currently accessed by the terminal apparatus. The determining module is specifically configured to determine that at least one edge configuration server that is in the third information and that is corresponding to the identification information of the PLMN currently accessed by the terminal apparatus is the first edge configuration server.

In a possible implementation, the first information further includes at least one of service indication information and home operator information that are of the terminal apparatus.

In a possible implementation, the obtaining module is specifically configured to obtain local configuration information from a unified data management function network element; obtain policy information that is of the terminal apparatus and that is determined by a policy control function network element; or obtain mapping information determined by a session management function network element.

In a possible implementation, the terminal apparatus provided in this embodiment of this application further includes a sending module and a receiving module. The sending module is configured to send service provisioning request information to the first edge configuration server. The service provisioning request information includes at least the identification information of the PLMN currently accessed by the terminal apparatus. The receiving module is configured to receive service provisioning response information from the first edge configuration server. The service provisioning response information includes information about a target edge enabler server, and the target edge enabler server is an edge enabler server in the PLMN currently accessed by the terminal apparatus.

In a possible implementation, the service provisioning request information further includes a data network identifier of the terminal apparatus.

According to a ninth aspect, an embodiment of this application provides an edge configuration server, including a receiving module, a determining module, and a sending module. The receiving module is configured to receive service provisioning request information sent by a terminal apparatus. The service provisioning request information includes at least identification information of a PLMN currently accessed by the terminal apparatus. The determining module is configured to determine, based on the identification information of the PLMN currently accessed by the terminal apparatus, an edge enabler server serving the terminal apparatus. The sending module is configured to send service provisioning response information to the terminal apparatus. The service provisioning response information includes information about the edge enabler server serving the terminal apparatus.

In a possible implementation, the service provisioning request information further includes a data network identifier of the terminal apparatus, and the data network identifier may be a DNAI or an SSID.

In a possible implementation, the determining module is specifically configured to: determine, based on location information of the terminal apparatus (for example, based on a cell ID and/or a TAI of the terminal apparatus) and the identification information of the PLMN currently accessed by the terminal apparatus, the edge enabler server serving the terminal apparatus.

In a possible implementation, the determining module is specifically configured to: determine, based on location information of the terminal apparatus (for example, based on a cell ID and/or a TAI of the terminal apparatus), the identification information of the PLMN currently accessed by the terminal apparatus, and the data network identifier (for example, the SSID or the DNAI) of the terminal apparatus, the edge enabler server serving the terminal apparatus.

In a possible implementation, the receiving module is further configured to receive registration request information sent by the edge enabler server. The registration request information includes network identification information of a network that can be served by the edge enabler server. The network identification information of the network that can be served by the edge enabler server includes the identification information of the PLMN, or includes the identification information of the PLMN and the data network identifier.

According to a tenth aspect, an embodiment of this application provides a core network element, including a processor and a memory coupled to the processor. The memory is configured to store computer instructions. When the core network element runs, the processor executes the computer instructions stored in the memory, to enable the core network element to perform the method according to any one of the first aspect or the third aspect and the possible implementations of the first aspect or the third aspect.

According to an eleventh aspect, an embodiment of this application provides a computer-readable storage medium. The computer-readable storage medium includes a computer program. When the computer program is run on a computer, the method according to any one of the first aspect or the third aspect and the possible implementations of the first aspect or the third aspect is performed.

According to a twelfth aspect, an embodiment of this application provides a computer program product including instructions. When the computer program product runs on a computer, the computer is enabled to perform the method according to any one of the first aspect or the third aspect and the possible implementations of the first aspect or the third aspect.

According to a thirteenth aspect, an embodiment of this application provides a chip, including a memory and a processor. The memory is configured to store computer instructions. The processor is configured to invoke and run the computer instructions in the memory, to perform the method according to any one of the first aspect or the third aspect and the possible implementations of the first aspect or the third aspect.

According to a fourteenth aspect, an embodiment of this application provides a terminal apparatus, including a processor and a memory coupled to the processor. The memory is configured to store computer instructions. When the terminal apparatus runs, the processor executes the computer instructions stored in the memory, to enable the terminal apparatus to perform the method according to any one of the second aspect or the fourth aspect and the possible implementations of the second aspect or the fourth aspect.

According to a fifteenth aspect, an embodiment of this application provides a computer-readable storage medium. The computer-readable storage medium includes a computer program. When the computer program is run on a computer, the method according to any one of the second aspect or the fourth aspect and the possible implementations of the second aspect or the fourth aspect is performed.

According to a sixteenth aspect, an embodiment of this application provides a computer program product including instructions. When the computer program product runs on a computer, the computer is enabled to perform the method according to any one of the second aspect or the fourth aspect and the possible implementations of the second aspect or the fourth aspect.

According to a seventeenth aspect, an embodiment of this application provides a chip, including a memory and a processor. The memory is configured to store computer instructions. The processor is configured to invoke and run the computer instructions in the memory, to perform the method according to any one of the second aspect or the fourth aspect and the possible implementations of the second aspect or the fourth aspect.

According to an eighteenth aspect, an embodiment of this application provides an edge configuration server, including a processor and a memory coupled to the processor. The memory is configured to store computer instructions. When the edge configuration server runs, the processor executes the computer instructions stored in the memory, to enable the edge configuration server to perform the method according to any one of the sixth aspect and the possible implementations of the sixth aspect.

According to a sixteenth aspect, an embodiment of this application provides a computer-readable storage medium. The computer-readable storage medium includes a computer program. When the computer program is run on a computer, the method according to any one of the sixth aspect and the possible implementations of the sixth aspect is performed.

According to a seventeenth aspect, an embodiment of this application provides a computer program product including instructions. When the computer program product runs on a computer, the computer is enabled to perform the method according to any one of the sixth aspect and the possible implementations of the sixth aspect.

According to an eighteenth aspect, an embodiment of this application provides a chip, including a memory and a processor. The memory is configured to store computer instructions. The processor is configured to invoke and run the computer instructions in the memory, to perform the method according to any one of the sixth aspect and the possible implementations of the sixth aspect.

According to a nineteenth aspect, an embodiment of this application provides a communication system, including the core network element according to the seventh aspect or the core network element according to the tenth aspect, including the terminal apparatus according to the eighth aspect or the terminal apparatus according to the fourteenth aspect, or including the edge configuration server according to the ninth aspect or the edge configuration server according to the eighteenth aspect.

It should be understood that for beneficial effects achieved by technical solutions in the fourth aspect to the nineteenth aspect and the corresponding possible implementations in embodiments of this application, refer to the foregoing technical effects in the first aspect, the second aspect, the third aspect, and the corresponding possible implementations. Details are not described herein again.

BRIEF DESCRIPTION OF DRAWINGS

FIG. 16A and FIG. 16B are a schematic diagram 4 of a method for determining an edge configuration server according to an embodiment of this application;

FIG. 17A and FIG. 17B are a schematic diagram 5 of a method for determining an edge configuration server according to an embodiment of this application;

FIG. 21A and FIG. 21B are a schematic diagram 9 of a method for determining an edge configuration server according to an embodiment of this application;

DESCRIPTION OF EMBODIMENTS

Figure 1:
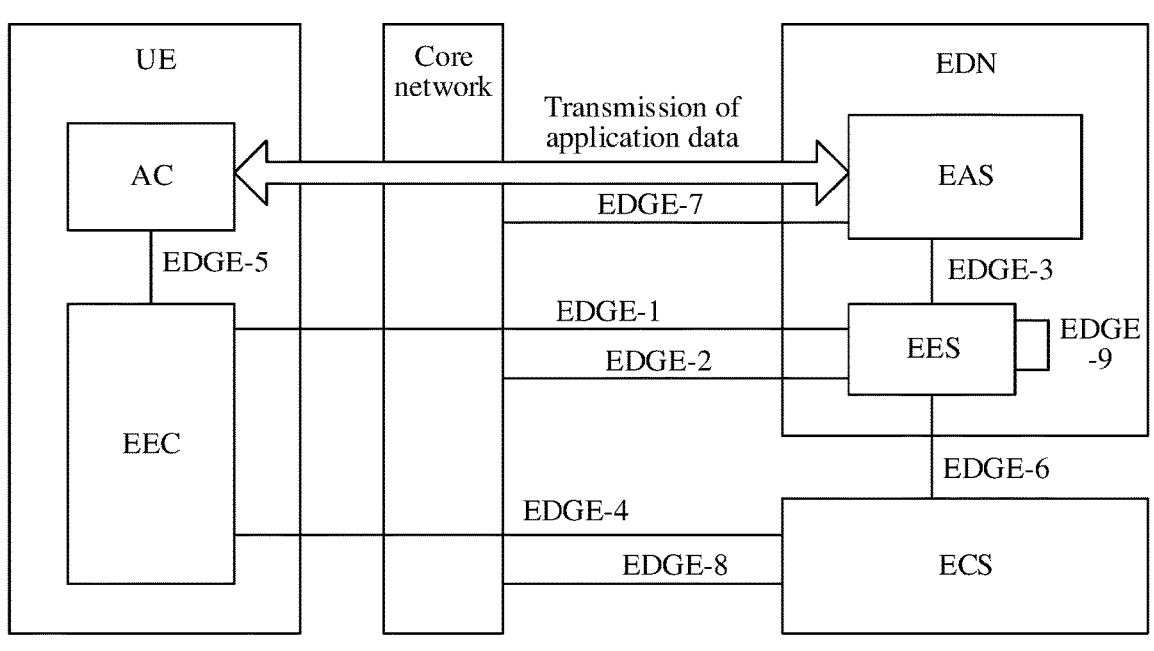
FIG. 1 is a schematic diagram of an edge application architecture according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first edge configuration server, a second edge configuration server, and the like are used to distinguish between different edge configuration servers, but do not indicate a specific order of the edge configuration servers.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In descriptions of embodiments of this application, unless otherwise stated, "a plurality of" means two or more than two. For example, a plurality of processing units are two or more processing units, and a plurality of systems are two or more systems.

Some concepts related to a method for determining an edge configuration server and an apparatus provided in embodiments of this application are first explained and described.

A public land mobile network (PLMN) is a network established and operated by the government or an operator authorized by the government to provide land mobile communication services for the public. It should be understood that a same operator may establish different PLMNs.

A home public land mobile network (HPLMN) may be understood as a PLMN subscribed by a terminal apparatus. For example, for a PLMN (for example, an operator A) subscribed by a terminal apparatus, it may be considered that the PLMN of the operator A is the HPLMN of the terminal apparatus. In addition, for a terminal apparatus that uses a single SIM card for communication, there is only one home PLMN of the terminal apparatus, that is, one terminal apparatus has only one HPLMN.

A visited public land mobile network (VPLMN) may be understood as that the terminal apparatus accesses a network through a PLMN with a roaming protocol other than a home PLMN. For example, for a terminal apparatus, it is assumed that a home network of the terminal apparatus is an operator A. The terminal apparatus roams to another country, and the terminal apparatus accesses a network through a PLMN (for example, an operator B) of the another country to obtain a service. In this case, the PLMN of the another country is a VPLMN of the terminal apparatus.

A mobile network operator (MNO) is an operator of a mobile network in the PLMN, for example, the operator A and the operator B.

Roaming state: The terminal apparatus is located in a home network of the terminal apparatus, and the network accessed by the terminal apparatus is the HPLMN. That is, the terminal apparatus is considered to be in a non-roaming state. The terminal apparatus is located in a network outside a home area of the terminal apparatus, and the network accessed by the terminal apparatus is the VPLMN. That is, the terminal apparatus is considered to be in a roaming state.

An Edge architecture of the 3rd Generation Partnership Project (3rd generation partnership project, 3GPP) is described as follows:

In research on multi-access mobile edge computing (MEC) by the 3GPP, an edge application architecture (which may be referred to as an SA6 EDGE application architecture) is defined. FIG. 1 is a schematic diagram of the edge application architecture. In the edge application architecture, user equipment may obtain application data from an edge data network (EDN) via a core network. Function entities in the edge application architecture mainly include an application client (AC), an edge enabler client (EEC), an edge application server (namely, edge application server(s), EAS), an edge enabler server (EES), and an edge configuration server (ECS). EDGE-1 to EDGE-9 are interfaces between the functional entities. Specifically, with reference to FIG. 1, the application client and the edge enabler client are deployed on a user equipment side or in a terminal apparatus, the edge application server and the edge enabler server are deployed in the edge data network, and a deployment location of the edge configuration server is not limited. For example, the ECS may be deployed in the EDN, a data network (DN), or a PLMN.

Edge data network EDN: A general understanding of the EDN is that the EDN is corresponding to only one data network, the EDN is a special local data network (local DN), the local data network has an edge enabler function, and the EDN may be identified by a data network access identity (DNAI) or a data network name (DNN). In this case, the EDN is a logical conceptual network. Another understanding of the EDN is that the EDN is a peer-to-peer concept of a central cloud, and may be understood as a local data center. The EDN may include a plurality of local data networks (local DNs), and may be identified by a DNAI.

The following describes functions of the functional entities in the edge application architecture.

The edge application server EAS may also be referred to as an edge application, an application instance, an edge application instance, an MEC application (server), an EAS function, or the like. The EAS is an application instance deployed in the edge data network, and is specifically an instance of a server application program (for example, social media software, augmented reality (AR), or virtual reality (VR)) deployed in the EDN. For an application, one or more EASs of the application may be deployed in one or more EDNs. The EASs deployed on different EDNs may be considered as different EASs of the application, may share a domain name, and may use a same IP address or different IP addresses.

The application client AC is a peer entity of the EAS on the user equipment side. The application client is used by the user equipment to obtain service data of the application from the application server. The application client is a client program used on the terminal apparatus side. The application client may be connected to an application server on a cloud to obtain the service data of the application, or may be connected to the EASs deployed in the one or more EDNs to obtain the service data of the application.

The edge enabler server EES is deployed in the EDN. The EAS may be registered with the EES, and the EES can provide some enabler capabilities for the application instance (EAS) deployed in the EDN. Specifically, the EES has a capability of managing and controlling the EAS. In addition, the EES may provide a 3GPP core network function for the EAS. For example, the EES provides 3GPP user plane event management information for the EAS. In addition, when an application on the user equipment side needs to be migrated on different servers (EASs), the EES can provide EAS discovery and application context migration functions. The EES may authenticate and authorize the user equipment, and provide information (for example, identification information and IP address information of the application instance) about the application instance for the user equipment.

The EAS is usually registered with the EES. Alternatively, information about the EAS is configured on the EES by using a management system. The EES is referred to as an EES associated with the EAS. The EES controls, manages, registers, and configures the EAS on the EES.

The edge enabler client EEC is a peer entity of the EES on the user equipment side. The EEC may register information about the EEC and information about the application client to the EES, perform security authentication and authorization, and obtain information about the EAS from the EES. In addition, the EEC can provide an edge computing enabler capability for the application client, for example, provide an EAS discovery service function, to return an IP address of the EAS to the application client.

The edge configuration server ECS is mainly responsible for EDN configuration. The EES in the EDN needs to be registered with the ECS, so that the ECS may provide information about the EES for the user equipment. That is, the ECS may provide an EES discovery function. The ECS may further obtain and store the information about the application instance and the IP address from another functional entity, and the ECS may directly provide the information about the application instance for the user equipment.

It should be understood that, based on the edge application architecture shown in FIG. 1, before obtaining the application data from the edge data network, the user equipment needs to resolve a discovery problem of the edge configuration server and a discovery problem of the edge enabler server. Specifically, discovery of the edge configuration server is to determine a proper edge configuration server for the user equipment through interaction between a core network element and the user equipment. Discovery of the edge enabler server is to determine a proper edge enabler server for the user equipment through interaction (performing a service provisioning procedure, namely, a service provisioning procedure) between the user equipment and the determined edge configuration server, so that the user equipment obtains information about the edge application server from the determined edge enabler server. In this way, an edge client on the user equipment side can obtain the application data from the edge application server.

Figure 2A:
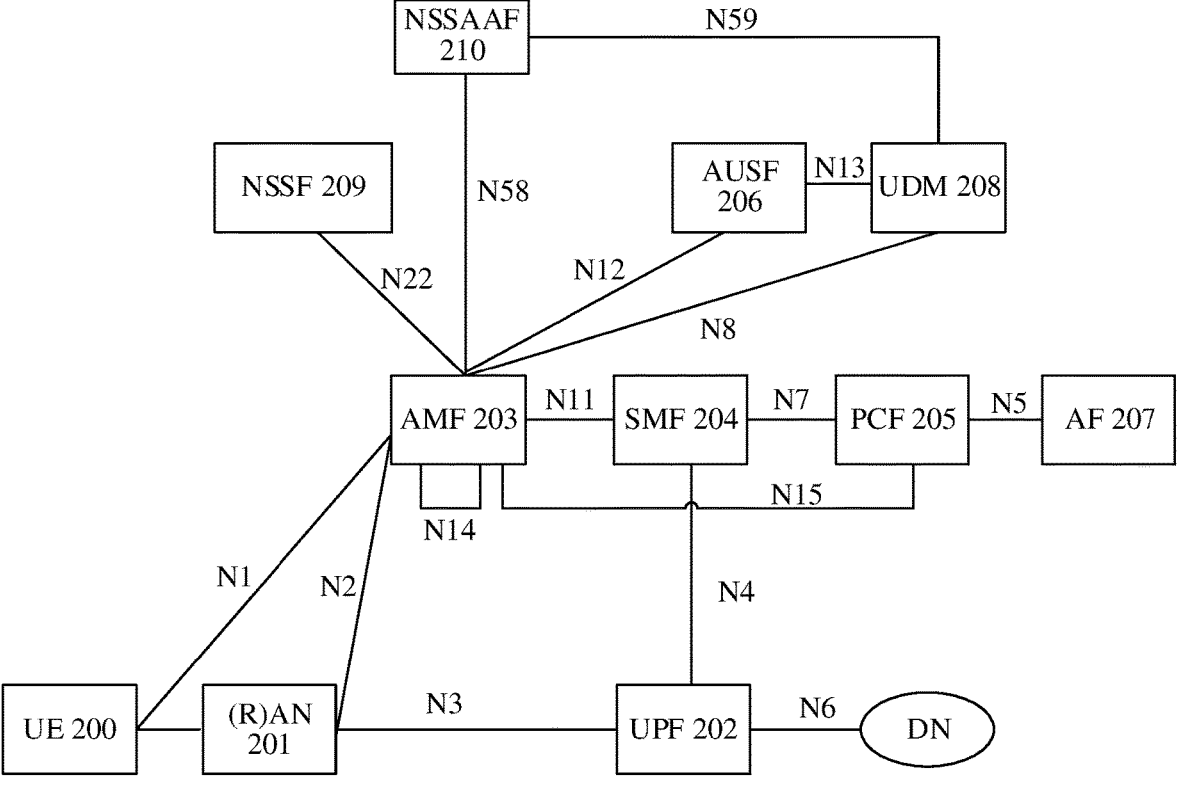
FIG. 2A is a schematic diagram of an architecture of a 5G communication system according to an embodiment of this application.

The edge application architecture may be applied to a 5G communication system or another communication system (for example, a 4G communication system or another future communication system). The 5G communication system is used as an example. FIG. 2A is a schematic diagram of an architecture of the 5G communication system. The 5G system may include but is not limited to user equipment (UE) 200, a radio access network (radio access network, RAN) or an access network (AN) 201 (denoted as a (R)AN 201 in FIG. 2A), a user plane function (UPF) 202, an access and mobility management function (AMF) 203, a session management function (SMF) 204, a policy control function (PCF) 205, an authentication server function (AUSF) 206, an application function (AF) 207, a unified data management function (UDM) 208, a network slice selection function (NSSF) 209, a network slice-specific authentication and authorization function (NSSAAF) 210, and the like. The UE 200 accesses the 5G network via the (R)AN 201, and establishes a session with the network. Then, the UE 200 may communicate, via the (R)AN 201, with a function (for example, the UPF 202 or the AMF 203) serving the UE 200. During actual application, a connection between the foregoing devices or service functions may usually be a wireless connection or a wired connection. To conveniently and intuitively represent a connection relationship between the devices, solid lines are used in FIG. 2A for illustration. In addition, it should be noted that N1, N2, N3, N4, N6, N7, N8, N11, N12, N13, N14, N15, N22, N58, N59, and the like in FIG. 2A are interface sequence numbers. For meanings of the interface sequence numbers, refer to meanings defined in related standards and protocols, and are not limited herein.

The following briefly describes network elements in the 5G communication system.

The (R)AN 201 is used by the UE 200 to access the network. The (R)AN 201 may include devices such as a base station, an evolved base station (eNB), a next generation base station (gNB), a new radio base station (new radio eNB), a macro base station, a micro base station, a high frequency base station or a transmission and reception point (TRP), a non-3GPP access network (for example, Wi-Fi), and/or a non-3GPP interworking function (N3IWF).

The UPF 202 is configured to process a user plane-related event, for example, transmission or routing of a data packet, detection of the data packet, reporting of a service volume, processing of quality of service (QoS), lawful interception, and storage of a downlink data packet.

The AMF 203 is configured to perform connection management, mobility management, registration management, access authentication and authorization, accessibility management, security context management, and the like.

The SMF 204 is configured to perform session management (for example, session establishment, modification, and release), IP address allocation and management, UPF selection and control, service and session continuity mode selection, a roaming service, and the like.

The PCF 205 is configured to formulate a policy, provide a policy control service, obtain subscription information related to policy decision, and the like.

The AUSF 206 is configured to: interact with the UDM 20 to obtain user information, and perform an authentication-related function, for example, generate an intermediate key.

The AF 207 interacts with a 3GPP core network, and provides a service or a server.

The UDM 208 processes authentication information, subscriber identity information, access authorization, registration and mobility management, subscription management, and short message management in a 3GPP authentication and key agreement mechanism.

The NSSF 209 is configured to: select one group of network slices for the UE 200, determine network slice selection assistance information, and determine an AMF set serving the UE 200 (where the AMF set may be a set of a plurality of AMFs that may serve the UE 200).

The NSSAAF 210 is configured to support authentication and authorization of a network slice.

Optionally, the 5G communication system may further include a network exposure function (NEF) and a network repository function (NRF). The NEF is configured to: securely exposes various services and capabilities (including content exposure, exposure to a third party, or the like) provided by 3GPP network functions, and convert or translate information exchanged with the AF 207 and information exchanged with an internal network function, for example, a service identifier and content of the AF and information about a 5G core network (for example, the network slice selection assistance information). The NRF is configured to: discover a service, and maintain a network function profile of available network function instances and services supported by these network functions.

Figure 2B:
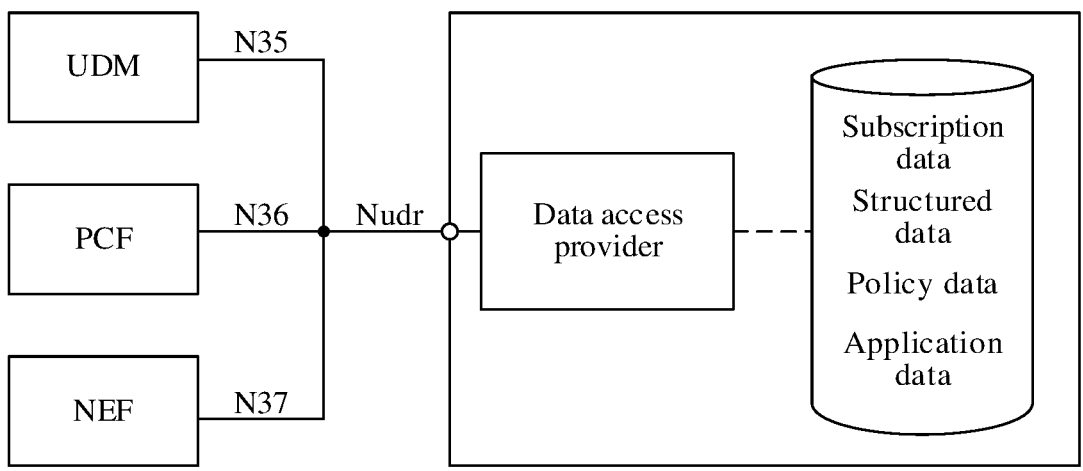
FIG. 2B is a schematic diagram of communication between a network element in a 5G communication system and a UDR according to an embodiment of this application.

It should be noted that the communication devices in FIG. 2A and FIG. 2B, for example, the RAN device, the AMF, the SMF, the UPF, the PCF, the AUSF, the AF, and the UDM, are merely names, and the names do not constitute a limitation on the devices. In the 5G network and the another future network, the network elements such as the RAN device, the AMF, the SMF, the UPF, the PCF, the AUSF, the AF, and the UDM may alternatively have other names, that is, network elements having same or similar functions. This is not limited in embodiments of this application.

Optionally, the 5G communication system may further include a unified data repository (UDR), which may store subscription data, policy data, structured data, application data, and the like. For example, the UDM is configured to store the subscription data or read the subscription data, and is used by the PCF to store the policy data or read the policy data. As shown in FIG. 2B, a UDR is connected to a network element such as a UDM or a PCF through a standardized interface. The UDM stores subscription information in the UDR, and the PCF stores policy data in the UDR. N35, N36, N37, and Nudr are standardized interfaces.

Optionally, in embodiments of this application, each network element in the core network is also referred to as a functional module (namely, the UPF 202, the AMF 203, the SMF 204, the PCF 205, the AUSF 206, the AF 207, the UDM 208, the NSSF 209, and the NSSAAF 210), and may be integrated on a server, to implement a function of the network element.

Figure 3:
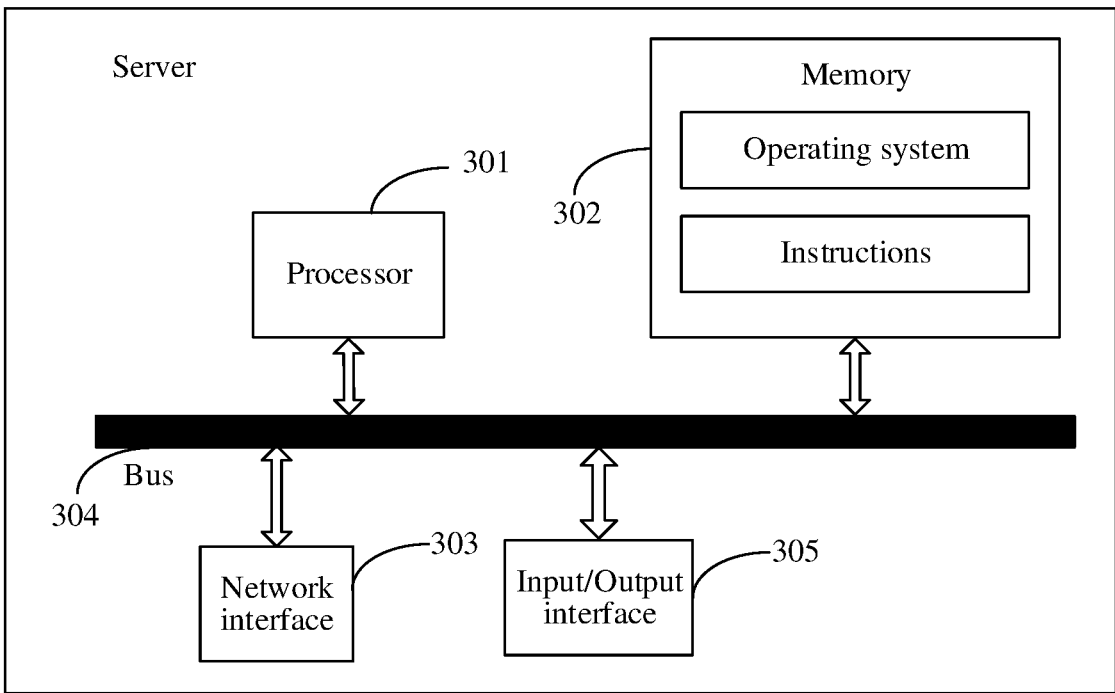
FIG. 3 is a schematic diagram of a hardware structure of a server according to an embodiment of this application.

With reference to FIG. 3, the following describes a hardware structure of an ECS or an EES and a server integrated with one or more of the foregoing function network elements. Refer to FIG. 3. The server includes a processor 301, a memory 302, a network interface 303, and a bus 304. The processor 301, the memory 302, and the network interface 303 may be connected to each other through the bus 304, or may be connected to each other in another manner.

The processor 301 is a control center of the server. The processor 301 may be a general-purpose central processing unit (CPU), another general-purpose processor, or the like. The general-purpose processor may be a microprocessor, any conventional processor, or the like. For example, the processor 301 may include one or more CPUs. The CPU is a single-core CPU (single-CPU) or a multi-core CPU (multi-CPU).

The memory 302 includes, but is not limited to, a random access memory (random access memory, RAM), a read-only memory (ROM), an erasable programmable read-only memory (EPROM), a flash memory, an optical memory, a magnetic disk storage medium or another magnetic storage device, or any other medium that can be used to carry or store expected program code in a form of instructions or a data structure and that can be accessed by a computer.

In a possible implementation, the memory 302 may be independent of the processor 301. The memory 302 may be connected to the processor 301 through the bus 304, and is configured to store data, instructions, or program code. When invoking and executing the instructions or the program code stored in the memory 302, the processor 301 can implement a method provided in embodiments of this application.

In another possible implementation, the memory 302 may alternatively be integrated with the processor 301.

The network interface 303 may be a wired interface, for example, a fiber distributed data interface (FDDI) or a gigabit Ethernet (GE) interface. Alternatively, the network interface 103 may be a wireless interface, and the network interface 303 is configured to receive instructions, information, or the like.

Optionally, the server further includes an input/output interface 305. The input/output interface 305 is configured to: connect to an input device, and receive information entered by a user by using the input device. The input device includes, but is not limited to, a keyboard, a touchscreen, a microphone, and the like. The input/output interface 305 is further configured to: connect to an output device, and output a processing result of the processor 301. The output device includes, but is not limited to, a display, a printer, and the like.

The bus 304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not indicate that there is only one bus or only one type of bus.

It should be noted that the structure shown in FIG. 3 does not constitute a limitation on the server. In addition to the components shown in FIG. 3, the server may include more or fewer components than those shown in the figure, or combine some components, or have different component arrangements.

The user equipment in embodiments of this application may be a terminal apparatus. The terminal apparatus may include various handheld devices, vehicle-mounted devices, wearable devices, or computing devices that have a wireless communication function, or other processing devices connected to a wireless modem; and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a UE, a mobile station (MS), a terminal device, or the like. For ease of description, in this application, the devices mentioned above are collectively referred to as the terminal apparatus.

Figure 4:
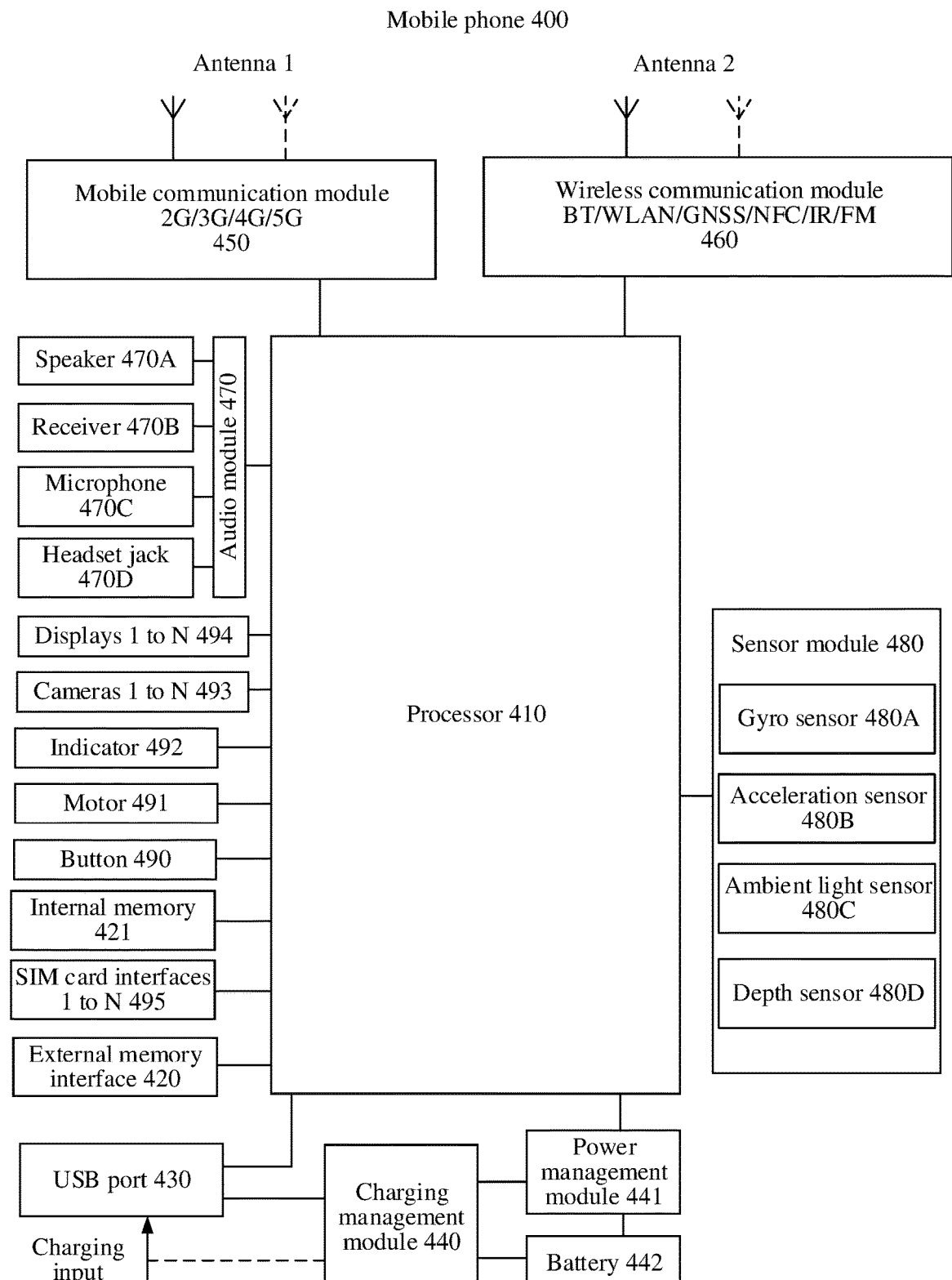
FIG. 4 is a schematic diagram of a hardware structure of a mobile phone according to an embodiment of this application.

For example, the terminal apparatus is a mobile phone. FIG. 4 is a schematic diagram of a hardware structure of the mobile phone according to an embodiment of this application. As shown in FIG. 4, the mobile phone 400 includes a processor 410, a memory (including an external memory interface 420 and an internal memory 421), a universal serial bus (USB) port 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a button 490, a motor 491, an indicator 492, a camera 493, a display 494, a subscriber identification module (subscriber identification module, SIM) card interface 495, and the like. The sensor module 480 may include a gyro sensor 480A, an acceleration sensor 480B, an ambient light sensor 480C, a depth sensor 480D, a magnetic sensor, a pressure sensor, a distance sensor, an optical proximity sensor, a heart rate sensor, a barometric pressure sensor, a fingerprint sensor, a temperature sensor, a touch sensor, a bone conduction sensor, and the like.

It may be understood that the structure shown in this embodiment of this application does not constitute a specific limitation on the mobile phone 400. In some other embodiments of this application, the mobile phone 400 may include more or fewer components than those shown in the figure, combine some components, split some components, or may have different component arrangements. The components shown in the figure may be implemented by hardware, software, or a combination of the software and the hardware.

The processor 410 may include one or more processing units. For example, the processor 410 may include an application processor (AP), a modem processor, a graphics processing unit (GPU), an image signal processor (ISP), a controller, a memory, a video or audio codec, a digital signal processor (DSP), a baseband processor, a neural-network processing unit (NPU), and/or the like. Different processing units may be independent components, or may be integrated into one or more processors.

The controller may be a nerve center and a command center of the mobile phone 400. The controller may generate an operation control signal based on an instruction operation code and a time sequence signal, to complete control of instruction reading and instruction execution.

A memory may further be disposed in the processor 410, and is configured to store instructions and data. In some embodiments, the memory in the processor 410 is a cache. The memory may store instructions or data that has been used or cyclically used by the processor 410. If the processor 410 needs to use the instructions or the data again, the processor 410 may directly invoke the instructions or the data from the memory. This avoids repeated access and reduces waiting time of the processor 410, so that system efficiency is improved.

In some embodiments, the processor 410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The charging management module 440 is configured to receive a charging input from a charger. The power management module 441 is configured to connect to the battery 442, the charging management module 440, and the processor 410. The power management module 441 receives an input from the battery 442 and/or the charging management module 440, and supplies power to the processor 410, the internal memory 421, the display 494, the camera 493, the wireless communication module 460, and the like. The power management module 441 may be further configured to monitor parameters such as a battery capacity, a battery cycle count, and a battery health status (electric leakage or impedance).

A wireless communication function of the mobile phone 400 may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna in the mobile phone 400 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 450 may provide solution that is applied to the mobile phone 400 and that includes wireless communication such as 2G, 3G, 4G, and 5G. The mobile communication module 450 may include at least one filter, a switch, a power amplifier, a low noise amplifier (LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal obtained through modulation by the modem processor, and convert the signal into an electromagnetic wave through the antenna 1 for radiation. In some embodiments, at least some functional modules of the mobile communication module 450 may be disposed in the processor 410. In some embodiments, at least some functional modules of the mobile communication module 450 and at least some modules of the processor 410 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and transmitted to the application processor. The application processor outputs a sound signal through an audio device (not limited to the speaker 470A, the receiver 470B, or the like), or displays an image or a video on the display 494. In some embodiments, the modem processor may be an independent component. In some other embodiments, the modem processor may be independent of the processor 410, and is disposed in a same component with the mobile communication module 450 or another functional module.

The wireless communication module 460 may provide a solution that is applied to the mobile phone 400 and that includes wireless communication such as a wireless local area network (WLAN) (for example, a Wi-Fi network), Bluetooth (BT), a global navigation satellite system (GNSS), frequency modulation (FM), a near field communication (NFC), and an infrared (IR) technology. The wireless communication module 460 may be one or more components integrating at least one communication processing module. The wireless communication module 460 receives an electromagnetic wave through the antenna 2, performs frequency modulation and filtering processing on the electromagnetic wave signal, and sends a processed signal to the processor 410. The wireless communication module 460 may further receive a to-be-sent signal from the processor 410, perform frequency modulation and amplification on the signal, and convert the signal into an electromagnetic wave through the antenna 2 for radiation.

In some embodiments, in the mobile phone 400, the antenna 1 is coupled to the mobile communication module 450, and the antenna 2 is coupled to the wireless communication module 460, so that the mobile phone 400 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), new radio (NR), BT, the GNSS, the WLAN, the NFC, the FM, the IR technology, and/or the like.

The mobile phone 400 implements a display function by using the GPU, the display 494, the application processor, and the like. The GPU is a microprocessor for image processing, and is connected to the display 494 and the application processor. The GPU is configured to: perform mathematical and geometric computation, and render an image. In embodiments of this application, the GPU may be configured to perform three-dimensional model rendering and virtual-physical superposition. The processor 410 may include one or more GPUs that execute program instructions to generate or change display information.

The display 494 is configured to display an image, a video, and the like. In embodiments of this application, the display 494 may be configured to display an image obtained through the virtual-physical superposition. The display 494 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 400 may include one or N displays 494, where N is a positive integer greater than 1.

The mobile phone 400 may implement a photographing function by using the ISP, the camera 493, the video codec, the GPU, the display 494, the application processor, and the like.

The ISP is configured to process data fed back by the camera 493. In some embodiments, the ISP may be disposed in the camera 493.

The camera 493 is configured to capture a static image or a video. In some embodiments, the mobile phone 400 may include one or N cameras 493, where N is a positive integer greater than 1.

The digital signal processor is configured to process a digital signal, for example, process a digital image signal or a digital audio signal, and may further process another digital signal. For example, when the mobile phone 400 selects a frequency, the digital signal processor is configured to perform Fourier transform on frequency energy, and the like.

The video or audio codec is configured to compress or decompress digital video or audio. The mobile phone 400 may support one or more audio codecs, for example, an SBC tacitly recognized by the advanced audio distribution profile (A2DP), and an encoder of an advanced audio coding (AAC) series of the moving picture experts group (MPEG). In this way, the mobile phone 400 may play or record audio in a plurality of encoding formats.

The external memory interface 420 may be configured to connect to an external memory card, for example, a micro SD card, to expand a storage capability of the mobile phone 400. The external storage card communicates with the processor 410 through the external memory interface 420, to implement a data storage function.

The internal memory 421 may be configured to store computer-executable program code. The executable program code includes instructions. The internal memory 421 may include a program storage area and a data storage area. The program storage area may store an operating system, an application required by at least one function (for example, a voice playing function or an image playing function), and the like. The data storage area may store data (such as audio data and an address book) and the like created during use of the mobile phone 400. In addition, the internal memory 421 may include a high-speed random access memory, and may further include a non-volatile memory, for example, at least one magnetic disk storage device, a flash memory, or a universal flash storage (UFS). By running the instructions stored in the internal memory 421 and/or the instructions stored in the memory that is disposed in the processor, the processor 410 executes various functional applications and data processing of the mobile phone 400.

The mobile phone 400 may implement an audio function such as music playing or recording by using the audio module 470, the speaker 470A, the phone receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may be further configured to encode and decode an audio signal.

The speaker 470A, also referred to as a "loudspeaker", is configured to convert an audio electrical signal into a sound signal. The mobile phone 400 may listen to music or answer a hands-free call by using the speaker 470A.

The receiver 470B, also referred to as an "earpiece", is configured to convert an audio electrical signal into a sound signal. When a call is answered or a voice message is received by using the mobile phone 400, the receiver 470B may be put close to a human ear to listen to a voice.

The microphone 470C, also referred to as a "mike" or a "mic", is configured to convert a sound signal into an electrical signal. When making a call or sending a voice message, a user may make a sound near the microphone 470C through the mouth of the user, to input a sound signal to the microphone 470C. At least one microphone 470C may be disposed in the mobile phone 400. In some other embodiments, two microphones 470C may be disposed in the mobile phone 400. In addition to collecting a sound signal, a noise reduction function (where a microphone with the noise reduction function is a feedback microphone) may be further implemented. In some other embodiments, three, four, or more microphones 470C may alternatively be disposed in the mobile phone 400, to collect a sound signal, implement noise reduction, identify a sound source, implement a directional recording function, and the like.

The gyro sensor 480A may be configured to determine a moving posture of the mobile phone 400. The acceleration sensor 480B may detect a movement direction and movement acceleration of the mobile phone 400. The ambient light sensor 480C is configured to sense ambient light brightness. The depth sensor 480D is configured to determine a distance from each point on an object to the mobile phone 400.

The indicator 492 may be an indicator lamp, and may be configured to indicate a charging status or a power change, or may be configured to indicate a message, a missed call, a notification, or the like.

The button 490 includes a power button, a volume button, and the like. The button 490 may be a mechanical button, or may be a touch button. The motor 491 may generate a vibration prompt. The indicator 492 may be an indicator lamp, and may be configured to indicate a charging status or a power change, or may be configured to indicate a message, a missed call, a notification, or the like.

The SIM card interface 495 is configured to connect to a SIM card. The SIM card may be inserted into the SIM card interface 495 or detached from the SIM card interface 495, to implement contact with or separation from the mobile phone 400.

Currently, in a process of studying a discovery problem of an edge configuration server by the 3GPP SA2, for a scenario in which the user equipment roams, it is proposed that in a process in which the user equipment establishes a session with the network, the session management function network element (namely, the SMF in the foregoing 5G communication system) may determine an edge configuration server serving the user equipment.

It may be understood that, when the terminal apparatus is in a roaming state, a type of the session established between the terminal apparatus and the network may include local breakout and home routed.

The local breakout means that, when the terminal apparatus is in the roaming state, local breakout (LBO) may be performed on user plane data of the terminal apparatus. To be specific, a user plane of a PLMN (namely, a VPLMN) in a current roaming area of the terminal apparatus processes the user plane data of the terminal apparatus (that is, the user plane data of the terminal apparatus is routed by the VPLMN), and the user plane data of the terminal apparatus does not need to be returned to a home network (namely, an HPLMN) of the terminal apparatus.

The home routed means that, when the terminal apparatus is in the roaming state, all user plane data of the terminal apparatus needs to be returned to the home network (namely, the HPLMN) of the terminal apparatus for processing, that is, routed by the HPLMN.

The following briefly describes a method for determining an edge configuration server from a perspective of establishing different types of sessions between the terminal apparatus and the network.

It should be noted that, in the following embodiments, the unified data management function network element is represented as a UDM, the session management function network element is represented as an SMF, the policy control function network element is represented as a PCF, the access and mobility management function network element is represented as an AMF, the edge enabler client is represented as an EEC, the edge configuration server is represented as an ECS, and the edge enabler server is represented as an EES.

Figure 5:
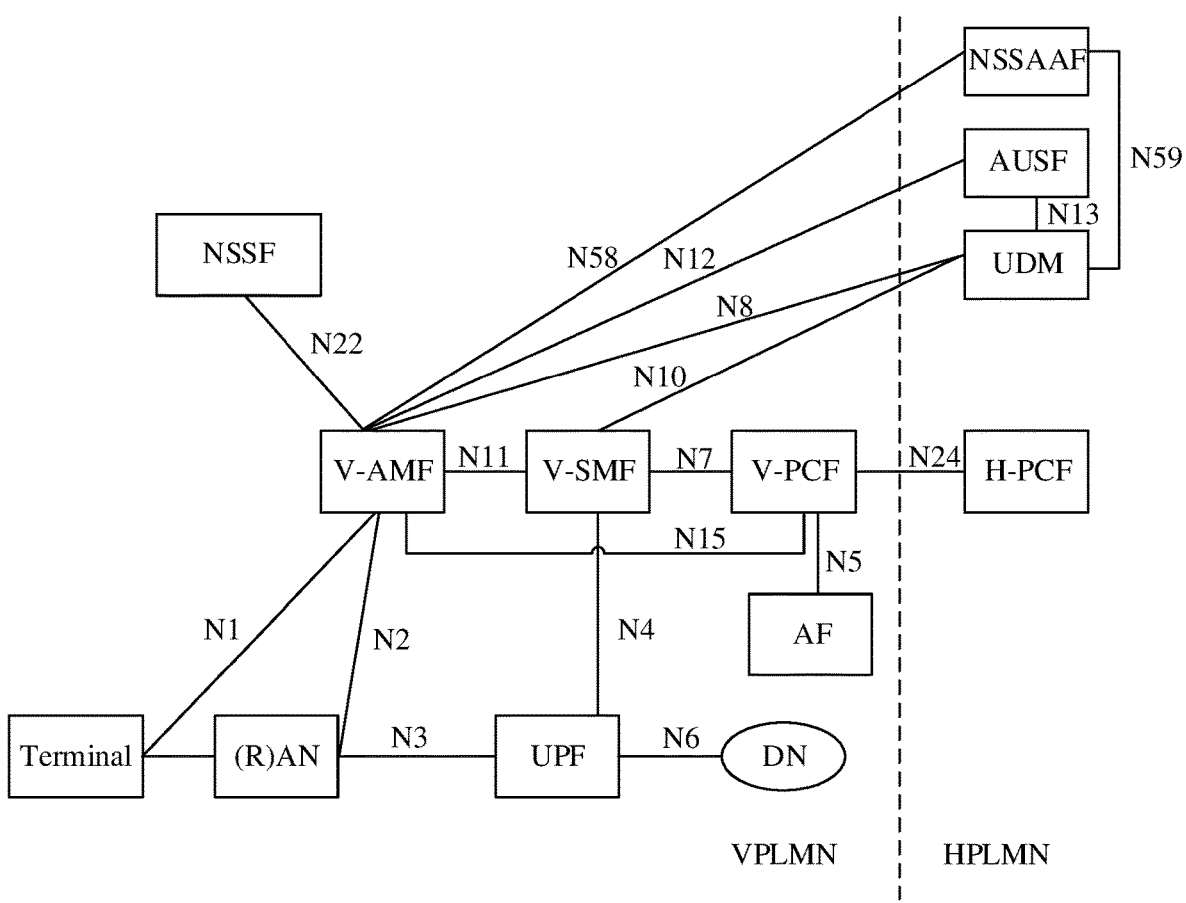
FIG. 5 is a schematic diagram 1 of a network architecture in a roaming case according to an embodiment of this application.
Figure 6:
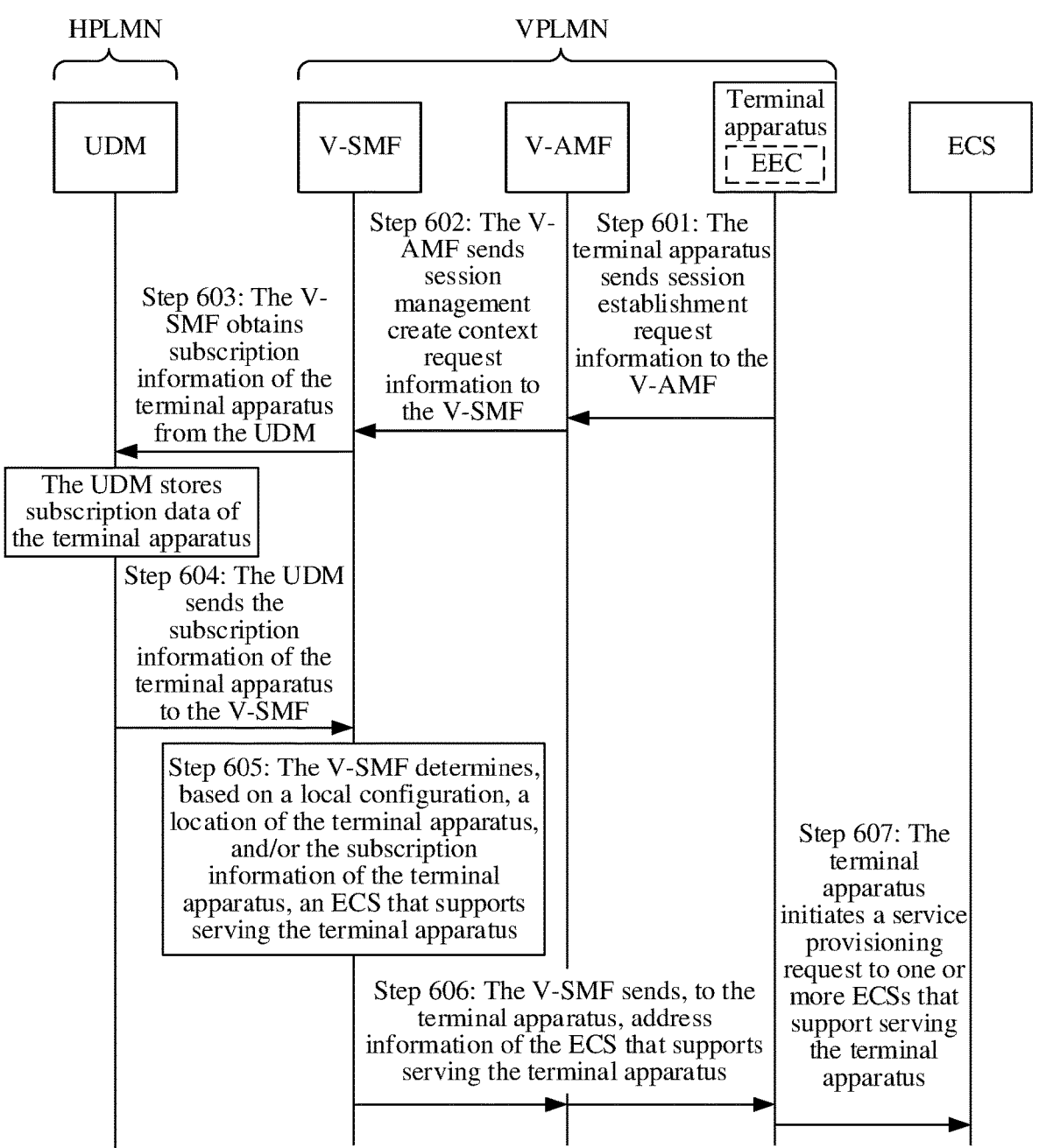
FIG. 6 is a schematic diagram 1 of a method for determining an edge configuration server in a roaming case according to an embodiment of this application.

First, with reference to a network architecture in a roaming case shown in FIG. 5, when a type of a session established between a terminal apparatus and a network is local breakout, a session management function network element in a VPLMN may determine an edge configuration server. As shown in FIG. 6, a specific process of determining the edge configuration server includes step 601 to step 607.

Step 601: The terminal apparatus sends session establishment request information to a V-AMF.

Step 602: The V-AMF sends session management create context request information (for example, sends the session management create context request information by sending Nsmf_PDUSession_CreateSMContext Request) to the V-SMF.

The V-SMF represents the SMF in the VPLMN, and the V-AMF represents an AMF in the VPLMN.

It may be understood that the session management create context request information may include a subscription permanent identifier (SUPI), namely, at least one of elements such as an SUPI of the terminal apparatus, a selected DNN, a DNN requested by the terminal apparatus, S-NSSAI(s), a PDU Session ID, and an N1 SM container (namely, a session establishment request).

Step 603: The V-SMF obtains subscription information of the terminal apparatus from a UDM.

It may be understood that the subscription information of the terminal apparatus in the UDM includes identification information of an ECS that can be visited by the terminal apparatus. Optionally, the subscription information of the terminal apparatus may further include one or more of the session type, an allowed session and service continuity (SSC) mode, a default 5G quality of service identifier (5G QoS identifier, 5QI), an allocation and retention priority (ARP), a session aggregation maximum bit rate (session-AMBR) subscribed by the terminal apparatus, an SMF-related external parameter, or the like. The UDM is a UDM in an HPLMN.

Step 604: The UDM sends the subscription information of the terminal apparatus to the V-SMF.

Step 605: The V-SMF determines, based on a local configuration, a location of the terminal apparatus, and/or the subscription information of the terminal apparatus, an ECS that supports serving the terminal apparatus.

It should be understood that the identification information of the ECS in the subscription information of the terminal apparatus (namely, the identification information of the ECS that can be visited by the terminal apparatus) is used to determine the ECS that supports serving the terminal apparatus.

Specifically, the V-SMF may determine, based on the local configuration and the location of the terminal apparatus, the ECS that supports serving the terminal apparatus; the V-SMF determines, based on the local configuration and the subscription information of the terminal apparatus, the ECS that supports serving the terminal apparatus; or the V-SMF determines, based on the local configuration, the location of the terminal apparatus, and the subscription information of the terminal apparatus, the ECS that supports serving the terminal apparatus. Specific information that is in the foregoing information and that is used to determine the ECS is determined based on actual situation. This is not limited in this embodiment of this application.

Step 606: The V-SMF sends, to the terminal apparatus, address information of the ECS that supports serving the terminal apparatus.

Step 607: The terminal apparatus initiates a service provisioning request to one or more ECSs that support serving the terminal apparatus.

In determining of the edge configuration server, if the local configuration, the location of the terminal apparatus, and/or the subscription information of the terminal apparatus used by the V-SMF do/does not include information about a PLMN currently accessed by the terminal apparatus, the selected edge configuration server can serve the terminal apparatus, but can provide only an edge enabler server located in another PLMN to serve the terminal. As a result, inter-PLMN communication is caused, a data path is excessively long, and data transmission efficiency is reduced.

Figure 7:
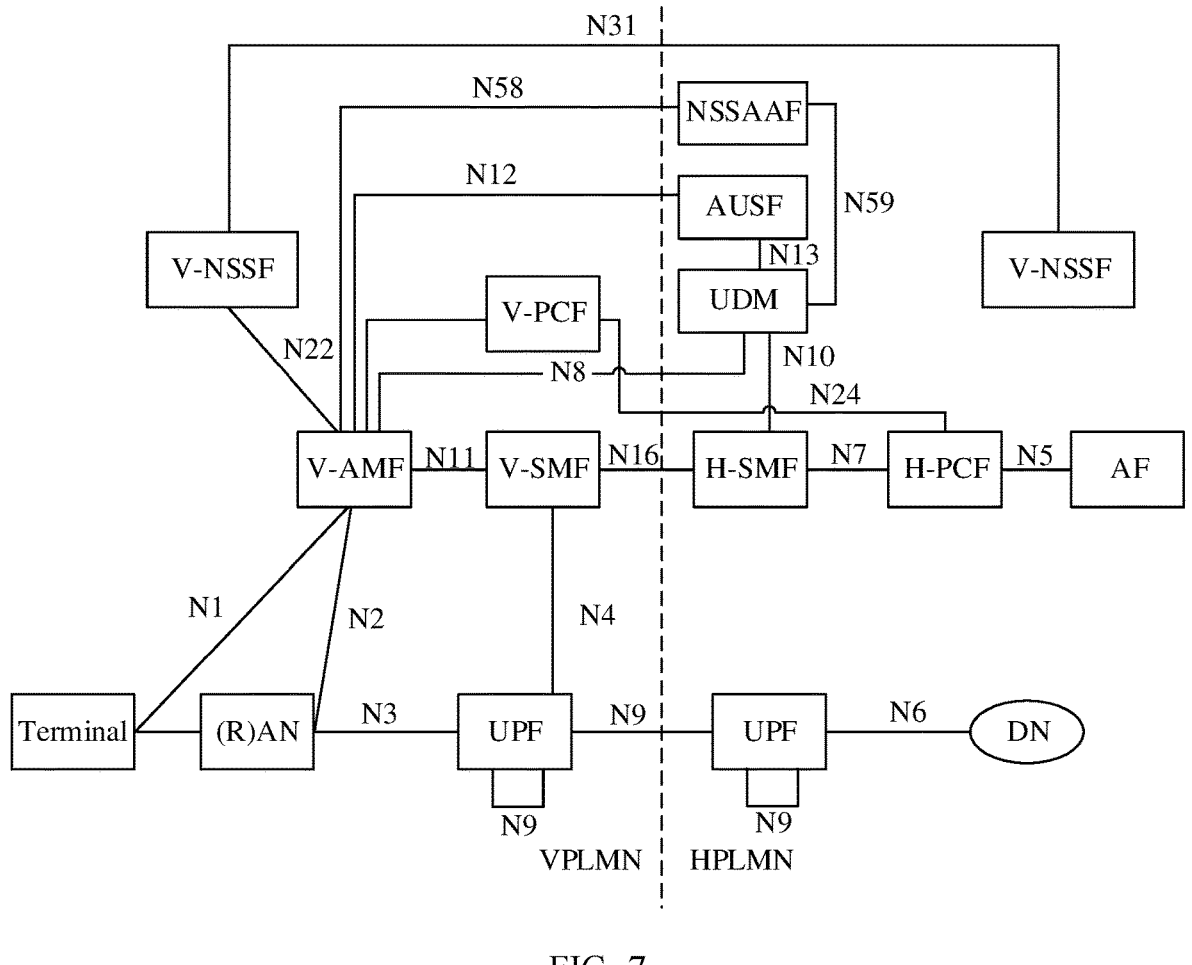
FIG. 7 is a schematic diagram 2 of a network architecture in a roaming case according to an embodiment of this application.
Figure 8:
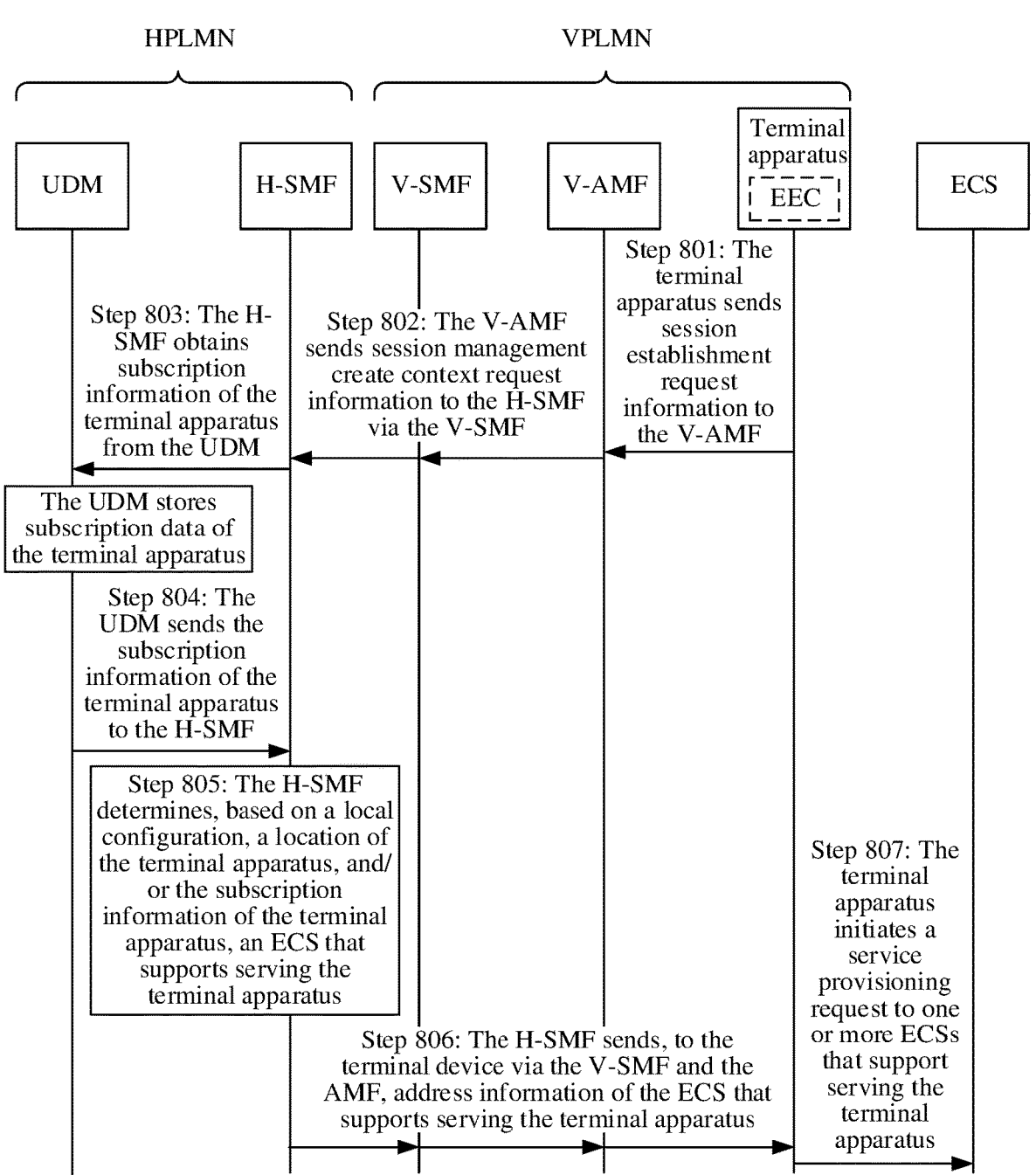
FIG. 8 is a schematic diagram 2 of a method for determining an edge configuration server in a roaming case according to an embodiment of this application.

Then, with reference to a network architecture in a roaming case shown in FIG. 7, when a type of a session established between a terminal apparatus and a network is home routed, a session management function network element in an HPLMN may determine an edge configuration server. As shown in FIG. 8, a specific process of determining the edge configuration server includes step 801 to step 807.

Step 801: The terminal apparatus sends session establishment request information to a V-AMF.

Step 802: The V-AMF sends session management create context request information (for example, sends the session management create context request information by sending Nsmf_PDUSession_CreateSMContext Request) to the H-SMF via a V-SMF.

The V-AMF represents an AMF in a VPLMN, the V-SMF represents an SMF in the VPLMN, and the H-SMF represents the SMF in the HPLMN.

Similarly, the session management create context request information includes at least one of information elements such as an SUPI, a selected DNN, a DNN requested by the terminal apparatus, S-NSSAI(s), a PDU Session ID, and an N1 SM container (namely, a session establishment request).

Step 803: The H-SMF obtains subscription information of the terminal apparatus from a UDM.

It may be understood that the subscription information of the terminal apparatus in the UDM includes identification information of an ECS that can be visited by the terminal apparatus. Optionally, the subscription information of the terminal apparatus may further include the session type, an allowed SSC mode, a default 5QI, an ARP, a session aggregate maximum bit rate subscribed by the terminal apparatus, an SMF-related external parameter, and the identification information of the ECS that can be visited by the terminal apparatus. The UDM is a UDM in the HPLMN.

Step 804: The UDM sends the subscription information of the terminal apparatus to the H-SMF.

Step 805: The H-SMF determines, based on a local configuration, a location of the terminal apparatus, and/or the subscription information of the terminal apparatus, an ECS that supports serving the terminal apparatus.

Step 806: The H-SMF sends, to the terminal apparatus via the V-SMF and the V-AMF, address information of the ECS that supports serving the terminal apparatus.

Step 807: The terminal apparatus initiates a service provisioning request to one or more ECSs that support serving the terminal apparatus.

In conclusion, currently, the ECSs that support serving the terminal apparatus and that are determined by the H-SMF are all ECSs that can serve the terminal apparatus. When there are a plurality of ECSs that support serving the terminal apparatus, a specific ECS based on which the terminal apparatus initiates an EES discovery procedure is not mentioned. Assuming that the terminal apparatus randomly selects one ECS from the plurality of ECSs, and the information about the PLMN currently accessed by the terminal apparatus is not considered, the selected edge configuration server can serve the terminal apparatus, but the edge configuration server can provide only an edge enabler server located in another PLMN to serve the terminal. As a result, inter-PLMN communication is caused, a data path is excessively long, data transmission efficiency is reduced, and service quality of the terminal apparatus cannot be ensured. For example, the terminal apparatus initiates the EES discovery process to each of the plurality of ECSs. This causes a waste of resources.

Figure 9:
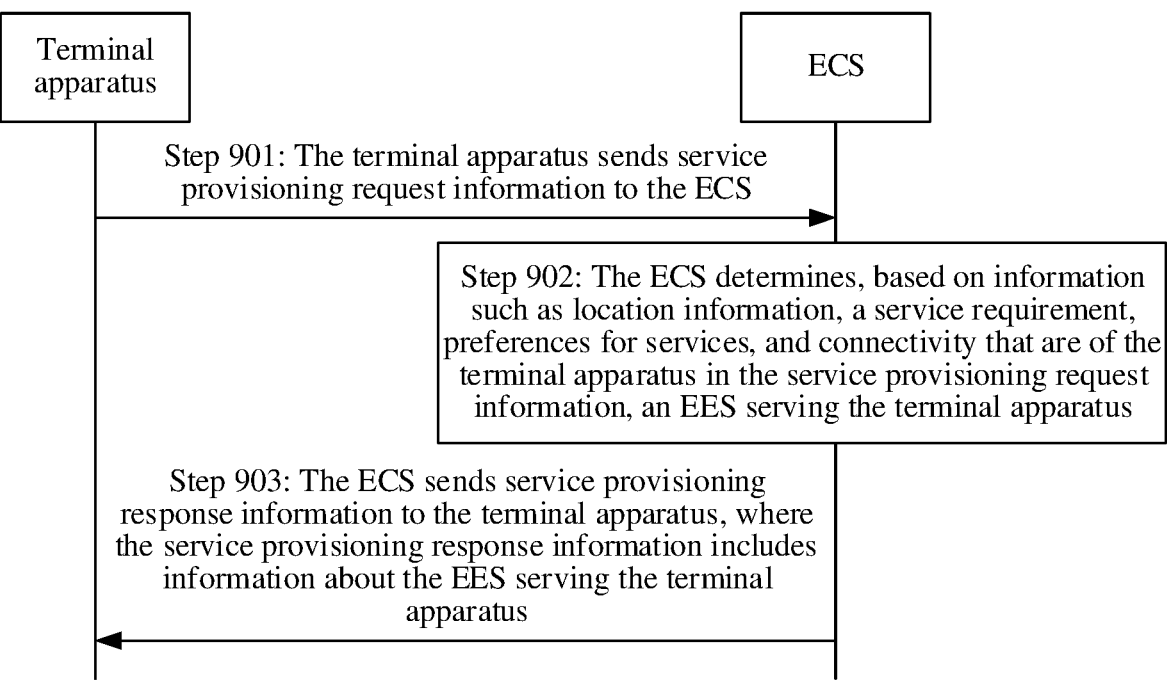
FIG. 9 is a schematic diagram of a service provisioning procedure according to an embodiment of this application.

After the terminal apparatus receives the address information of the ECS that supports serving the terminal apparatus, an EEC on the terminal apparatus initiates a service provisioning procedure to the corresponding ECS based on the address information of the ECS. Refer to FIG. 9, a service provisioning procedure includes step 901 to step 906.

Step 901: A terminal apparatus sends service provisioning request information to an ECS.

The service provisioning request information includes but is not limited to information such as location information, a service requirement, preferences for services, and connectivity that are of the terminal apparatus.

For example, Table 1 shows examples of mandatory information elements and optional information elements carried in the service provisioning request information below.

TABLE 1

| Information Element | State | Description |
|---|---|---|
| EEC ID | Mandatory M | Unique identifier of the EEC |
| Security credential | Mandatory M | Security credential generated when an edge computing service is successfully authorized |
| Application client profile | Optional O | Information about a service to which the EEC expects to connect |
| Terminal apparatus identifier | Optional O | Identifier (GPSI or identity token) of the terminal apparatus |
| Connection information | Optional O | Connection information list of the terminal apparatus, for example, a PLMN ID or an SSID |
| Terminal apparatus location | Optional O | Location information of the terminal apparatus |

It should be understood that the optional information in Table 1 may be different information carried when different functions are implemented.

Step 902: The ECS determines, based on the information such as the location information, service requirement, preferences for services, and connectivity of the terminal apparatus in the service provisioning request information, an EES serving the terminal apparatus.

Step 903: The ECS sends service provisioning response information to the terminal apparatus, where the service provisioning response information includes information about the EES serving the terminal apparatus.

For example, Table 2 shows examples of mandatory information elements and optional information elements carried in the service provisioning response information below.

TABLE 2

| Information Element | State | Description |
|---|---|---|
| Successful response | Optional O | Indicating that a service provisioning request succeeds |
| EDN configuration information list | Mandatory M | EDN list |
| EDN connection information | Mandatory M | Information required for establishing a connection between a UE and an EDN |
| DNN/APN | Mandatory M | Data network name/Access point name |
| S-NSSAI | Optional O | Network slice information |
| EDN topology service area | Optional O | Cell ID list or TAI list, where the EDN serves UEs that are in these cells and that access a core network |
| EES list | Mandatory M | EES list of the EDN |
| EES ID | Mandatory M | EES identifier |
| EES endpoint | Mandatory M | Endpoint address (for example, URI or IP address) of the EES |
| EAS ID | Optional O | EAS ID registered with the EES |
| ECSP information | Optional O | Edge computing service provider information |
| EES topology service area | Optional O | List of cell IDs (or TAIs) served by the EES, where an EEC of a UE that is connected to the core network and whose cell does not belong to the list is not served by the EES |
| EES geographic service area | Optional O | Geographic service area of the EES |
| EES DNAI list | Optional O | DNAI related to the EES/EAS, where the IE is used as a potential location of an application |
| Failure response | Optional O | Indicating that the service provisioning request fails |
| Cause | Optional O | Indicating a cause of the service provisioning request failure |

In conclusion, in the service provisioning procedure, the EES selected by the ECS for the terminal apparatus may be a different network from a network currently accessed by the terminal apparatus. For example, the terminal apparatus currently accesses a VPLMN, but the ECS selects an EES in an HPLMN for the terminal apparatus. In this way, when the terminal apparatus is in a roaming state, the terminal apparatus still needs to obtain application data from the EES in the HPLMN. This causes a waste of signaling resources. That is, a path from the terminal apparatus to the EES is not an optimal path.

An embodiment of this application provides a method for determining an edge configuration server. A core network element determines, based on a mobile network accessed by a terminal apparatus, that an edge configuration server serving the terminal apparatus is a first edge configuration server. At least one mobile network corresponding to the first edge configuration server includes the mobile network accessed by the terminal apparatus. The core network element sends, to the terminal apparatus, information indicating the first edge configuration server.

In this embodiment of this application, an example in which the mobile network is a PLMN is used for description. Alternatively, the mobile network may be a network of another type. In addition, the mobile network accessed by the terminal apparatus may be a PLMN currently accessed by the terminal apparatus, or may be understood as a PLMN that is serving the terminal apparatus. In this embodiment, information about the PLMN accessed by the terminal apparatus may be used as first information, or may be included in the first information. Edge configuration server information includes identification information of the first edge configuration server and identification information of the at least one mobile network corresponding to the first edge configuration server. The edge configuration server information may be used as second information, or may be included in the second information. The identification information may be an identifier or address information, or may be other information that may indicate the edge configuration server. The identification information included in the second information is identification information of an edge configuration server that supports serving the terminal apparatus. The identification information of the at least one mobile network corresponding to the edge configuration server may also be understood as that the identification information of the edge configuration server is corresponding to the identification information of the at least one mobile network.

The information that is sent by the core network element and that indicates the first edge configuration server may be the identification information of the first edge configuration server, for example, an identifier, address information, or other information that can indicate the configuration server. In this embodiment of this application, an example in which the address information of the first edge configuration server is sent is used for description.

An embodiment of this application provides another method for determining an edge configuration server. In this method, a terminal apparatus obtains edge configuration server information. The edge configuration server information includes identification information of at least one edge configuration server and identification information of at least one mobile network corresponding to each of the at least one edge configuration server. The terminal apparatus determines, based on a mobile network accessed by the terminal apparatus, a first edge configuration server serving the terminal apparatus in the at least one edge configuration server. At least one mobile network corresponding to the first edge configuration server includes the mobile network accessed by the terminal apparatus. Similarly, the mobile network accessed by the terminal apparatus may be first information. Refer to the descriptions about the second information in the foregoing manner. The edge configuration server information may be third information. Refer to the descriptions about the second information in the foregoing manner.

According to the technical solution provided in this embodiment of this application, an edge configuration server that is located in a same PLMN as the terminal apparatus can be selected from edge configuration servers that support serving the terminal apparatus, to ensure that an edge configuration server with higher data transmission efficiency is selected for the terminal apparatus.

An embodiment of this application further provides a method for determining an edge enabler server. A terminal apparatus initiates a service provisioning procedure to an edge configuration server. Specifically, when the terminal apparatus sends service provisioning request information to the edge configuration server, the terminal apparatus includes at least identification information of a PLMN currently accessed by the terminal apparatus in the service provisioning request information. Then, the edge configuration server selects an edge enabler server for the terminal apparatus based on the identification information of the PLMN currently accessed by the terminal apparatus. According to the technical solution provided in this embodiment of this application, an edge enabler server located in the PLMN currently accessed by the terminal apparatus can be selected to a maximum extent. In this way, when the terminal apparatus is in a roaming state, the terminal apparatus may obtain application data from an EES in the PLMN (namely, a VPLMN) currently accessed by the terminal, and the terminal apparatus does not need to obtain the application data from an EES in an HPLMN. This can save signaling resources, and ensure an optimal path between the terminal apparatus and the edge enabler server, to improve service quality of the terminal apparatus. That is, according to the technical solution provided in this embodiment of this application, it can be ensured that a more proper edge enabler server is selected for the terminal apparatus.

The method for determining an edge configuration server provided in embodiments of this application may be applied to a scenario in which a mobile network accessed by a terminal apparatus is different from a home mobile network of the terminal apparatus, for example, a roaming scenario of the terminal apparatus, or may be applied to a non-roaming scenario of the terminal apparatus. In the following embodiments, an example in which the terminal apparatus is in a roaming state is used to describe the solutions in embodiments of this application. The method for determining an edge configuration server provided in embodiments of this application may also be applied to a multi-operator scenario, for example, an inter-operator roaming scenario (referred to as a first application scenario in the following embodiments) or a roaming scenario in which a public cloud cooperates with an operator (referred to as a second application scenario in the following embodiments).

Figure 10:
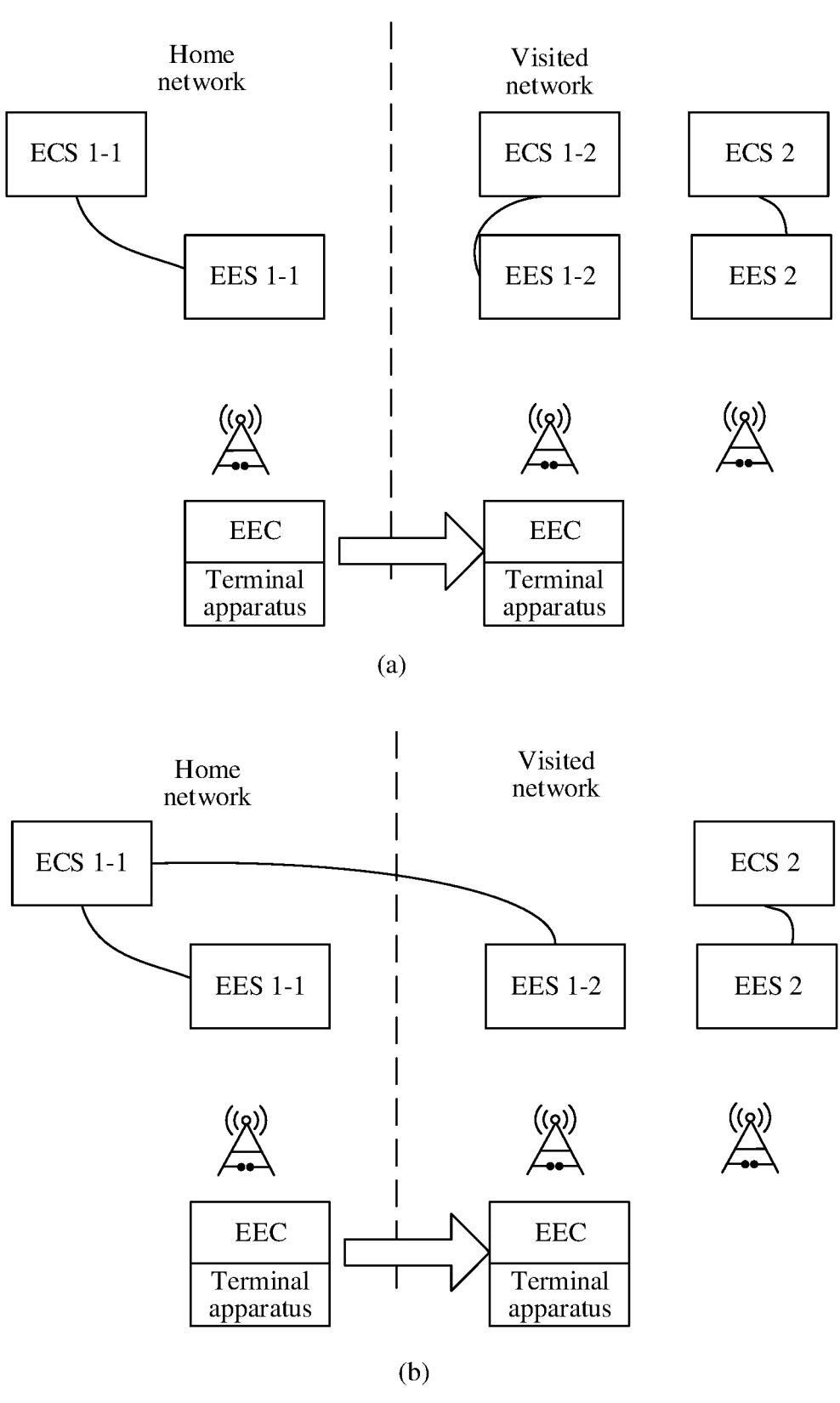
FIG. 10 is a schematic diagram of network deployment in a multi-operator fixed-mobile convergence scenario according to an embodiment of this application.

FIG. 10 is an example of network deployment in the first application scenario according to an embodiment of this application. An MNO 1 is a home operator of a terminal apparatus, and may be understood as a local operator in a home network of the terminal apparatus. An MNO 2 is a visited operator of the terminal apparatus, and may be understood as a local carrier in a visited network.

It should be understood that, an ECS and EES of the MNO 1 in the home network are deployed and managed by the MNO 1. In the visited network, the MNO 1 may also deploy the ECS and EES of the MNO 1. Specifically, the MNO 1 may lease an edge infrastructure in the visited network to deploy the ECS and EES of the MNO 1, which are managed by the MNO 1. An ECS and EES of the MNO 2 in the visited network are deployed and managed by the MNO 2.

For the schematic diagram of the network deployment shown in (a) in FIG. 10, an ECS 1-1 is an ECS that belongs to the MNO 1 and that is deployed in the home network (namely, an HPLMN) of the terminal apparatus. Correspondingly, an EES 1-1 is an EES that is deployed in the home network and that belongs to the MNO 1, and the ECS and EES of the MNO 1, for example, an ECS 1-2 and an EES 1-2 in (a) in FIG. 10, are deployed in the visited network (namely, a VPLMN). The ECS 1-2 is an ECS that is deployed in the visited network and that belongs to the MNO 1, and correspondingly, the EES 1-2 is an EES that is deployed in the visited network and that belongs to the MNO 1. In (a) in FIG. 10, an ECS 2 is an ECS that is deployed in the visited network and that belongs to the MNO 2, and correspondingly, an EES 2 is an EES that is deployed in the visited network and that belongs to the MNO 2. The EES may be visited and/or managed by the ECS, and may also be referred to as the EES corresponding to the ECS. The ECS 1-1 in (a) in FIG. 10 may control and manage the EES 1-1, the ECS 1-2 may control and manage the EES 1-2, and the ECS 2 may control and manage the EES 2.

Optionally, in actual deployment, the ECS and the EES of the MNO 1 may not be deployed in the visited network.

It should be noted that, for the network deployment in the first application scenario shown in (a) in FIG. 10, the ECS belonging to the MON 1 in the home network does not support discovery of the EES belonging to the MON 1 in the visited network. That is, the ECS belonging to the MON 1 in the home network does not have right or capability to control and manage the EES belonging to the MON 1 in the visited network. For example, the ECS 1-1 in (a) in FIG. 10 does not support discovery of the EES 1-2. That is, the ECS 1-1 cannot control and manage the EES 1-2.

Optionally, in a case, the network deployment in the first application scenario may be (b) in FIG. 10. In (b) in FIG. 10, an ECS 1-1 is an ECS that belongs to the MNO 1 and that is deployed in the home network (namely, an HPLMN) of the terminal apparatus. Correspondingly, an EES 1-1 is an EES that belongs to the MNO 1 and that is deployed in the home network. An EES of the MNO 1 is deployed in the visited network (namely, a VPLMN), for example, an EES 1-2 in (b) in FIG. 10. That is, the EES 1-2 is an EES that belongs to the MNO 1 and that is deployed in the visited network. It should be noted that the ECS of the MON 1 is not deployed in the visited network. In (b) in FIG. 10, an ECS 2 is an ECS that is deployed in the visited network and that belongs to the MNO 2, and correspondingly, an EES 2 is an EES that is deployed in the visited network and that belongs to the MNO 2.

The ECS 1-1 in (b) in FIG. 10 may control and manage the EES 1-1 and the EES 1-2, an ECS 1-2 may control and manage the EES 1-2, and the ECS 2 may control and manage EES 2.

It should be noted that, for the network deployment in the first application scenario shown in (b) in FIG. 10, the ECS belonging to the MON 1 is not deployed in the visited network. In this case, the EES belonging to the MON 1 in the visited network is controlled and managed by the ECS belonging to the MON 1 in the home network. That is, the ECS belonging to the MON 1 in the home network supports discovery of the EES belonging to the MON 1 in the visited network. That is, the ECS belonging to the MON 1 in the home network has a right or capability to control and manage the EES belonging to the MON 1 in the visited network. For example, the ECS 1-1 in (b) in FIG. 10 supports discovery of the EES 1-2. That is, ECS 1-1 may control and manage the EES 1-2.

The following further describes the solutions of this application by using other embodiments. In the following embodiment, address information of an ECS is used as identification information for description, and identification information of a PLMN corresponding to the address information may also be understood as identification information of a PLMN corresponding to the ECS.

Figure 11:
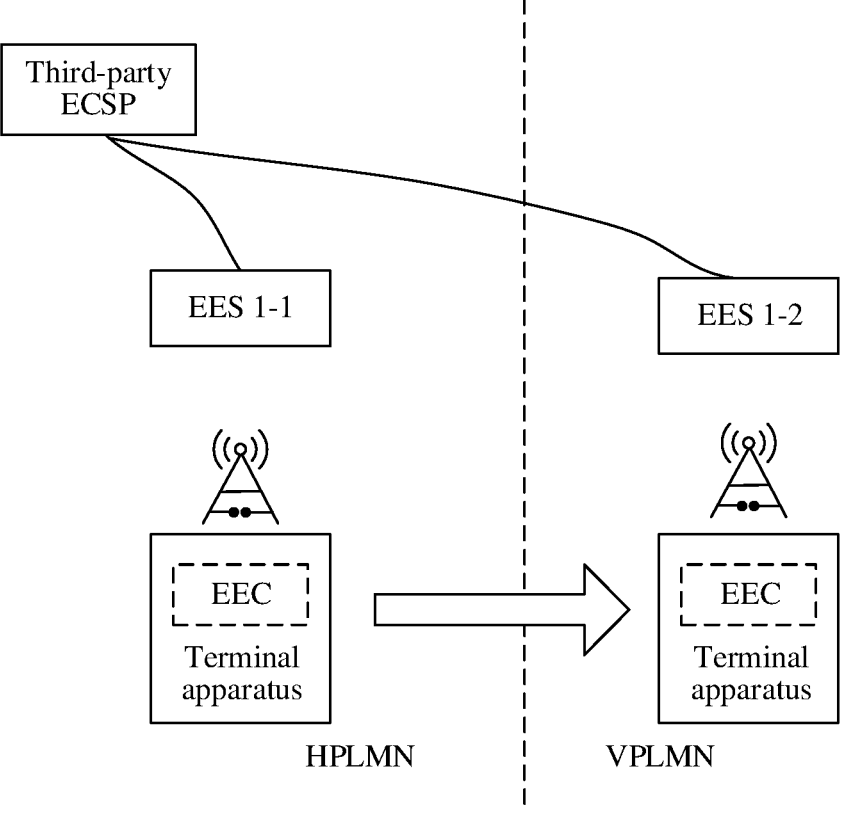
FIG. 11 is a schematic diagram of network deployment in a scenario in which a public cloud cooperates with an operator according to an embodiment of this application.

FIG. 11 is an example of network deployment in the second application scenario according to an embodiment of this application. The scenario is a scenario in which a third-party ECS provider (ECSP) cooperates with an operator, that is, different operators share an ECS of the third-party ECSP. An EES 1-1 in FIG. 11 is an EES that belongs to an MNO 1 and that is deployed in a home network of a terminal apparatus, and an EES 1-2 is an EES that belongs to the MNO 1 and that is deployed in a visited network of the terminal apparatus.

In the scenario shown in FIG. 11, the ECS of the third-party ECSP may control and manage the EES deployed by the MNO 1 in the home network and the EES deployed by the MNO 1 in the visited network.

Based on the edge application architecture, the architecture of the 5G communication system, and the foregoing two application scenarios described in the foregoing embodiments, a core network element may determine an edge configuration server (referred to as a first edge configuration server below) serving a terminal apparatus. Then, the core network element sends address information of the first edge configuration server to the terminal apparatus. Alternatively, the terminal apparatus may determine the edge configuration server serving the terminal apparatus.

1: The core network element determines the first edge configuration server

Figure 12A:
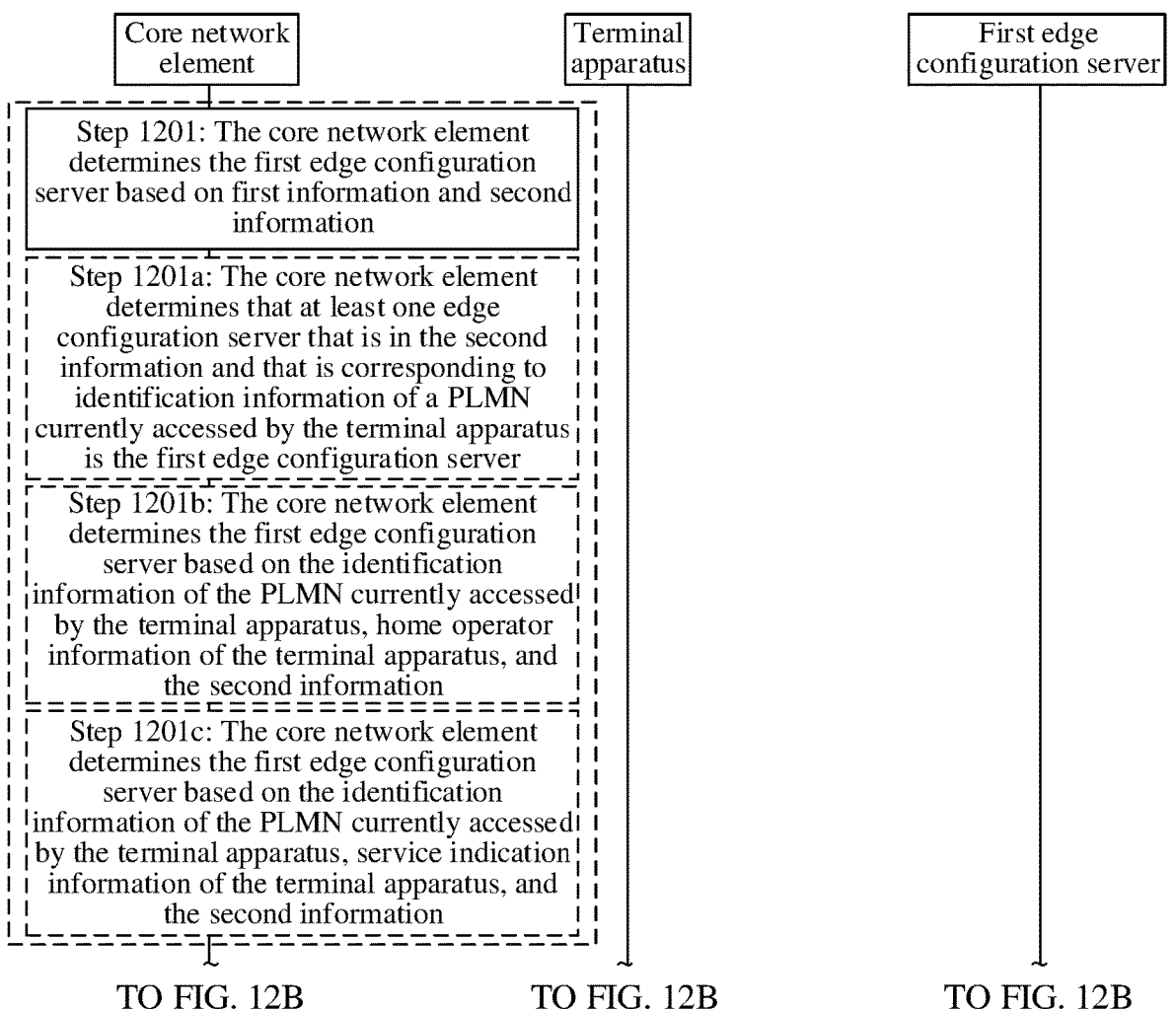
FIG. 12A and FIG. 12B are a schematic diagram 1 of a method for determining an edge configuration server according to an embodiment of this application.
Figure 12B:
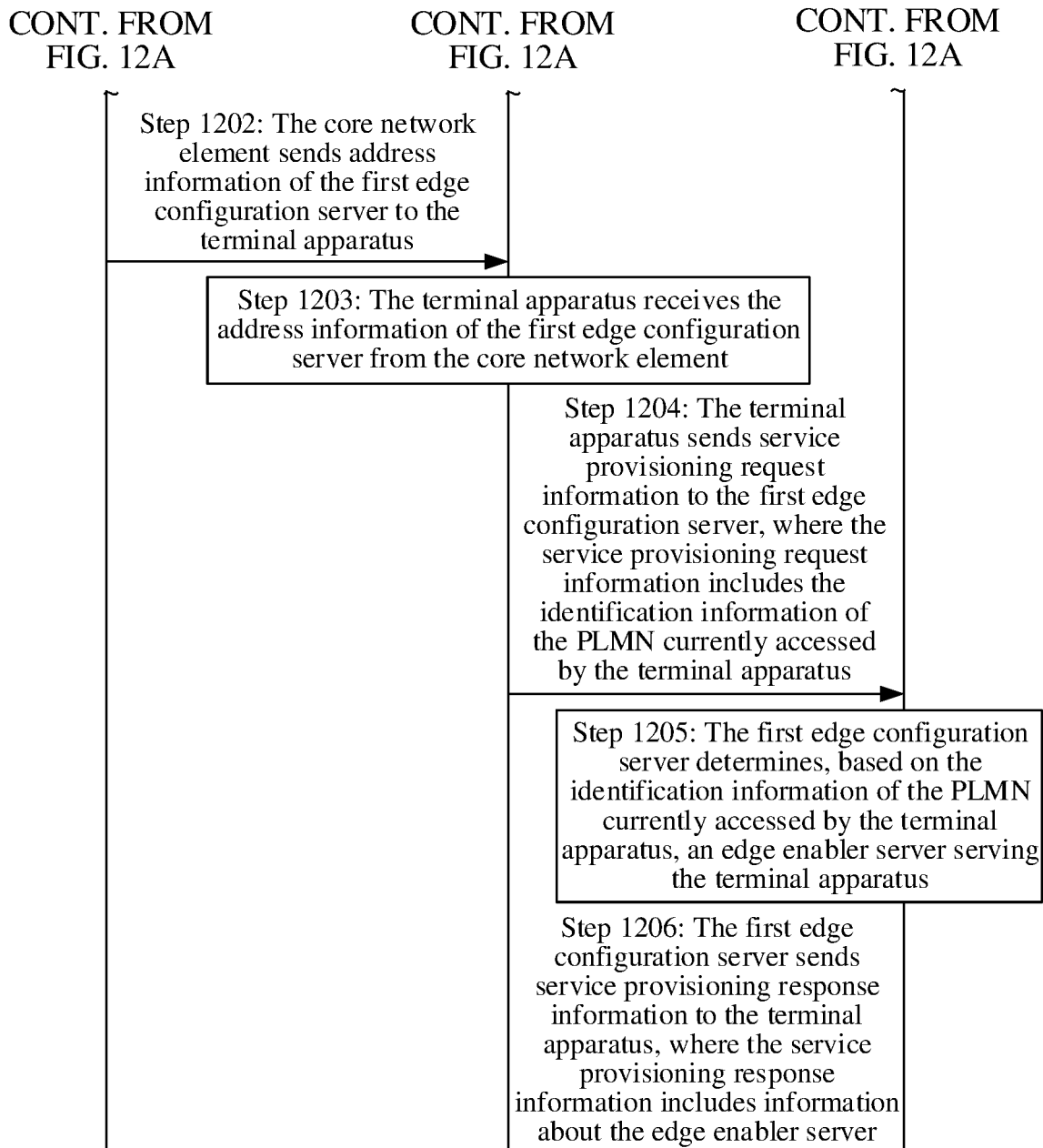

FIG. 12A and FIG. 12B show a method for determining an edge configuration server according to an embodiment of this application. The method includes step 1201 to step 1206.

Step 1201: A core network element determines a first edge configuration server based on first information and second information.

The first information includes identification information of a PLMN currently accessed by a terminal apparatus. The core network element may further obtain second information. The second information may include address information of an edge configuration server that supports serving the terminal apparatus and identification information of a PLMN corresponding to the address information.

Optionally, the address information of the edge configuration server includes but is not limited to one of an IP address of the edge configuration server, a uniform resource locator (URL), or a fully qualified domain name (FQDN).

In this embodiment of this application, the edge configuration server that supports serving the terminal apparatus may include an edge configuration server in a PLMN currently accessed by the terminal apparatus. When the terminal apparatus is in a roaming state, the edge configuration server that supports serving the terminal apparatus may further include an edge configuration server in an HPLMN of the terminal apparatus. In addition, at least one edge enabler server corresponding to the edge configuration server supports serving the terminal apparatus.

In this embodiment of this application, the core network element may obtain the second information. The second information may be from local configuration information of a unified data management function network element, and specifically, may be from subscription information or steering of roaming information in the local configuration information. Alternatively, the second information is from mapping information determined by a session management function network element, or is from policy information determined by a policy control function network element, and specifically, may be from an access network discovery and selection policy (ANDSP) or a route selection policy (URSP) in the policy information.

Figure 13A:
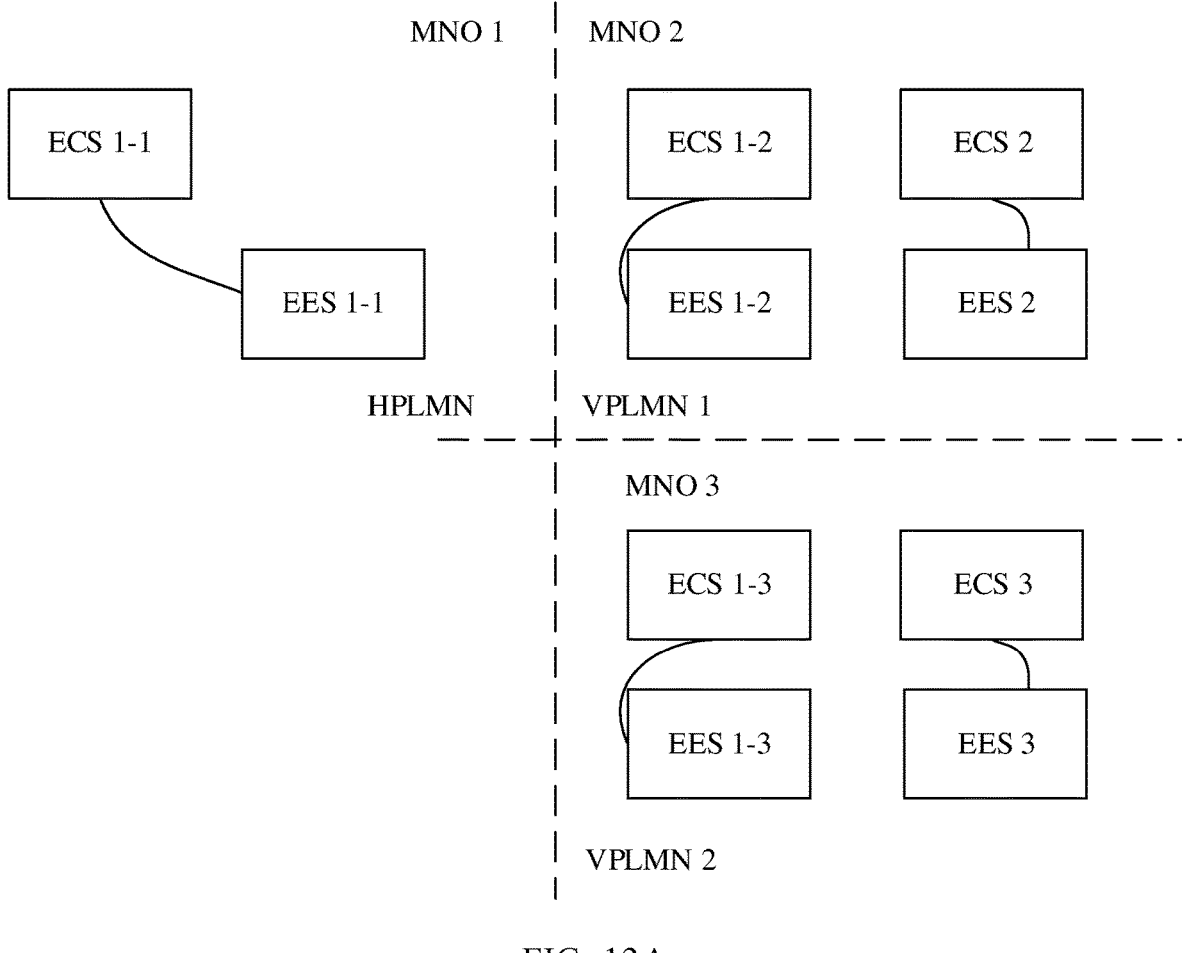
FIG. 13A is a schematic diagram 1 of network deployment according to an embodiment of this application.

In an example, the foregoing first application scenario (namely, the inter-operator roaming scenario) is used as an example. An MNO 1 is a home operator of the terminal apparatus, and an MNO 2 and an MNO 3 are roaming operators of the terminal apparatus. Refer to FIG. 13A. The MNO 1 deploys an ECS and a corresponding EES in a visited network 1 (denoted as a VPLMN 1), and the MNO 1 deploys an ECS and a corresponding EES in a visited network 2 (denoted as a VPLMN 2). As shown in FIG. 13A, an ECS deployed by the MNO 1 in an HPLMN of the terminal apparatus is denoted as ECS 1-1, a corresponding EES is denoted as EES 1-1, the ECS deployed by the MNO 1 in the VPLMN 1 is denoted as ECS 1-2, the corresponding EES is denoted as EES 1-2, the ECS deployed by the MNO 1 in the VPLMN 2 is denoted as ECS 1-3, the corresponding EES is denoted as EES 1-3, an ECS deployed by the MNO 2 in the VPLMN 1 is denoted as ECS 2, a corresponding EES is denoted as EES 2, an ECS deployed by the MNO 3 in the VPLMN 2 is denoted as ECS 3, and a corresponding EES is denoted as EES 3.

It may be understood that, the ECS 1-1 in the HPLMN may visit and/or manage the EES 1-1 deployed in the HPLMN, the ECS 1-2 in the VPLMN 1 may visit and/or manage the EES 1-2 in the VPLMN 1, and the ECS 1-3 in the VPLMN 2 may visit and/or manage the EES 1-3 in the VPLMN 2.

It should be noted that, because an edge configuration server in the HPLMN of the terminal apparatus does not support discovery of an edge enabler server in the VPLMN of the terminal apparatus, the ECS 1-1 in the HPLMN does not support discovery of the EES 1-2 deployed by the MNO 1 in the VPLMN 1. That is, the ECS 1-1 cannot visit and/or manage the EES 1-2 deployed in the VPLMN 1. Similarly, the ECS 1-1 cannot visit and/or manage the EES 1-3 deployed in the VPLMN 2 either.

With reference to a scenario shown in FIG. 13A, in an example, when the terminal apparatus currently accesses the VPLMN 1, a correspondence between the address information of the ECS in the second information and the identification information of the PLMN corresponding to the address information is shown in Table 3.

TABLE 3

| Address information of the ECS | Identification Information of the PLMN (PLMN ID) |
| --- | --- |
| Address information of the ECS 1-1 | Identification information of the HPLMN |

TABLE 3-continued

| Address information of the ECS | Identification Information of the PLMN (PLMN ID) |
| --- | --- |
| Address information of the ECS 1-2 | Identification information of the VPLMN 1 |
| Address information of the ECS 2 | Identification information of the VPLMN 1 |

It may be learned with reference to Table 3 that, because the ECS 1-1 can visit and/or manage only the EES 1-1, but cannot visit the EES 1-2 and the EES 1-3, in the second information shown in Table 3, the address information of the ECS 1-1 is corresponding only to the identification information of the HPLMN, indicating that the ECS in the HPLMN can visit and/or manage only the EES in the HPLMN. The ECS 1-3 and the ECS 3 in FIG. 13A are ECSs in another VPLMN, and do not support serving the terminal.

Figure 13B:
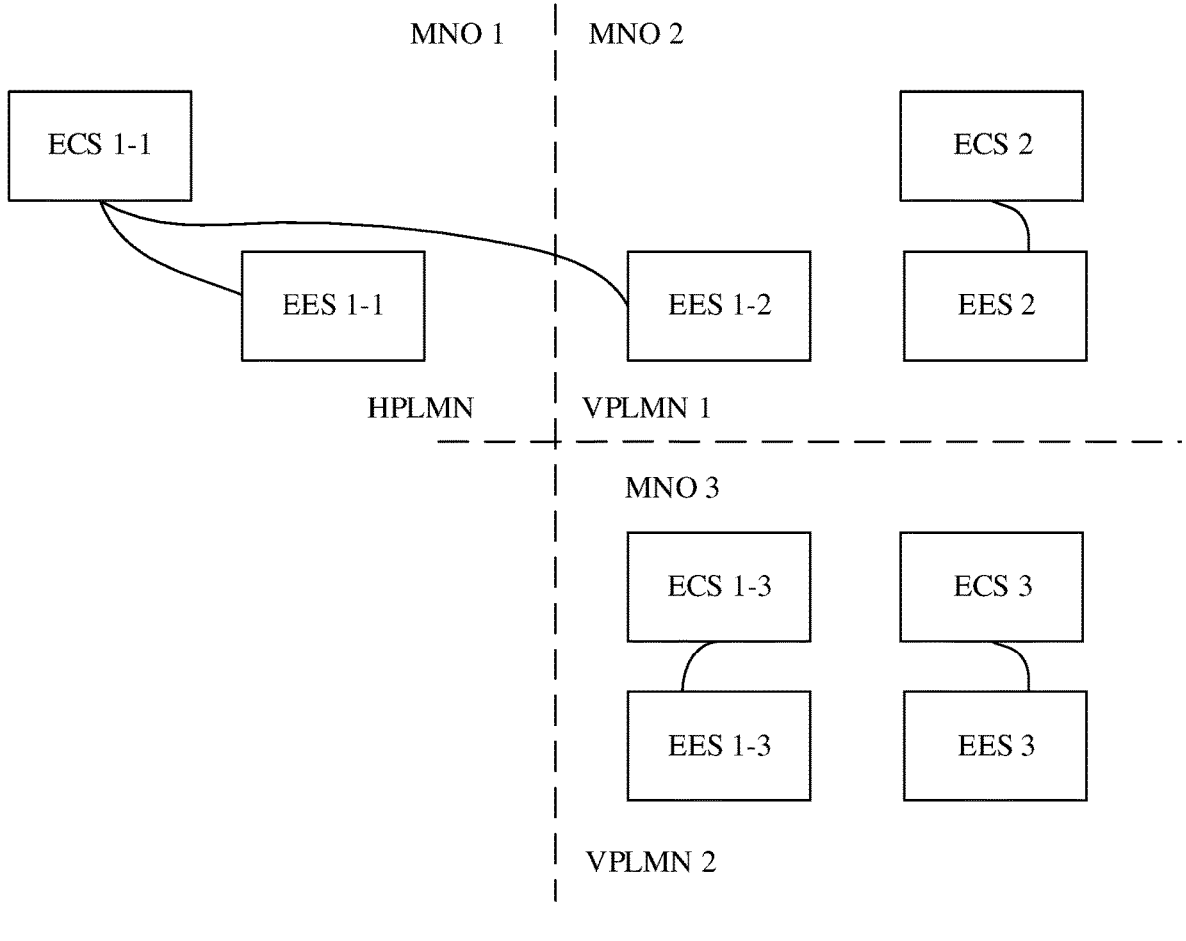
FIG. 13B is a schematic diagram 2 of network deployment according to an embodiment of this application.

In another example, the foregoing first application scenario (namely, the inter-operator roaming scenario) is used as an example. An MNO 1 is a home operator of the terminal apparatus, and an MNO 2 and an MNO 3 are roaming operators of the terminal apparatus. Refer to FIG. 13B. The MNO 1 deploys an EES but does not deploy an ECS in a visited network 1 (denoted as a VPLMN 1), and the MNO 1 deploys an EES and an ECS in a visited network 2 (denoted as a VPLMN 2). As shown in FIG. 13B, an ECS deployed by the MNO 1 in an HPLMN of the terminal apparatus is denoted as ECS 1-1, a corresponding EES is denoted as EES 1-1, the EES deployed by the MNO 1 in the VPLMN 1 is denoted as EES 1-2, the ECS deployed by the MNO 1 in the VPLMN 2 is denoted as ECS 1-3, the corresponding EES is denoted as EES 1-3, an ECS deployed by the MNO 2 in the VPLMN 1 is denoted as ECS 2, a corresponding EES is denoted as EES 2, an ECS deployed by the MNO 3 in the VPLMN 2 is denoted as ECS 3, and a corresponding EES is denoted as EES 3.

It may be understood that the ECS 1-1 in the HPLMN may visit and/or manage the EES 1-1 deployed in the HPLMN, and may also visit and/or manage the EES 1-2 deployed in the VPLMN 1. The ECS 2 in the VPLMN 1 may visit and/or manage the EES 2 in the VPLMN 1. The ECS 3 in the VPLMN 2 may visit and manage the EES 3 in the VPLMN 2. The ECS 1-3 in the VPLMN 2 may visit and manage the EES 1-3 deployed in the VPLMN 2.

With reference to a scenario shown in FIG. 13B, in an example, when the terminal apparatus currently accesses the VPLMN 1, a correspondence between the address information of the ECS in the second information and the identification information of the PLMN corresponding to the address information is shown in Table 4(a).

TABLE 4(a)

| Address information of the ECS | Identification Information of the PLMN (PLMN ID) |
| --- | --- |
| Address information of the ECS 1-1 | Identification information of the HPLMN Identification information of the VPLMN 1 |
| Address information of the ECS 2 | Identification information of the VPLMN 1 |

With reference to the scenario shown in FIG. 13B, in another example, when the terminal apparatus currently accesses the VPLMN 2, a correspondence between the address information of the ECS in the second information and the identification information of the PLMN corresponding to the address information is shown in Table 4(b). The identification information of the VPLMN 1 corresponding to the address information of the ECS 1-1 is optional.

TABLE 4(b)

| Address information of the ECS | Identification Information of the PLMN (PLMN ID) |
| --- | --- |
| Address information of the ECS 1-1 | Identification information of the HPLMN Identification information of the VPLMN 1 (optional) |
| Address information of the ECS 1-3 | Identification information of the VPLMN 2 |
| Address information of the ECS 3 | Identification information of the VPLMN 2 |

Figure 13C:
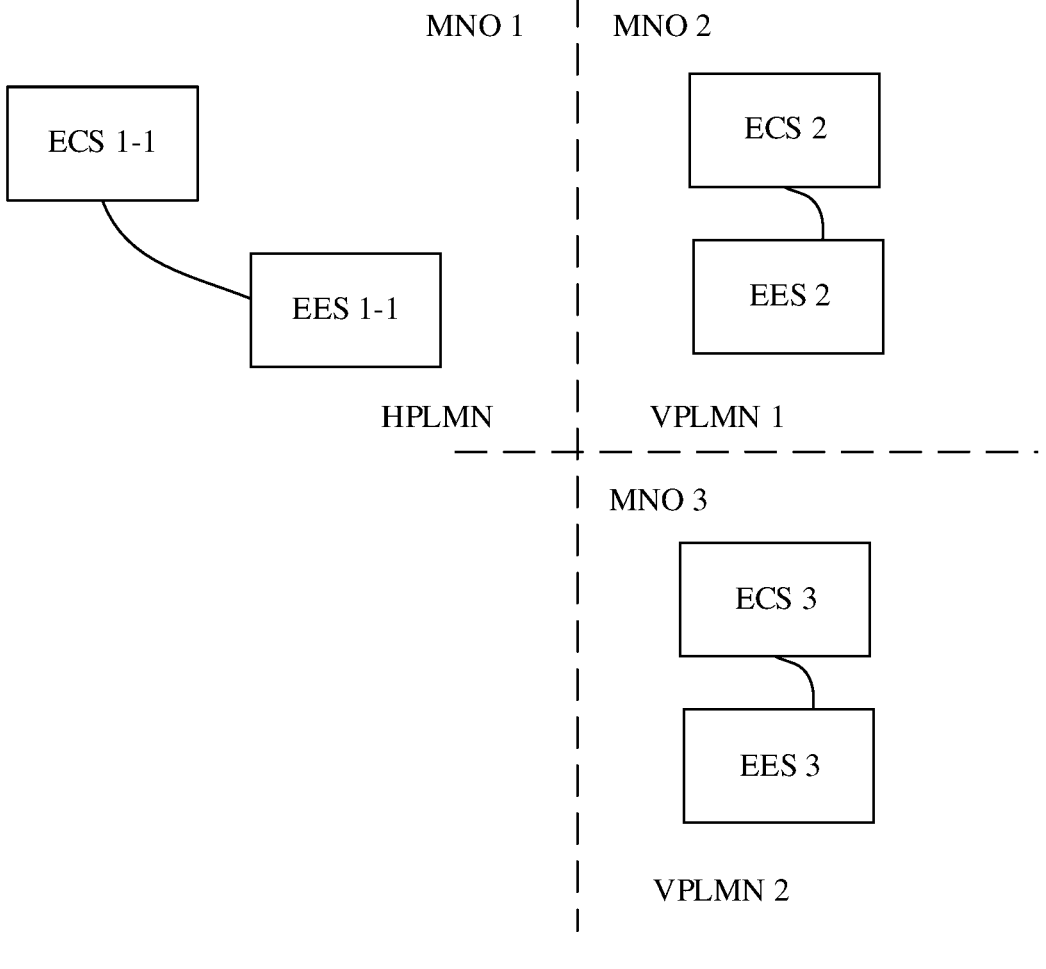
FIG. 13C is a schematic diagram 3 of network deployment according to an embodiment of this application.

In still another example, the foregoing first application scenario (namely, the inter-operator roaming scenario) is used as an example. An MNO 1 is a home operator of the terminal apparatus, and an MNO 2 is a roaming operator of the terminal apparatus. Refer to FIG. 13C. The MNO 1 does not deploy an ECS and an EES in a VPLMN 1 or a VPLMN 2. As shown in FIG. 13C, an ECS deployed by the MNO 1 in an HPLMN of the terminal apparatus is denoted as an ECS 1, an ECS deployed by the MNO 2 in the VPLMN 1 is denoted as an ECS 2, and an ECS deployed by an MNO 3 in the VPLMN 2 is recorded as ECS 3. In this scenario, in an example, when the terminal apparatus currently accesses the VPLMN 1, a correspondence between the address information of the ECS in the second information and the identification information of the PLMN corresponding to the address information is shown in Table 5.

TABLE 5

| Address information of the ECS | Identification Information of the PLMN (PLMN ID) |
| --- | --- |
| Address information of the ECS 1 | Identification information of the HPLMN |
| Address information of the ECS 2 | Identification information of the VPLMN 1 |

Optionally, the identification information of the PLMN in the second information includes identification information of a VPLMN currently accessed by the terminal apparatus. With reference to FIG. 12A and FIG. 12B, step 1201 may be implemented by performing step 1201a.

Step 1201a: The core network element determines that at least one edge configuration server that is in the second information and that is corresponding to the identification information of the PLMN currently accessed by the terminal apparatus is the first edge configuration server.

For example, in the scenario in FIG. 13A, the terminal apparatus is currently in the roaming state, and the terminal apparatus is located in the VPLMN 1. That is, the PLMN currently accessed by the terminal apparatus is the VPLMN 1. With reference to Table 3, determined edge configuration servers corresponding to the identification information of the PLMN currently accessed by the terminal apparatus are the ECS 1-2 and the ECS 2. The core network element may determine any one of the ECS 1-2 and the ECS 2 as the first edge configuration server. Alternatively, a plurality of ECSs may be determined as first edge configuration servers, which are randomly selected by the terminal or selected based on information such as the home operator or a service type.

For the scenario in FIG. 13B, the terminal apparatus is currently in the roaming state, and the terminal apparatus is located in the VPLMN 1. That is, the PLMN currently accessed by the terminal apparatus is the VPLMN 1. With reference to Table 4(a), determined edge configuration servers corresponding to the identification information of the PLMN currently accessed by the terminal apparatus are the ECS 1-1 and the ECS 2. The core network element may determine either of the ECS 1-1 and the ECS 2 as the first edge configuration server. Alternatively, a plurality of ECSs may be determined as first edge configuration servers, which are randomly selected by the terminal or selected based on information such as the home operator or a service type.

In addition, for the scenario in FIG. 13B, when the PLMN currently accessed by the terminal is the VPLMN 2, with reference to Table 4(b), determined edge configuration servers corresponding to the identification information of the PLMN currently accessed by the terminal apparatus are the ECS 1-1, the ECS 1-3, and the ECS 3. The core network element may determine any one of the ECS 1-1, the ECS 1-3, and the ECS 3 as the first edge configuration server. Alternatively, a plurality of ECSs may be determined as first edge configuration servers, which are randomly selected by the terminal or selected based on information such as the home operator or a service type. In this way, selection of the ECS and the EES in the HPLMN can be avoided, and establishment of an inefficient data transmission path for the UE is further avoided, so that data transmission efficiency is improved.

For the scenario in FIG. 13C, the terminal apparatus is currently in the roaming state, and the terminal apparatus is located in the VPLMN 1. That is, the PLMN currently accessed by the terminal apparatus is the VPLMN 1. With reference to Table 5, a determined edge configuration server corresponding to the identification information of the PLMN currently accessed by the terminal apparatus is the ECS 2. That is, the first edge configuration server may include the ECS 2.

With reference to the descriptions of the foregoing embodiments, it may be learned that one or more first edge configuration servers may be determined by the core network element for the terminal apparatus, and a quantity of the first edge configuration servers is related to a network deployment status. The quantity of first edge configuration servers is not limited in this embodiment of this application.

Optionally, the first information further includes at least one of home operator information of the terminal apparatus and service indication information of the terminal apparatus. In this case, the core network element may determine the first edge configuration server based on the identification information of the PLMN currently accessed by the terminal apparatus, the second information, and the at least one of the home operator information and service indication information of the terminal apparatus.

When the first information includes the identification information of the PLMN currently accessed by the terminal apparatus and the home operator information of the terminal apparatus, step 1201 is implemented by performing step 1201b.

Step 1201b: The core network element determines the first edge configuration server based on the identification information of the PLMN currently accessed by the terminal apparatus, the home operator information of the terminal apparatus, and the second information.

Optionally, the second information may further include information about an operator corresponding to an edge configuration server serving the terminal apparatus.

In an implementation, the core network element determines that at least one edge configuration server that is in the second information and that is corresponding to the identification information of the PLMN currently accessed by the terminal apparatus is a candidate edge configuration server. Then, the core network element determines, based on the home operator information of the terminal apparatus, that an edge configuration server that is in the candidate edge configuration server and that belongs to a home operator of the terminal apparatus is the first edge configuration server.

The scenario in FIG. 13A is used as an example. The candidate edge configuration server determined based on the second information and the identification information of the PLMN currently accessed by the terminal apparatus includes the ECS 1-2 and the ECS 2, and the home operator of the terminal apparatus is an MNO 1. Because the ECS 1-2 in the two ECSs belongs to the MNO 1, the core network element determines the ECS 1-2 in the two candidate edge configuration servers as the first edge configuration server.

For example, in the scenario in FIG. 13B, the terminal apparatus currently accesses the VPLMN 1. The candidate edge configuration server determined based on the second information and the identification information of the PLMN currently accessed by the terminal apparatus includes the ECS 1-1 and the ECS 2, and the home operator of the terminal apparatus is an MON 1. Because the ECS 1-1 in the two ECSs belongs to the MON 1, the core network element determines the ECS 1-1 in the two candidate edge configuration servers as the first edge configuration server. For example, the terminal apparatus currently accesses the VPLMN 2. The candidate edge configuration server determined based on the second information and the identification information of the PLMN currently accessed by the terminal apparatus includes the ECS 1-3 and the ECS 3, and the home operator of the terminal apparatus is an MON 1. Because the ECS 1-3 in the two ECSs belong to the MON 1, the core network element determines the ECS 1-3 in the two candidate edge configuration servers as the first edge configuration server.

In another implementation, the core network element determines, based on the home operator information of the terminal apparatus, that at least one edge configuration server that belongs to a home operator of the terminal apparatus and that is in the second information is the candidate edge configuration server. Then, the core network element determines that an edge configuration server that is in the candidate edge configuration server and that is corresponding to the identification information of the PLMN currently accessed by the terminal apparatus is the first edge configuration server.

It should be understood that the first edge configuration servers determined in the foregoing two implementations of step 1201b are the same.

Similarly, optionally, the core network element may alternatively determine, based on the identification information of the PLMN currently accessed by the terminal apparatus, at least one edge configuration server that is in the second information and that is corresponding to the identification information of the PLMN currently accessed by the terminal apparatus; and determine, based on the home operator information of the terminal apparatus, at least one edge configuration server that belongs to the home operator of the terminal apparatus and that is in the second information, to determine that an edge configuration server that belongs to the home operator of the terminal apparatus and that is corresponding to the identification information of the PLMN currently accessed by the terminal apparatus is the first edge configuration server.

For example, in the scenario in FIG. 13B, the terminal apparatus currently accesses the VPLMN 1. The candidate edge configuration server determined based on the second information and the identification information of the PLMN currently accessed by the terminal apparatus includes the ECS 1-1 and the ECS 2, and the terminal apparatus is located in the VPLMN 1. Because the ECS 2 in the two ECSs is located in the VPLMN 1, the core network element determines the ECS 2 in the two candidate edge configuration servers as the first edge configuration server.

When the first information includes the identification information of the PLMN currently accessed by the terminal apparatus and the service indication information of the terminal apparatus, step 1201 is implemented by performing step 1201c.

Step 1201c: The core network element determines the first edge configuration server based on the identification information of the PLMN currently accessed by the terminal apparatus, the service indication information of the terminal apparatus, and the second information.

Optionally, the service indication information of the terminal apparatus may include service type indication information and/or service quality indication information, and the like. The service type indication information indicates a current service type of the terminal apparatus, for example, a video service, an internet of vehicles service, or a game service. The service quality indication information indicates a requirement of service quality of the terminal apparatus. For example, the service quality indication information indicates QoS information of a service of the terminal apparatus.

Optionally, the second information may further include service capability information of an edge configuration server serving the terminal apparatus, that is, a service type supported by the edge configuration server.

In an implementation, the core network element determines that at least one edge configuration server that is in the second information and that is corresponding to the identification information of the PLMN currently accessed by the terminal apparatus is a candidate edge configuration server. Then, the core network element determines, based on the service indication information of the terminal apparatus, that an edge configuration server that meets a service requirement of the terminal apparatus and that is in the candidate edge configuration server is the first edge configuration server. In addition, whether the ECS supports the service type depends on whether an EES corresponding to the ECS supports the service type.

For example, the scenario in FIG. 13A is used as an example. The candidate edge configuration server determined based on the second information and the identification information of the PLMN currently accessed by the terminal apparatus includes the ECS 1-2 and the ECS 2. It is assumed that a current service of the terminal apparatus is the game service (namely, the service indication information of the terminal apparatus), a service supported by the ECS 1-2 is the internet of vehicles service, and a service that can be provided by the ECS 2 is the game service. In this case, the core network element determines, in the two candidate edge configuration servers, the ECS 2 that can provide the internet of vehicles service as the first edge configuration server.

For example, in the scenario in FIG. 13B, the terminal apparatus currently accesses the VPLMN 1. The candidate edge configuration server determined based on the second information and the identification information of the PLMN currently accessed by the terminal apparatus includes the ECS 1-1 and the ECS 2. It is assumed that a current service of the terminal apparatus is the video service (namely, the service indication information of the terminal apparatus), a service that can be provided by the ECS 1-1 is the video service, and a service that can be provided by the ECS 2 is the game service. In this case, the core network element determines, in the two candidate edge configuration servers, the ECS 1-1 that can provide the video service as the first edge configuration server.

In another implementation, the core network element may alternatively first determine, based on the service indication information of the terminal apparatus, that at least one edge configuration server that is in the second information and that meets a service requirement of the terminal apparatus is a candidate edge configuration server. Then, the core network element determines that an edge configuration server that is in the candidate edge configuration server and that is corresponding to the identification information of the PLMN currently accessed by the terminal apparatus is the first edge configuration server.

It should be understood that the first edge configuration servers determined in the foregoing two implementations of step 1201c are the same.

Optionally, the core network element may alternatively determine, based on the identification information of the PLMN currently accessed by the terminal apparatus, at least one edge configuration server that is in the second information and that is corresponding to the identification information of the PLMN currently accessed by the terminal apparatus; and determine, based on the service indication information of the terminal apparatus, at least one edge configuration server that meets the service requirement of the terminal apparatus and that is in the second information, to determine that an edge configuration server that meets the service requirement of the terminal apparatus and that is corresponding to the identification information of the PLMN currently accessed by the terminal apparatus is the first edge configuration server.

Optionally, the core network element may determine the first edge configuration server based on the home operator information of the terminal apparatus, the service indication information, the identification information of the PLMN currently accessed by the terminal apparatus, and the second information. In this case, the first edge configuration server needs to meet the following three conditions at the same time: The first edge configuration server belongs to the home operator of the terminal apparatus, the first edge configuration server meets the service requirement of the terminal apparatus, and the first edge configuration server is located in the PLMN currently accessed by the terminal apparatus.

Step 1202: The core network element sends address information of the first edge configuration server to the terminal apparatus.

Step 1203: The terminal apparatus receives the address information of the first edge configuration server from the core network element.

Step 1204: The terminal apparatus sends service provisioning request information to the first edge configuration server, where the service provisioning request information includes the identification information of the PLMN currently accessed by the terminal apparatus.

Refer to the descriptions of the existing service provisioning procedure in the foregoing embodiment. The service provisioning request information further includes information such as location information of the terminal apparatus or identification information of the terminal apparatus, a service requirement, preferences for services, and connectivity.

Optionally, the service provisioning request information further includes a data network identifier of the terminal apparatus. The data network identifier may be a DNAI or a service set identifier (SSID). The DNAI is a data network identifier corresponding to the 3GPP, and the SSID is a data network identifier corresponding to a non-3GPP.

For example, Table 6 shows examples of mandatory information elements and optional information elements carried in the service provisioning request information below.

the terminal apparatus) and the identification information of the PLMN currently accessed by the terminal apparatus, the edge enabler server serving the terminal apparatus.

Optionally, the first edge configuration server may alternatively determine, based on the location information of the terminal apparatus (for example, based on the cell ID and/or TAI of the terminal apparatus), the identification information of the PLMN currently accessed by the terminal apparatus, and the data network identifier (for example, the SSID or the DNAI) of the terminal apparatus, the edge enabler server serving the terminal apparatus.

It may be learned with reference to the foregoing examples that, when there are a plurality of edge enabler servers that support serving the terminal apparatus, and the plurality of edge enabler servers are deployed in a plurality

TABLE 6

| Information Element | State | Description |
|---|---|---|
| EEC ID | Mandatory M | Unique identifier of the EEC |
| Security credential | Mandatory M | Security credential generated when an edge computing service is successfully authorized |
| Application client profile | Optional O | Information about a service to which the EEC expects to connect |
| Terminal apparatus identifier | Optional O | Identifier (GPSI or identity token) of the terminal apparatus |
| Connection information | Optional O | Connection information list of the terminal apparatus, for example, a PLMN ID or an SSID |
| Terminal apparatus location | Optional O | Location information of the terminal apparatus |
| PLMN ID | Optional O | Information about the PLMN currently accessed by the terminal apparatus |
| DNAI/SSID | Optional O | Information about a data network currently visited by the terminal apparatus |

Step 1205: The first edge configuration server determines, based on the identification information of the PLMN currently accessed by the terminal apparatus, an edge enabler server serving the terminal apparatus.

For example, with reference to the deployment scenario in FIG. 13A, the PLMN currently accessed by the terminal apparatus is the VPLMN 1. If the first edge configuration server determined by the core network element according to any method in steps 1201a to 1201c is the ECS 1-2, the terminal apparatus sends the service provisioning request information to the ECS 1-2. Because the ECS 1-2 can visit and manage the EES 1-2, the first edge configuration server determines, based on the identification information of the PLMN (namely, the VPLMN 1) currently accessed by the terminal apparatus, that the edge enabler server serving the terminal apparatus is the EES 1-2 located in the VPLMN 1.

For example, with reference to the deployment scenario in FIG. 13B, the PLMN currently accessed by the terminal apparatus is the VPLMN 1, and the first edge configuration server determined by the core network element according to any method in steps 1201a to 1201c is the ECS 1-1. The terminal apparatus sends the service provisioning request information to the ECS 1-1. The ECS 1-1 can visit and manage the EES 1-1 and the EES 1-2, the EES 1-1 is deployed in the HPLMN, and the EES 1-2 is deployed in the VPLMN 1. In this case, the first edge configuration server determines, based on the identification information of the PLMN (namely, the VPLMN 1) currently accessed by the terminal apparatus, that the edge enabler server serving the terminal apparatus is the EES 1-2 located in the VPLMN 1.

Optionally, the first edge configuration server may determine, based on the location information of the terminal apparatus (for example, based on the cell ID and/or TAI of of PLMNs (where the plurality of edge enabler servers include an edge enabler server in the PLMN currently accessed by the terminal apparatus), by performing step 1205, the first edge configuration server may select, from a plurality of edge configuration servers, an edge enabler server belonging to the PLMN currently accessed by the terminal apparatus, and send address information of the edge enabler server to the terminal apparatus. In this way, when the terminal apparatus is in the roaming state, the terminal apparatus may obtain application data from an EES in the PLMN (namely, a VPLMN) currently accessed by the terminal, and the terminal apparatus does not need to obtain the application data from an EES in an HPLMN, so that signaling resources can be saved, and an optimal path between the terminal apparatus and the edge enabler server can be ensured. Therefore, service quality of the terminal apparatus is improved. That is, according to the foregoing method, it can be ensured that a more proper edge enabler server is selected for the terminal apparatus.

Step 1206: The first edge configuration server sends service provisioning response information to the terminal apparatus, where the service provisioning response information includes information about the edge enabler server serving the terminal apparatus.

Optionally, the information about the edge enabler server may include identification information of the edge enabler server.

For example, Table 7 shows examples of mandatory information elements and optional information elements carried in the service provisioning response information below.

TABLE 7

| Information Element | State | Description |
|---|---|---|
| Successful response | Optional O | Indicating that a service provisioning request succeeds |
| EDN configuration information list | Mandatory M | EDN list |
| EDN connection information | Mandatory M | Information required for establishing a connection between the terminal apparatus and the EDN |
| DNN/APN | Mandatory M | Data network name/Access point name |
| S-NSSAI | Optional O | Network slice information |
| EDN topology service area | Optional O | Cell ID list or TAI list, where the EDN serves terminal apparatuses that are in these cells and that access the core network |
| EES list | Mandatory M | EES list of the EDN |
| EES ID | Mandatory M | EES identifier |
| EES endpoint | Mandatory M | Endpoint address (for example, URI or IP address) of the EES |
| EAS ID | Optional O | EAS ID registered with the EES |
| ECSP information | Optional O | Edge computing service provider information |
| EES topology service area | Optional O | List of cell IDs (or TAIs) served by the EES, where an EEC of a terminal apparatus that is connected to the core network and whose cell does not belong to the list is not served by the EES |
| EES geographic service area | Optional O | Geographic service area of the EES |
| EES DNAI list | Optional O | DNAI related to the EES/EAS This IE is used as a potential location of an application |
| Duration | Optional O | Duration during which the EDN configuration information is valid and cached in the EEC |
| Failure response | Optional O | Indicating that the service provisioning request fails |
| Cause | Optional O | Indicating a cause of the service provisioning request failure |

In this embodiment of this application, in the 5G communication system, the core network element that can determine the first edge configuration server for the terminal apparatus may include a unified data management function network element (UDM), a session management function network element (SMF), and a policy control function network element (PCF). An occasion for determining the first edge configuration server for the terminal apparatus may be in a process in which the terminal apparatus registers with the network or in a process in which the terminal apparatus establishes a session with the network. In the process in which the terminal apparatus registers with the network or in the process in which the terminal apparatus establishes the session with the network, a corresponding core network element performs the method for determining an edge configuration server provided in this embodiment of this application.

It should be noted that, before the edge configuration server selects the edge enabler server for the terminal apparatus, the edge enabler server needs to register with the edge configuration server that controls and manages the edge enabler server. Specifically, the edge configuration server receives registration request information sent by the edge enabler server, where the registration request information includes configuration information (EES profile) of the edge enabler server. It should be noted that, the configuration information of the edge enabler server includes identification information of a PLMN supported by the edge enabler server. Optionally, the configuration information of the edge enabler server may further include an identifier (for example, a DNAI or an SSID) of a data network supported by the edge enabler server.

For example, information elements carried in the registration request information of the edge configuration server are shown in Table 8.

TABLE 8

| Information Element | State | Description |
|---|---|---|
| EES profile | Mandatory M | EES configuration file |
| Security credential | Mandatory M | Security credential of the EES |
| Suggested expiration time | Optional O | Suggested expiration time for registration |

For example, information elements in the EES profile of the edge configuration server are shown in Table 9.

TABLE 9

| Information Element | State | Description |
|---|---|---|
| EES ID | Mandatory M | Indicating that a service provisioning request succeeds |
| EES endpoint | Mandatory M | EDN list |
| EAS ID | Mandatory M | Information required for establishing a connection between the terminal apparatus and the EDN |
| EES provider identifier | Optional O | EES provider identifier, for example, identifier of the ECSP |
| EES topology service area | Optional O | List of cell IDs (or TAIs) served by the EES, where an EEC of a terminal apparatus that is |

TABLE 9-continued

| Information Element | State | Description |
|---|---|---|
| | | connected to the core network and whose cell does not belong to the list is not served by the EES |
| EES geographic service area | Optional O | Geographic service area of the EES |
| EES/EAS DNAI list | Optional O | DNAI related to the EES/EAS, where this IE is used as a potential location of an application |
| EES connection information | Optional O | Information about a network to which the EES can connect, for example, PLMN ID, DNAI, or SSID |

According to the method for determining an edge configuration server provided in this embodiment of this application, the core network element may determine the first edge configuration server based on the identification information (included in the first information) of the PLMN currently accessed by the terminal apparatus, the address information of the edge configuration server that supports serving the terminal apparatus, and the identification information (namely, the second information) of the PLMN corresponding to the address information, and can select, from edge configuration servers that support being terminal apparatus servers, an edge configuration server that is located in a same PLMN as the terminal apparatus. In this way, when the terminal apparatus communicates with the edge configuration server, an improper data transmission path such as inter-PLMN communication is avoided, to save signaling resources and improve data transmission efficiency. That is, according to the technical solution provided in this embodiment of this application, a more proper edge configuration server can be selected for the terminal apparatus.

Further, the terminal apparatus may initiate the service provisioning procedure to the first edge configuration server. When the terminal apparatus sends the service provisioning request information to the first edge configuration service, the terminal apparatus includes at least the identification information of the PLMN currently accessed by the terminal apparatus in the service provisioning request information. Then, the first edge configuration server selects an edge enabler server for the terminal apparatus based on the identification information of the PLMN currently accessed by the terminal apparatus, so that the edge enabler server located in the PLMN currently accessed by the terminal apparatus can be selected to a maximum extent. In this way, when the terminal apparatus is in the roaming state, the terminal apparatus may obtain the application data from the EES in the PLMN (namely, the VPLMN) currently accessed by the terminal, and the terminal apparatus does not need to obtain the application data from the EES in the HPLMN. This can save signaling resources, and ensure an optimal path between the terminal apparatus and the edge enabler server, so that service quality of the terminal apparatus is improved. That is, according to the technical solution provided in this embodiment of this application, it can be ensured that a more proper edge enabler server is selected for the terminal apparatus.

It should be noted that, in this embodiment of this application, a process in which the terminal apparatus initiates the service provisioning procedure to the edge configuration server may not depend on the foregoing process in which the core network device determines the edge configuration server for the terminal apparatus. To be specific, when the terminal apparatus initiates the service provisioning procedure to an edge configuration server, the edge configuration server may not be the edge configuration server determined by using the method for determining an edge configuration server provided in this embodiment of this application, or may be an edge configuration server determined by using another method. This is not limited in this embodiment of this application. When the ECS is corresponding to EESs in a plurality of PLMNs, the EES serving the terminal apparatus may be determined based on the PLMN currently accessed by the terminal apparatus, so that a data transmission path is optimal.

The following describes in detail a method for determining an edge configuration server by each core network element by using a process in which a terminal apparatus registers with a network and a process in which the terminal apparatus establishes a session with the network.

In embodiments of this application, in the process in which the terminal apparatus registers with the network, a unified data management function network element or policy control management network element in a core network may determine the edge configuration server.

Figure 14:
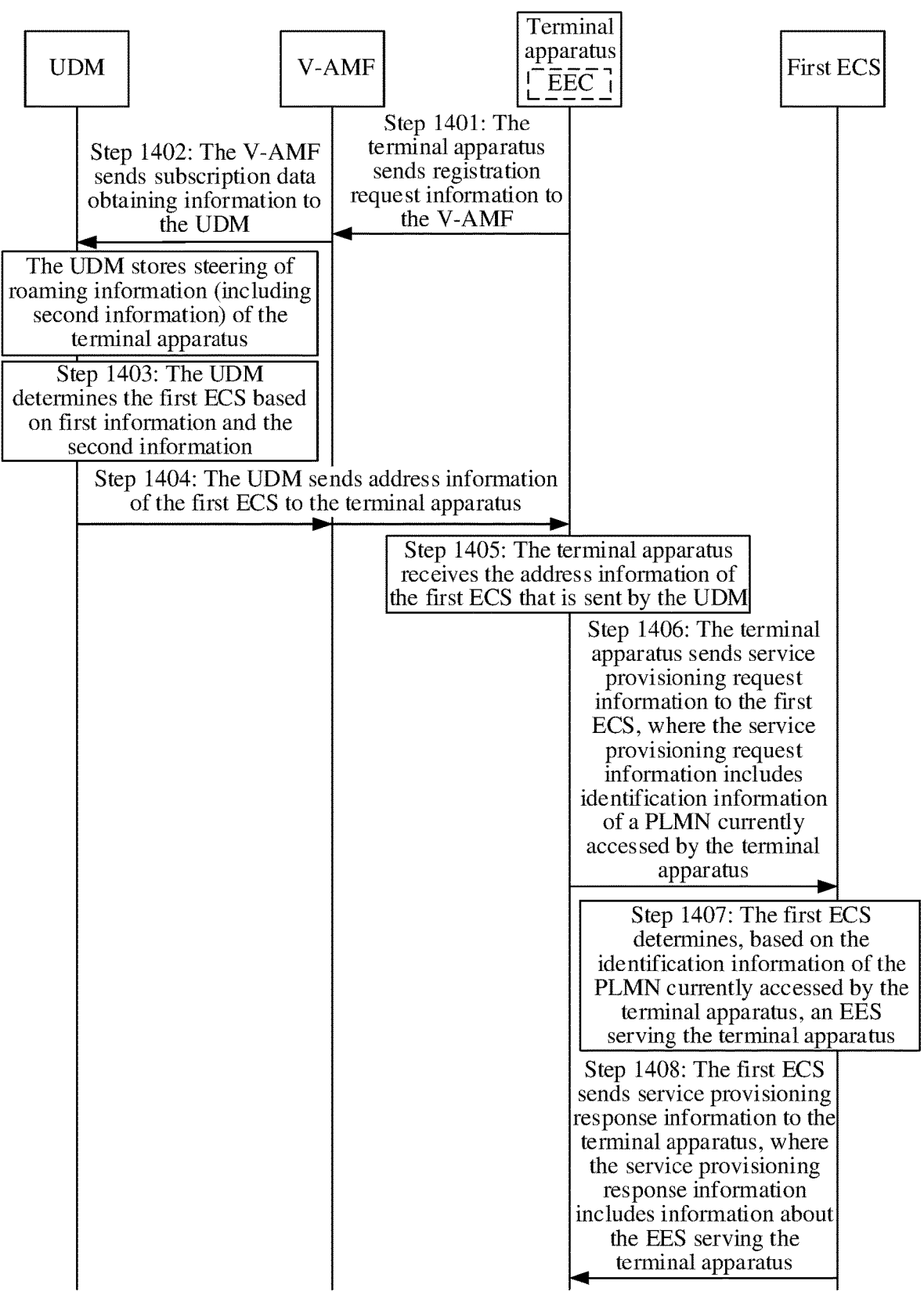
FIG. 14 is a schematic diagram 2 of a method for determining an edge configuration server according to an embodiment of this application.

FIG. 14 is a flowchart of a method for determining an edge configuration server by a unified data management function network element in a process in which a terminal apparatus registers with a network. Refer to FIG. 14. The method for determining an edge configuration server provided in this embodiment of this application includes step 1401 to step 1408.

Step 1401: The terminal apparatus sends registration request information to a V-AMF.

Specifically, the terminal apparatus sends the registration request information to the V-AMF via an access network device (R)AN. The terminal apparatus may include information about a PLMN currently accessed by the terminal apparatus: first information, in the registration request information, and send the registration request information to the V-AMF. Alternatively, the first information may be sent to the V-AMF by using another message.

Step 1402: The V-AMF sends subscription data obtaining information (Nudm_SDM_Get) to the UDM.

The information is used to obtain subscription information and steering of roaming (steering of roaming, SoR) information of the terminal apparatus from the UDM.

The V-AMF may include the information about the PLMN currently accessed by the terminal apparatus: the first information, in the subscription data obtaining information, and send the subscription data obtaining information to the UDM. Alternatively, the first information may be sent to the UDM by using another message. The UDM is an H-UDM.

Currently, the steering of roaming information includes a list of preferred PLMNs or a list of access technology combinations. An HPLMN provides an HPLMN protection list through NAS signaling. The HPLMN protection list includes the list of preferred PLMNs or the list of access technology combinations. The HPLMN protection list is used to update a list of "operator controlled PLMN selector with access technology" in the terminal apparatus. It should be understood that, if a selected PLMN is a VPLMN, the UDM in the HPLMN may provide the SoR information for the terminal apparatus by using a control plane in the registration process or after registration is completed. If the selected PLMN is the HPLMN, the UDM in the HPLMN can provide the SoR information to the terminal apparatus by using the control plane only after the registration is completed.

It should be understood that the UDM stores the subscription information of the terminal apparatus and the steering of roaming information of the terminal apparatus. In this embodiment of this application, the steering of roaming information includes address information of an edge configuration server that supports serving the terminal apparatus and identification information of a PLMN (namely, a PLMN in the list of preferred PLMNs) corresponding to the address information. That is, the steering of roaming information includes second information.

Step 1403: The UDM determines a first ECS based on the first information and the second information.

Therefore, the first information may further include home operator information of the terminal apparatus. The terminal apparatus may also send the home operator information of the terminal apparatus to the V-SMF by using another message or other information.

For a specific method for determining the first ECS by the UDM based on the first information and the second information, refer to the related descriptions of step 1201 in the foregoing embodiment. Details are not described herein again.

Step 1404: The UDM sends address information of the first ECS to the terminal apparatus.

Specifically, the UDM sends the address information of the first ECS to the terminal apparatus via the V-AMF.

Step 1405: The terminal apparatus receives the address information of the first ECS that is sent by the UDM.

Step 1406: The terminal apparatus sends service provisioning request information to the first ECS, where the service provisioning request information includes identification information of a PLMN currently accessed by the terminal apparatus.

Optionally, the service provisioning request information further includes a data network identifier (a DNAI or an SSID) of the terminal apparatus.

For descriptions of the information elements carried in the service provisioning request information, refer to content in Table 6. Details are not described herein again.

Step 1407: The first ECS determines, based on the identification information of the PLMN currently accessed by the terminal apparatus, an EES serving the terminal apparatus.

For the descriptions of step 1407, refer to the foregoing related descriptions of step 1205. Details are not described herein again.

Step 1408: The first ECS sends service provisioning response information to the terminal apparatus, where the service provisioning response information includes information about the EES serving the terminal apparatus.

For the descriptions of the information elements carried in the service provisioning response information, refer to content in Table 7. Details are not described herein again.

Figure 15:
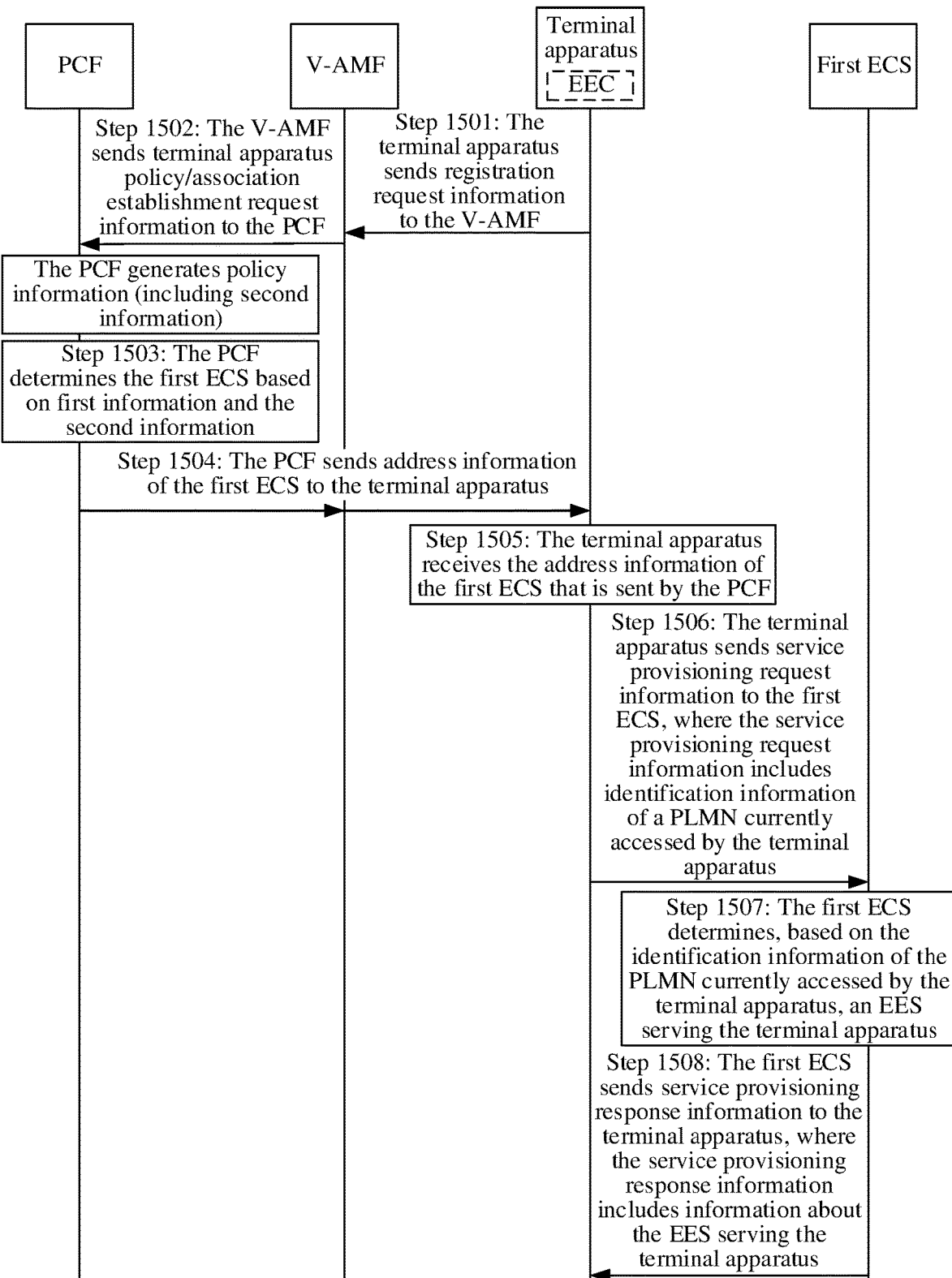
FIG. 15 is a schematic diagram 3 of a method for determining an edge configuration server according to an embodiment of this application.

FIG. 15 is a flowchart of a method for determining an edge configuration server by a policy control function network element in a process in which a terminal apparatus registers with a network. Refer to FIG. 15. The method for determining an edge configuration server provided in this embodiment of this application includes step 1501 to step 1508.

Step 1501: The terminal apparatus sends registration request information to a V-AMF. The terminal apparatus may include information about a PLMN currently accessed by the terminal apparatus: first information, in the registration request information, and send the registration request information to the V-AMF. Alternatively, the first information may be sent to the V-AMF by using another message.

Specifically, the terminal apparatus sends the registration request information to the V-AMF via an access network device (R)AN.

Step 1502: The V-AMF sends terminal apparatus policy/association establishment request information to the PCF (for example, sends the terminal apparatus policy/association establishment request information to the PCF by using a UE Policy/Association Establishment Request). The V-AMF may include the information about the PLMN currently accessed by the terminal apparatus: the first information, in the terminal apparatus policy/association establishment request information, and send the terminal apparatus policy/association establishment request information to the V-AMF. Alternatively, the first information may be sent to the V-AMF by using another message.

It should be understood that the information carries policy container (policy container) information of the terminal apparatus, and the policy/association establishment request information is used to obtain policy information from the PCF. The policy container information in the policy/association establishment request information indicates that the terminal apparatus supports an access network discovery and selection policy (ANDSP) or the terminal apparatus supports a route selection policy (URSP). The ANDSP is used by the terminal apparatus to select a non-3GPP access network, and the URSP is used by the terminal apparatus to determine whether a detected application can be associated with an established session. For example, traffic may be routed to the established session, or the traffic may be split to a non-3GPP session, or establishment of a new session may be triggered.

Optionally, the PCF in step 1502 may be a PCF in a VPLMN: a V-PCF, or may be a PCF in an HPLMN: an H-PCF.

Step 1503: The PCF determines a first ECS based on the first information and second information.

In this embodiment of this application, the PCF may generate the second information, and determine the first ECS based on the second information. Specifically, the PCF obtains subscription information from a UDR. Then, the PCF generates the policy information: the ANDSP or the URSP, based on the subscription information. The ANDSP or the URSP includes address information of an edge configuration server that supports serving the terminal apparatus and identification information of a PLMN corresponding to the address information. That is, the ANDSP or the URSP includes the second information.

The first information may further include home operator information of the terminal apparatus. The terminal apparatus may also send the home operator information of the terminal apparatus to the PCF by using another message or other information.

Similarly, for a specific method for determining the first ECS by the PCF based on the first information and the second information, refer to the related descriptions of step 1201 in the foregoing embodiment. Details are not described herein again.

Step 1504: The PCF sends address information of the first ECS to the terminal apparatus.

Specifically, the PCF sends the address information of the first ECS to the terminal apparatus via the V-AMF.

Step 1505: The terminal apparatus receives the address information of the first ECS that is sent by the PCF.

Step 1506: The terminal apparatus sends service provisioning request information to the first ECS, where the service provisioning request information includes the identification information of the PLMN currently accessed by the terminal apparatus.

Optionally, the service provisioning request information further includes a data network identifier (a DNAI or an SSID) of the terminal apparatus.

For the descriptions of the information elements carried in the service provisioning request information, refer to content in Table 6. Details are not described herein again.

Step 1507: The first ECS determines, based on the identification information of the PLMN currently accessed by the terminal apparatus, an EES serving the terminal apparatus.

For the descriptions of step 1507, refer to the foregoing related descriptions of step 1205. Details are not described herein again.

Step 1508: The first ECS sends service provisioning response information to the terminal apparatus, where the service provisioning response information includes information about the EES serving the terminal apparatus.

For the descriptions of the information elements carried in the service provisioning response information, refer to content in Table 7. Details are not described herein again.

In this embodiment of this application, in the process in which the terminal apparatus establishes a session with the network, the unified data management function network element or the session management function network element in the core network may determine the edge configuration server.

Figure 16A:
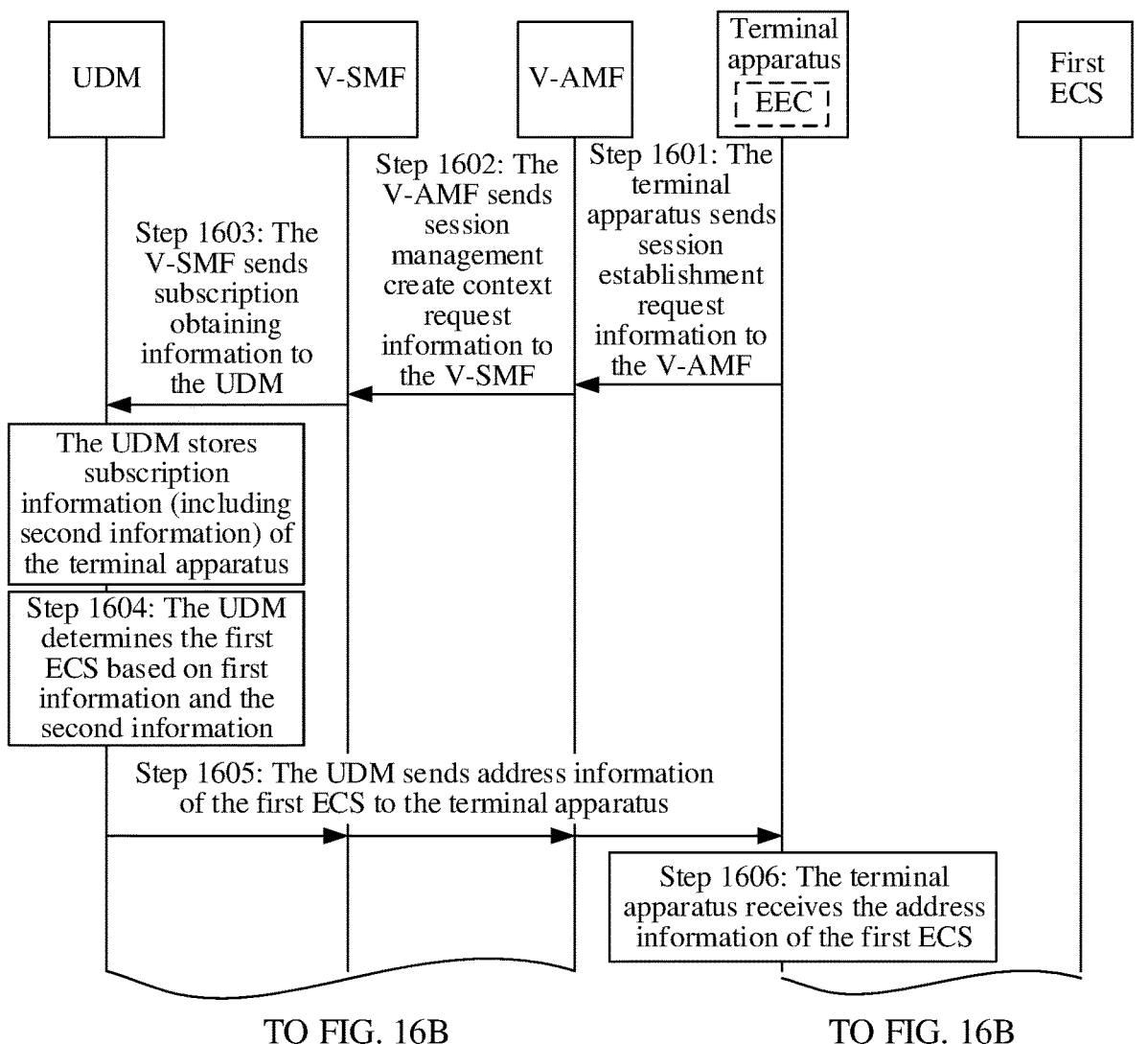

FIG. 16A and FIG. 16B are a flowchart of a method for determining an edge configuration server by a unified data management function network element in a process in which a terminal apparatus establishes a session with a network. Refer to FIG. 16A and FIG. 16B. The method for determining an edge configuration server provided in this embodiment of this application includes step 1601 to step 1609.

Step 1601: The terminal apparatus sends session establishment request information to a V-AMF. The terminal apparatus may include information about a PLMN currently accessed by the terminal apparatus: first information, in the session establishment request information, and send the session establishment request information to the V-AMF. Alternatively, the first information may be sent to the V-AMF by using another message.

Specifically, the terminal apparatus sends the session establishment request by using NAS information. The NAS information further includes network slice information (S-NSSAI(s)), a DNN requested by the terminal apparatus, an ID of a PDU session, a request type, an ID of an old PDU session, and the like.

Optionally, the NAS information may include service indication information of the terminal apparatus, for example, service type indication information and/or service quality indication information. The service type indication information indicates a current service type of the terminal apparatus, for example, a video service, an internet of vehicles service, or a game service. The service quality indication information indicates a requirement of service quality of the terminal apparatus. For example, the service quality indication information indicates QoS information of a service of the terminal apparatus.

Step 1602: The V-AMF sends session management create context request information to a V-SMF (for example, sends the session management create context request information to the V-SMF by sending Nsmf_PDUSession_CreateSMContext Request).

In this embodiment of this application, after the V-AMF selects a proper V-SMF based on the network slice information, the DNN, and the like, the V-AMF sends the session management context create context request information to the V-SMF.

Step 1603: The V-SMF sends subscription obtaining information to a UDM.

The V-AMF may include the information about the PLMN currently accessed by the terminal apparatus: the first information, in the subscription obtaining information, and send the subscription obtaining information to the UDM. Alternatively, the first information may be sent to the UDM by using another message. The UDM is an H-UDM.

The V-SMF sends the subscription obtaining information to the UDM, to obtain subscription information of the terminal apparatus from the UDM.

In an implementation, after the V-AMF receives the NAS information that is sent by the terminal apparatus and that includes the service indication information of the terminal apparatus, the V-AMF may send the service indication information of the terminal apparatus to the UDM via the V-SMF. That is, the service indication information of the terminal apparatus is sent by performing step 1602 and step 1603.

In an implementation, with reference to the descriptions of the foregoing embodiment, it may be learned that a UDR further stores application data of the terminal apparatus, the application data may include an identifier of an application, and a service type corresponding to the application may be determined based on the identifier of the application. Therefore, the UDM may obtain the service indication information of the terminal apparatus from the UDR.

Step 1604: The UDM determines a first ECS based on the first information and second information.

In this embodiment of this application, subscription information of the terminal apparatus that is stored in the UDM includes address information of an edge configuration server that supports serving the terminal apparatus and identification information of a PLMN corresponding to the address information. That is, the subscription information of the terminal apparatus includes the second information. The UDM determines the first ECS based on the first information and the second information.

It should be noted that, in the process in which the terminal apparatus establishes the session with the network, the first information may further include at least one of the service indication information of the terminal apparatus and home operator information of the terminal indication information of the terminal apparatus to the UMD by using another message or other information.

Similarly, for a specific method for determining the first ECS by the UDM based on the first information and the second information, refer to the related descriptions of step 1201 in the foregoing embodiment. Details are not described herein again.

Step 1605: The UDM sends address information of the first ECS to the terminal apparatus.

Specifically, the UDM sends the address information of the first ECS to the terminal apparatus via the V-SMF and the V-AMF.

Optionally, in an implementation, after the UDM determines, based on the first information and the second information, the ECS that can serve the terminal apparatus, the UDM sends address information of the determined ECS to the V-SMF. The V-SMF receives the address information of the ECS determined by the UDM and identification information of a PLMN corresponding to the address information of the ECS. In addition, the V-SMF may determine, based on a local configuration, a location of the terminal apparatus, and/or the subscription information of the terminal apparatus, an ECS that supports serving the terminal apparatus. In this case, the V-SMF uses both the ECS that is received by the V-SMF from the UDM and the ECS determined by the V-SMF as first ECSs, and further sends the address information of the first ECSs to the terminal apparatus.

The ECS that supports serving the terminal apparatus and that is determined by the V-SMF based on the local configuration, the location of the terminal apparatus, and/or the subscription information of the terminal apparatus is used as a supplement to the ECS determined by the UDM, to avoid missing of an ECS when the second information cannot cover all ECSs that support serving the terminal apparatus.

Optionally, the V-SMF may send, to the terminal apparatus, a DNAI corresponding to a cell (cell ID) currently accessed by the terminal apparatus.

Step 1606: The terminal apparatus receives the address information of the first ECS.

Optionally, the terminal apparatus may receive the DNAI that is sent by the V-SMF and that is corresponding to the cell (cell ID) currently accessed by the terminal apparatus.

Step 1607: The terminal apparatus sends service provisioning request information to the first ECS, where the service provisioning request information includes the identification information of the PLMN currently accessed by the terminal apparatus.

Optionally, the service provisioning request information further includes a data network identifier (a DNAI or an SSID) of the terminal apparatus, and the DNAI may be a DNAI that is received by a core network element and that is corresponding to the cell currently accessed by the terminal apparatus.

For the descriptions of the information elements carried in the service provisioning request information, refer to content in Table 6. Details are not described herein again.

Step 1608: The first ECS determines, based on the identification information of the PLMN currently accessed by the terminal apparatus, an EES serving the terminal apparatus.

Optionally, the first ECS may alternatively determine, based on the location information of the terminal apparatus (for example, based on the cell ID and/or TAI of the terminal apparatus), the identification information of the PLMN currently accessed by the terminal apparatus, and the data network identifier (for example, the SSID or the DNAI) of the terminal apparatus, the EES serving the terminal apparatus.

For the descriptions of step 1608, refer to the foregoing related descriptions of step 1205. Details are not described herein again.

Step 1609: The first ECS sends service provisioning response information to the terminal apparatus, where the service provisioning response information includes information about the EES serving the terminal apparatus.

For the descriptions of the information elements carried in the service provisioning response information, refer to content in Table 7. Details are not described herein again.

Figure 17A:
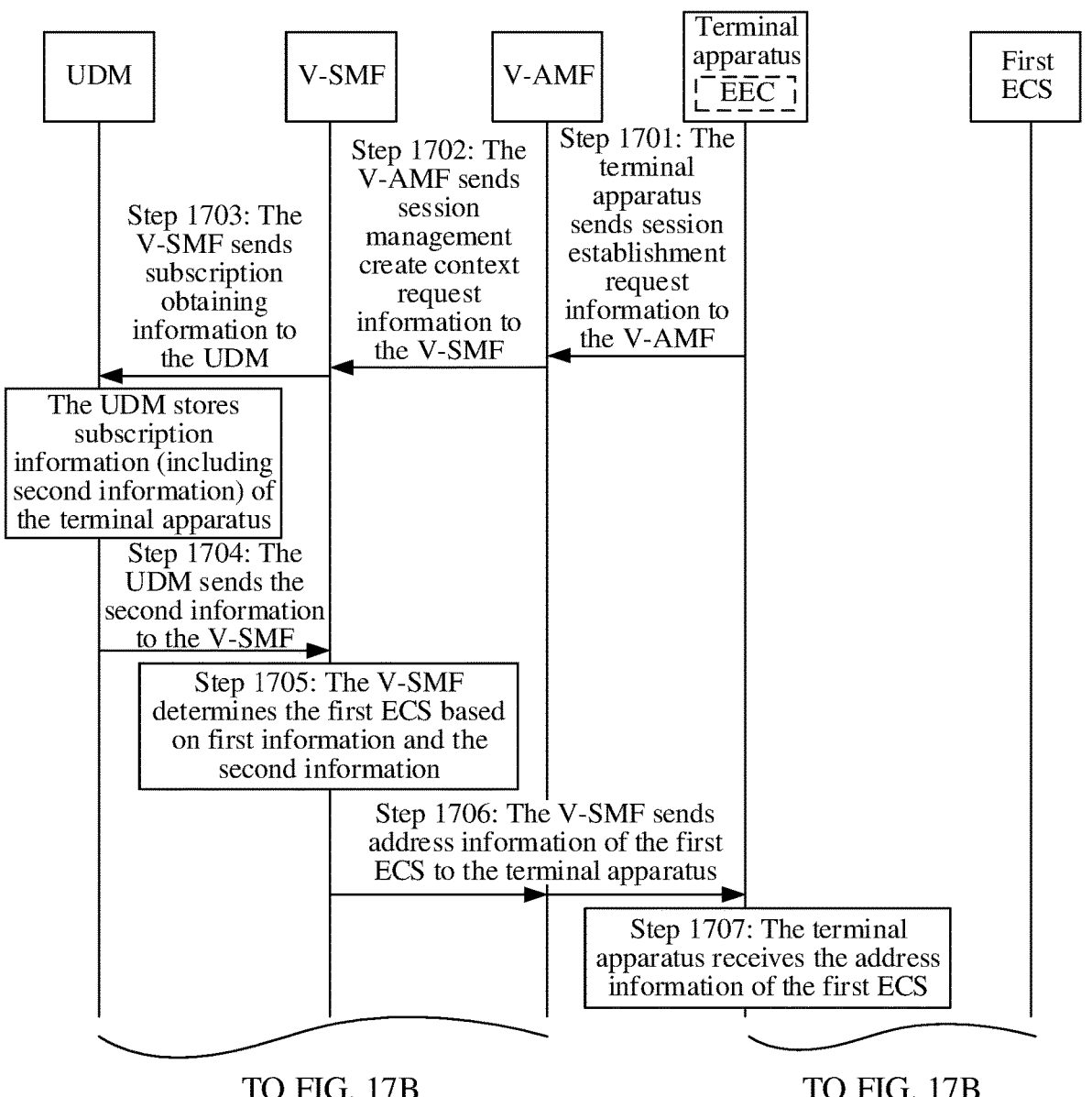

FIG. 17A and FIG. 17B are a flowchart of a method for determining an edge configuration server by a session management function network element in a process in which a terminal apparatus establishes a session with a network. Refer to FIG. 17A and FIG. 17B. The method for determining an edge configuration server provided in this embodiment of this application includes step 1701 to step 1710.

Step 1701: The terminal apparatus sends session establishment request information to a V-AMF. The terminal apparatus may include information about a PLMN currently accessed by the terminal apparatus: first information, in the session establishment request information, and send the session establishment request information to the V-AMF. Alternatively, the first information may be sent to the V-AMF by using another message.

Specifically, the terminal apparatus sends the session establishment request by using NAS information. The NAS information further includes network slice information (S-NSSAI(s)), a DNN requested by the terminal apparatus, an ID of a PDU session, a request type, an ID of an old PDU session, and the like.

Optionally, the NAS information may include service indication information of the terminal apparatus, for example, service type indication information and/or service quality indication information. The service type indication information indicates a current service type of the terminal apparatus, for example, a video service, an internet of vehicles service, or a game service. The service quality indication information indicates a requirement of service quality of the terminal apparatus. For example, the service quality indication information indicates QoS information of a service of the terminal apparatus.

Step 1702: The V-AMF sends session management create context request information to a V-SMF (for example, sends the session management create context request information to the V-SMF by using Nsmf_PDUSession_CreateSMContext Request).

The V-AMF may include the information about the PLMN currently accessed by the terminal apparatus: the first information, in the session management create context request information, and send the session management create context request information to the V-SMF. Alternatively, the first information may be sent to the V-SMF by using another message.

In this embodiment of this application, after the V-AMF selects a proper V-SMF based on the network slice information, the DNN, and the like, the V-AMF sends the session management context create context request information to the V-SMF.

In an implementation, the session management create context request information may include the service indication information of the terminal apparatus.

Step 1703: The V-SMF sends subscription obtaining information to a UDM.

The V-SMF sends the subscription obtaining information to the UDM, to obtain subscription information of the terminal apparatus from the UDM. The subscription information of the terminal apparatus includes address information of an edge configuration server that supports serving the terminal apparatus and identification information of a PLMN corresponding to the address information. The subscription information of the terminal apparatus includes second information.

Step 1704: The UDM sends the second information to the V-SMF.

In an implementation, the UDM network element may obtain the service indication information of the terminal apparatus from a UDR, and send the service indication information of the terminal apparatus to the V-SMF. Alternatively, the V-PCF obtains the service indication information of the terminal apparatus from the UDR, and sends the service indication information of the terminal apparatus to the V-SMF by using update policy information.

Step 1705: The V-SMF determines a first ECS based on the first information and the second information.

It should be noted that the V-SMF determines the first ECS based on the first information and the second information. In the process in which the terminal apparatus establishes the session with the network, the first information may further include at least one of the service indication information of the terminal apparatus and home operator information of the terminal indication information of the terminal apparatus to the V-SMF by using another message or other information.

Similarly, for a specific method for determining the first ECS by the V-SMF based on the first information and the second information, refer to the related descriptions of step 1201 in the foregoing embodiment. Details are not described herein again.

Step 1706: The V-SMF sends address information of the first ECS to the terminal apparatus.

Optionally, the V-SMF may send, to the terminal apparatus, a DNAI corresponding to a cell (cell ID) currently accessed by the terminal apparatus.

Specifically, the V-SMF sends, to the terminal apparatus via the V-AMF, the address information of the first ECS and the DNAI corresponding to the cell (cell ID) currently accessed by the terminal apparatus.

Step 1707: The terminal apparatus receives the address information of the first ECS.

Optionally, the terminal apparatus may alternatively receive the DNAI that is sent by the V-SMF and that is corresponding to the cell (cell ID) currently accessed by the terminal apparatus.

Step 1708: The terminal apparatus sends service provisioning request information to the first ECS, where the service provisioning request information includes the identification information of the PLMN currently accessed by the terminal apparatus.

Optionally, the service provisioning request information further includes a data network identifier (a DNAI or an SSID) of the terminal apparatus. For the descriptions of the information elements carried in the service provisioning request information, refer to content in Table 6. Details are not described herein again.

Step 1709: The first ECS determines, based on the identification information of the PLMN currently accessed by the terminal apparatus, an EES serving the terminal apparatus.

For the descriptions of step 1709, refer to the foregoing related descriptions of step 1205. Details are not described herein again.

Step 1710: The first ECS sends service provisioning response information to the terminal apparatus, where the service provisioning response information includes information about the EES serving the terminal apparatus.

For the descriptions of the information elements carried in the service provisioning response information, refer to content in Table 7. Details are not described herein again.

In conclusion, both the method procedure shown in FIG. 16A and FIG. 16B and the method procedure shown in FIG. 17A and FIG. 17B are procedures for determining the first edge configuration server in the process in which the terminal apparatus establishes the session with the network. A difference between the two procedures is that in the method procedure shown in FIG. 16A and FIG. 16B, the UDM determines the first ECS based on the second information and the first information that are in local configuration information (namely, the subscription information of the terminal apparatus); and in the method procedure shown in FIG. 17A and FIG. 17B, the UDM no longer determines first ECS, the UDM sends the second information to the V-SMF, and the V-SMF determines the first ECS based on the second information and the first information.

2: The terminal apparatus determines the first edge configuration server

Figure 18:
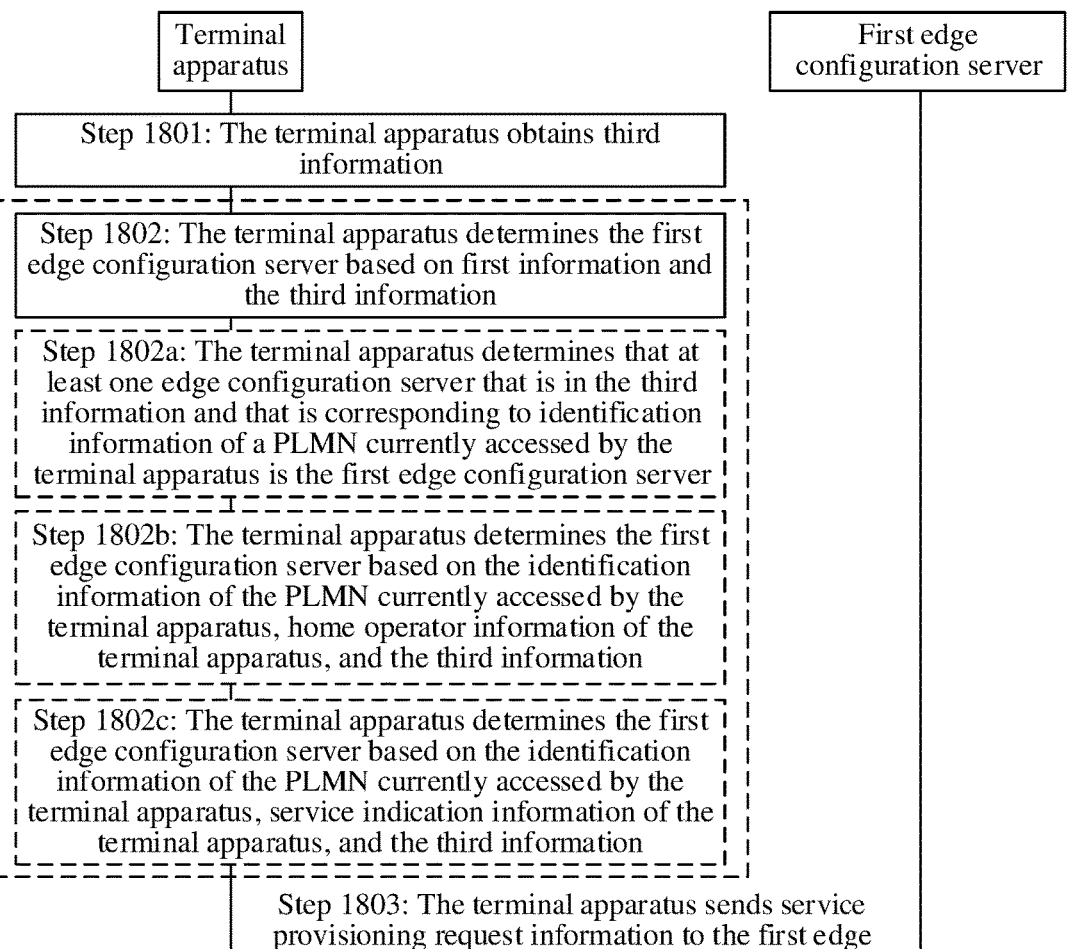
FIG. 18 is a schematic diagram 6 of a method for determining an edge configuration server according to an embodiment of this application.

FIG. 18 shows a method for determining an edge configuration server according to an embodiment of this application. The method includes step 1801 to step 1805.

Step 1801: A terminal apparatus obtains third information.

The third information may be edge configuration server information. For the edge configuration server information, refer to the descriptions of an edge configuration server or second information in another embodiment.

The third information includes address information of an edge configuration server that supports serving the terminal apparatus and identification information of a PLMN corresponding to the address information.

In this embodiment of this application, the terminal apparatus may obtain the third information from a core network element. The core network element may be any one of a unified data management function network element, a policy control function network element, or a session management function network element. Specifically, the obtaining of the third information by the terminal apparatus is described in detail in the following embodiment.

Step 1802: The terminal apparatus determines, based on first information and the third information, a first edge configuration server serving the terminal apparatus.

The first information includes identification information of a PLMN currently accessed by the terminal apparatus.

It should be noted that the third information obtained by the terminal apparatus includes address information of an edge configuration server serving the terminal apparatus and identification information of a PLMN corresponding to the address information. The second information obtained by the core network element also includes the address information of the edge configuration server serving the terminal apparatus and the identification information of the PLMN corresponding to the address information. In this embodiment of this application, content of the third information may be the same as or different from content of the second information. This is not limited herein.

Optionally, the identification information of the PLMN in the third information includes the identification information of the PLMN currently accessed by the terminal apparatus. With reference to FIG. 18, step 1802 may be implemented by performing step 1802a.

Step 1802a: The terminal apparatus determines that at least one edge configuration server that is in the third information and that is corresponding to the identification information of the PLMN currently accessed by the terminal apparatus is the first edge configuration server.

Optionally, the first information further includes at least one of home operator information of the terminal apparatus and service indication information of the terminal apparatus. In this case, the terminal apparatus may determine the first edge configuration server based on the identification information of the PLMN currently accessed by the terminal apparatus, the third information, and the at least one of the home operator information and service indication information of the terminal apparatus.

The terminal may have home operator information for determining the terminal by the terminal. For example, a SIM (subscriber identity module) card mounted on the terminal apparatus stores information indicating a home operator of the UE. The terminal apparatus may determine service indication information based on a service initiated by the terminal apparatus, and determine, based on a PLMN in which the terminal apparatus is located, information about the PLMN currently accessed by the terminal apparatus.

When the first information includes the identification information of the PLMN currently accessed by the terminal apparatus and the home operator information of the terminal apparatus, step 1802 is implemented by performing step 1802b.

Step 1802b: The terminal apparatus determines the first edge configuration server based on the identification information of the PLMN currently accessed by the terminal apparatus, the home operator information of the terminal apparatus, and the third information.

Optionally, the third information may further include information about an operator corresponding to the edge configuration server serving the terminal apparatus.

In an implementation, the terminal apparatus determines that at least one edge configuration server that is in the third information and that is corresponding to the identification information of the PLMN currently accessed by the terminal apparatus is a candidate edge configuration server. Then, the terminal apparatus determines, based on the home operator information of the terminal apparatus, that an edge configuration server that is in the candidate edge configuration server and that belongs to a home operator of the terminal apparatus is the first edge configuration server.

In another implementation, the terminal apparatus determines, based on the home operator information of the terminal apparatus, that at least one edge configuration server that is in the third information and that belongs to a home operator of the terminal apparatus is a candidate edge configuration server. Then, the terminal apparatus determines that an edge configuration server that is in the candidate edge configuration server and that is corresponding to the identification information of the PLMN currently accessed by the terminal apparatus is the first edge configuration server.

It should be understood that the first edge configuration servers determined in the foregoing two implementations of step 1802b are the same.

Similarly, optionally, the terminal apparatus may alternatively determine, based on the identification information of the PLMN currently accessed by the terminal apparatus, at least one edge configuration server that is in the third information and that is corresponding to the identification information of the PLMN currently accessed by the terminal apparatus; and determine, based on the home operator information of the terminal apparatus, at least one edge configuration server that belongs to the home operator of the terminal apparatus and that is in the third information, to determine that an edge configuration server that belongs to the home operator of the terminal apparatus and that is corresponding to the identification information of the PLMN currently accessed by the terminal apparatus is the first edge configuration server.

Optionally, for the terminal apparatus, the first information further includes service indication information of the terminal apparatus. In this way, the terminal apparatus may determine the first edge configuration server based on the service indication information of the terminal apparatus, the identification information of the PLMN currently accessed by the terminal apparatus, and the third information.

When the first information includes the identification information of the PLMN currently accessed by the terminal apparatus and the service indication information of the terminal apparatus, step 1802 is implemented by performing step 1802c.

Step 1802c: The terminal apparatus determines the first edge configuration server based on the identification information of the PLMN currently accessed by the terminal apparatus, the service indication information of the terminal apparatus, and the third information.

Optionally, the third information further includes service capability information of an edge configuration server serving the terminal apparatus, that is, a service type supported by the edge configuration server.

In an implementation, the terminal apparatus determines that at least one edge configuration server that is in the third information and that is corresponding to the identification information of the PLMN currently accessed by the terminal apparatus is a candidate edge configuration server. Then, the terminal apparatus determines, based on the service indication information of the terminal apparatus, that an edge configuration server that meets a service requirement of the terminal apparatus and that is in the candidate edge configuration server is the first edge configuration server.

In another implementation, the terminal apparatus determines, based on the service indication information of the terminal apparatus, that at least one edge configuration server that meets a service requirement of the terminal apparatus and that is in the third information is a candidate edge configuration server. Then, the terminal apparatus determines that an edge configuration server that is in the candidate edge configuration server and that is corresponding to the identification information of the PLMN currently accessed by the terminal apparatus is the first edge configuration server.

It should be understood that the first edge configuration servers determined in the foregoing two implementations of step 1802c are the same.

Optionally, the terminal apparatus may alternatively determine, based on the identification information of the PLMN currently accessed by the terminal apparatus, at least one edge configuration server that is in the third information and that is corresponding to the identification information of the PLMN currently accessed by the terminal apparatus; and determine, based on the service indication information of the terminal apparatus, at least one edge configuration server that meets the service requirement of the terminal apparatus and that is in the third information, to determine that an edge configuration server that meets the service requirement of the terminal apparatus and that is corresponding to the identification information of the PLMN currently accessed by the terminal apparatus is the first edge configuration server.

Optionally, the terminal apparatus may determine the first edge configuration server based on the home operator information of the terminal apparatus, the service indication information, the identification information of the PLMN currently accessed by the terminal apparatus, and the second information. In this case, the first edge configuration server needs to meet the following three conditions at the same time: The first edge configuration server belongs to the home operator of the terminal apparatus, the first edge configuration server meets the service requirement of the terminal apparatus, and the first edge configuration server is located in the PLMN currently accessed by the terminal apparatus.

It should be noted that in this embodiment of this application, the method for determining the first edge configuration server by the terminal apparatus based on the first information and the third information is similar to the method for determining the first edge configuration server by the core network element based on the first information and the second information. For the related descriptions of determining the first edge configuration server by the terminal apparatus, refer to the descriptions of content of determining the first edge configuration server by the core network element in the foregoing embodiment. Details are not described herein again.

Step 1803: The terminal apparatus sends service provisioning request information to the first edge configuration server, where the service provisioning request information includes the identification information of the PLMN currently accessed by the terminal apparatus.

Refer to the descriptions of the existing service provisioning procedure in the foregoing embodiment. The service provisioning request information further includes information such as location information of the terminal apparatus or identification information of the terminal apparatus, a service requirement, preferences for services, and connectivity.

Optionally, the service provisioning request information further includes a data network identifier of the terminal apparatus, and the data network identifier may be a DNAI or an SSD.

For descriptions of mandatory information elements and optional information elements carried in the service provisioning request information, refer to the examples in Table 6.

Step 1804: The first edge configuration server determines, based on the identification information of the PLMN currently accessed by the terminal apparatus, an edge enabler server serving the terminal apparatus.

Step 1805: The first edge configuration server sends service provisioning response information to the terminal apparatus, where the service provisioning response information includes information about the edge enabler server serving the terminal apparatus.

Optionally, the information about the edge enabler server may include identification information of the edge enabler server.

For descriptions of mandatory information elements and optional information elements carried in the service provisioning response information, refer to the examples in Table 7.

For related descriptions of step 1803 to step 1803, refer to the descriptions of step 1204 to step 1206 in the foregoing embodiment. Details are not described herein again.

In this embodiment of this application, when there are a plurality of edge enabler servers that support serving the terminal apparatus, and the plurality of edge enabler servers are deployed in a plurality of PLMNs (where the plurality of edge enabler servers include an edge configuration server in the PLMN currently accessed by the terminal apparatus), by performing step 1804, the first edge configuration server selects, from a plurality of edge configuration servers, an edge enabler server belonging to the PLMN currently accessed by the terminal apparatus, and send address information of the edge enabler server to the terminal apparatus. In this way, when the terminal apparatus is in a roaming state, the terminal apparatus may obtain application data from an EES in the PLMN (namely, a VPLMN) currently accessed by the terminal, and the terminal apparatus does not need to obtain the application data from an EES in an HPLMN, so that signaling resources can be saved, and an optimal path between the terminal apparatus and the edge enabler server serving the terminal apparatus can be ensured. Therefore, service quality of the terminal apparatus is improved. That is, according to the foregoing method, it can be ensured that a more proper edge enabler server is selected for the terminal apparatus.

It should be noted that, an occasion for determining the first edge configuration server by the terminal apparatus may be a process in which the terminal apparatus registers with a network or a process in which the terminal apparatus establishes a session with the network. In the process in which the terminal apparatus registers with the network or in the process in which the terminal apparatus establishes the session with the network, the terminal apparatus performs the method for determining an edge configuration server provided in this embodiment of this application.

In this embodiment of this application, before the edge configuration server selects the edge enabler server for the terminal apparatus, the edge enabler server needs to register with the edge configuration server that controls and manages the edge enabler server. Specifically, the edge configuration server receives registration request information sent by the edge enabler server, where the registration request information includes configuration information (EES profile) of the edge enabler server. It should be noted that the configuration information of the edge enabler server includes identification information of a PLMN supported by the edge enabler server. Optionally, the configuration information of the edge enabler server may further include an identifier (for example, a DNAI or an SSID) of a data network supported by the edge enabler server. For descriptions of information elements carried in the registration request information of the edge configuration server, refer to the examples in Table 8.

According to the method for determining an edge configuration server provided in this embodiment of this application, the terminal apparatus may determine the first edge configuration server based on the identification information (included in the first information) of the PLMN currently accessed by the terminal apparatus, the address information of the edge configuration server that supports serving the terminal apparatus, and the identification information (namely, the third information) of the PLMN corresponding to the address information, and can select, from edge configuration servers that support being terminal apparatus servers, an edge configuration server that is located in a same PLMN as the terminal apparatus. In this way, when the terminal apparatus communicates with the edge configuration server, an improper data transmission path such as inter-PLMN communication is avoided, to save signaling resources and improve data transmission efficiency. That is, according to the technical solution provided in this embodiment of this application, an edge configuration server with higher data transmission efficiency can be selected for the terminal apparatus.

Further, the terminal apparatus may initiate the service provisioning procedure to the first edge configuration server. When the terminal apparatus sends the service provisioning request information to the first edge configuration service, the terminal apparatus includes at least the identification information of the PLMN currently accessed by the terminal apparatus in the service provisioning request information. Then, the first edge configuration server selects the edge enabler server for the terminal apparatus based on the identification information of the PLMN currently accessed by the terminal apparatus, so that the edge enabler server located in the PLMN currently accessed by the terminal apparatus can be selected to a maximum extent. In this way, when the terminal apparatus is in the roaming state, the terminal apparatus may obtain the application data from the EES in the PLMN (namely, the VPLMN) currently accessed by the terminal, and the terminal apparatus does not need to obtain the application data from the EES in the HPLMN. This can save signaling resources, and ensure an optimal path between the terminal apparatus and the edge enabler server, so that service quality of the terminal apparatus is improved. That is, according to the technical solution provided in this embodiment of this application, it can be ensured that a more proper edge enabler server is selected for the terminal apparatus.

The following describes in detail a method for determining an edge configuration server by a terminal apparatus by using a process in which the terminal apparatus registers with a network and a process in which the terminal apparatus establishes a session with the network.

Figure 19:
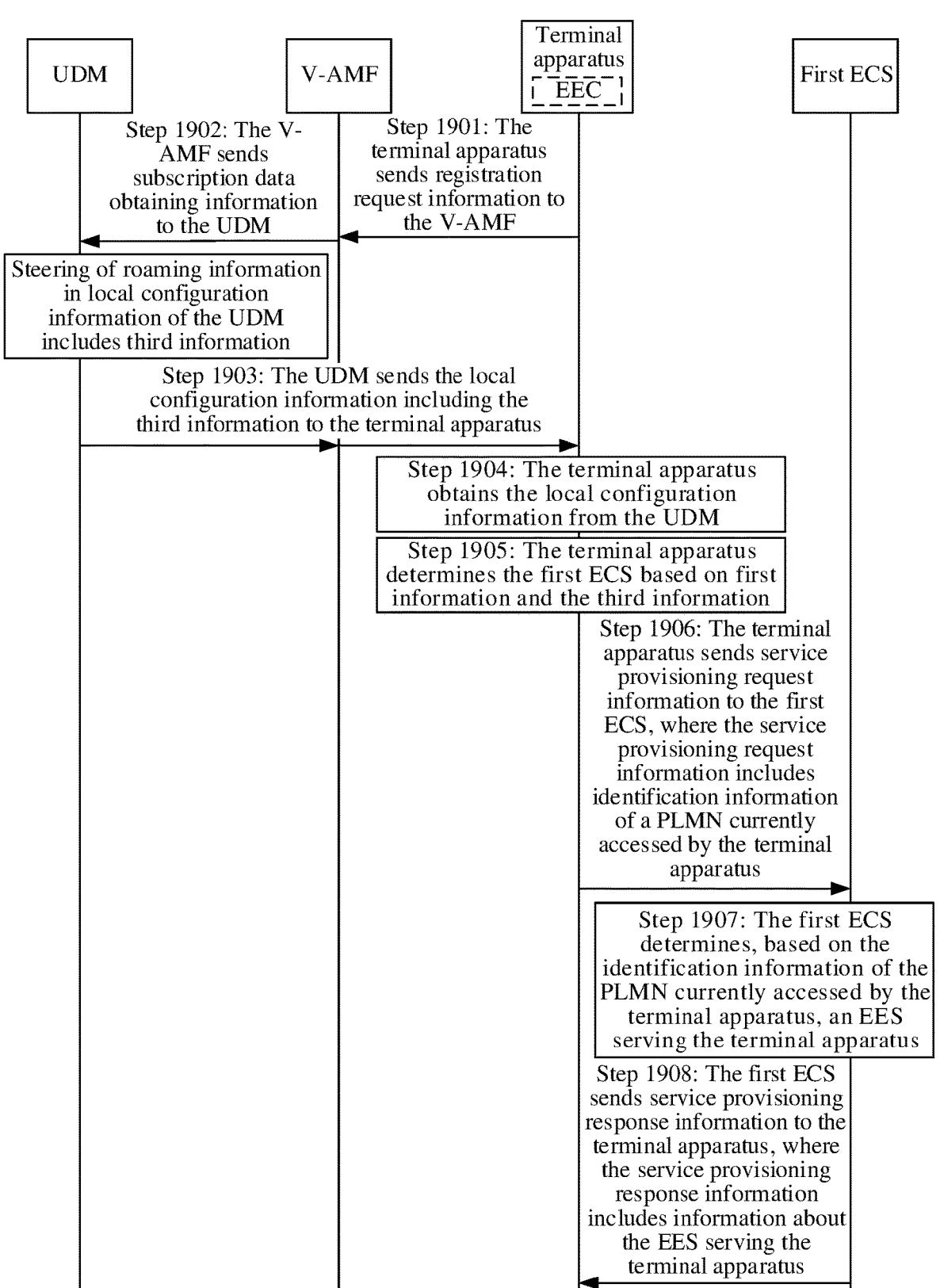
FIG. 19 is a schematic diagram 7 of a method for determining an edge configuration server according to an embodiment of this application.

FIG. 19 is a flowchart of a method for determining an edge configuration server by a terminal apparatus in a process in which the terminal apparatus registers with a network. Refer to FIG. 19. The method for determining an edge configuration server provided in this embodiment of this application includes step 1901 to step 1908.

Step 1901: The terminal apparatus sends registration request information to a V-AMF.

Specifically, the terminal apparatus sends the registration request information to the V-AMF via an access network device (R)AN.

Step 1902: The V-AMF sends subscription data obtaining information to a UDM (for example, sends the subscription data obtaining information to the UDM by using Nudm_SDM_Get).

The subscription data obtaining information is used to obtain subscription information and steering of roaming (SoR) information of the terminal apparatus from the UDM. If the V-AMF already has the subscription information of the terminal apparatus, the subscription data obtaining information is used to obtain the steering of roaming information of the terminal apparatus from the UDM.

It should be understood that the UDM stores the subscription information of the terminal apparatus and the steering of roaming information of the terminal apparatus. In this embodiment of this application, the steering of roaming information includes address information of an edge configuration server that supports serving the terminal apparatus and identification information of a PLMN (namely, a PLMN in the list of preferred PLMNs) corresponding to the address information. That is, the steering of roaming information includes third information. For detailed descriptions of the steering of roaming information, refer to the descriptions in the foregoing embodiment.

Step 1903: The UDM sends local configuration information including the third information to the terminal apparatus.

Step 1904: The terminal apparatus obtains the local configuration information from the UDM.

It should be understood that the third information is from the steering of roaming information in the local configuration information of the UDM. Specifically, the UDM sends the third information to the terminal apparatus via the AMF.

It should be noted that content of the third information is the same as content of the second information in the foregoing embodiment.

Step 1905: The terminal apparatus determines a first ECS based on first information and the third information.

It should be noted that, in the process in which the terminal apparatus registers with the network, the first information may further include home operator information of the terminal apparatus.

For a specific method for determining the first ECS by the terminal apparatus based on the first information and the third information, refer to the related descriptions of step 1802 in the foregoing embodiment. Details are not described herein again.

Step 1906: The terminal apparatus sends service provisioning request information to the first ECS, where the service provisioning request information includes identification information of a PLMN currently accessed by the terminal apparatus.

Optionally, the service provisioning request information further includes a data network identifier (a DNAI or an SSID) of the terminal apparatus.

For the descriptions of information elements carried in the service provisioning request information, refer to content in Table 6. Details are not described herein again.

Step 1907: The first ECS determines, based on the identification information of the PLMN currently accessed by the terminal apparatus, an EES serving the terminal apparatus.

Step 1908: The first ECS sends service provisioning response information to the terminal apparatus, where the service provisioning response information includes information about the EES serving the terminal apparatus.

For the descriptions of information elements carried in the service provisioning response information, refer to content in Table 7. Details are not described herein again. For related descriptions of step 1803 to step 1803, refer to the descriptions of step 1204 to step 1206 in the foregoing embodiment. Details are not described herein again.

Figure 20:
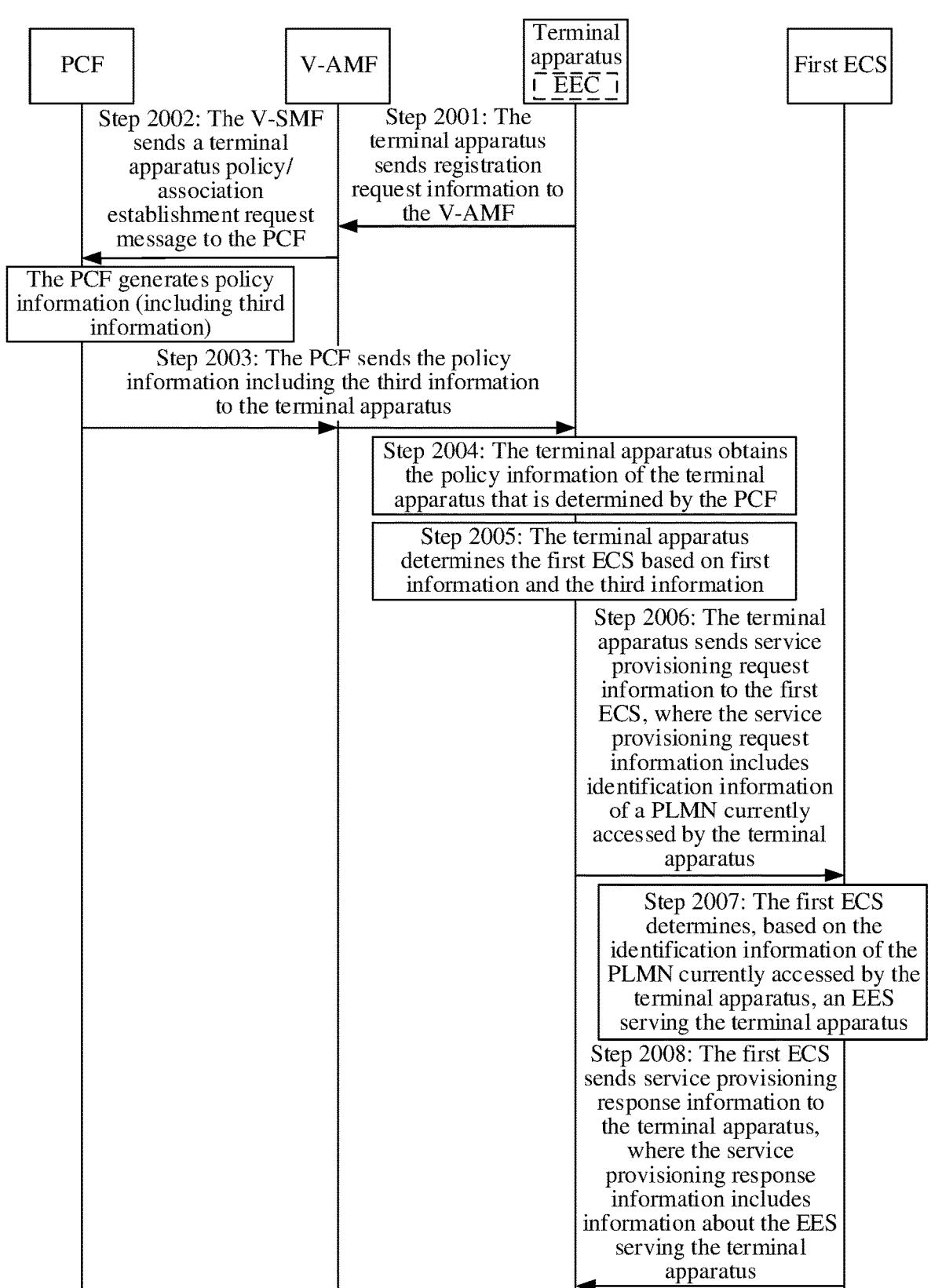
FIG. 20 is a schematic diagram 8 of a method for determining an edge configuration server according to an embodiment of this application.

FIG. 20 is a flowchart of another embodiment of a method for determining an edge configuration server by a terminal apparatus in a process in which the terminal apparatus registers with a network. Refer to FIG. 20. The method for determining an edge configuration server provided in this embodiment of this application includes step 2001 to step 2008.

Step 2001: The terminal apparatus sends registration request information to a V-AMF.

Specifically, the terminal apparatus sends the registration request information to the V-AMF via an access network device (R)AN.

Step 2002: The V-AMF sends terminal apparatus policy/association establishment request information to a PCF (for example, sends the terminal apparatus policy/association establishment request information to the PCF by using a UE Policy/Association Establishment Request).

It should be understood that the policy/association establishment request information carries policy container information of the terminal apparatus, and the policy/association establishment request information is used to obtain policy information from the PCF. The policy container information in the policy/association establishment request information indicates that the terminal apparatus supports an access network discovery and selection policy (ANDSP) or the terminal apparatus supports a route selection policy (URSP). The ANDSP is used by the terminal apparatus to select a non-3GPP access network, and the URSP is used by the terminal apparatus to determine whether a detected application can be associated with an established session. For example, traffic may be routed to the established session, or the traffic may be split to a non-3GPP session, or establishment of a new session may be triggered.

Optionally, the PCF in step 2002 may be a PCF in a VPLMN: a V-PCF, or may be a PCF in an HPLMN: an H-PCF.

Step 2003: The PCF sends the policy information including third information to the terminal apparatus.

Specifically, the PCF sends the policy information including the third information to the terminal apparatus via the V-AMF.

In this embodiment of this application, the PCF may determine (generate) the third information. Specifically, the PCF obtains subscription information from a UDR, and the PCF generates the policy information: the ANDSP or the URSP, based on the subscription information. The ANDSP or the URSP includes address information of an edge configuration server that supports serving the terminal apparatus and identification information of a PLMN corresponding to the address information. That is, the ANDSP or the URSP includes the third information.

It should be noted that content of the third information is the same as content of the second information in the foregoing embodiment.

Step 2004: The terminal apparatus obtains the policy information of the terminal apparatus that is determined by the PCF.

It should be understood that the policy information (namely, the ANDSP or the URSP) of the terminal apparatus includes the third information.

Step 2005: The terminal apparatus determines a first ECS based on the first information and the third information.

It should be noted that, in the process in which terminal apparatus registers with the network, the first information may further include home operator information of the terminal apparatus.

Similarly, for a specific method for determining the first ECS by the terminal apparatus based on the first information and the third information, refer to the related descriptions of step 1802 in the foregoing embodiment. Details are not described herein again.

Step 2006: The terminal apparatus sends service provisioning request information to the first ECS, where the service provisioning request information includes identification information of a PLMN currently accessed by the terminal apparatus.

Optionally, the service provisioning request information further includes a data network identifier (a DNAI or an SSID) of the terminal apparatus.

For the descriptions of information elements carried in the service provisioning request information, refer to content in Table 6. Details are not described herein again.

Step 2007: The first ECS determines, based on the identification information of the PLMN currently accessed by the terminal apparatus, an EES serving the terminal apparatus.

Step 2008: The first ECS sends service provisioning response information to the terminal apparatus, where the service provisioning response information includes information about the EES serving the terminal apparatus.

For the descriptions of information elements carried in the service provisioning response information, refer to content in Table 7. Details are not described herein again. For related descriptions of step 2006 to step 2008, refer to the descriptions of step 1204 to step 1206 in the foregoing embodiment. Details are not described herein again.

Figure 21A:
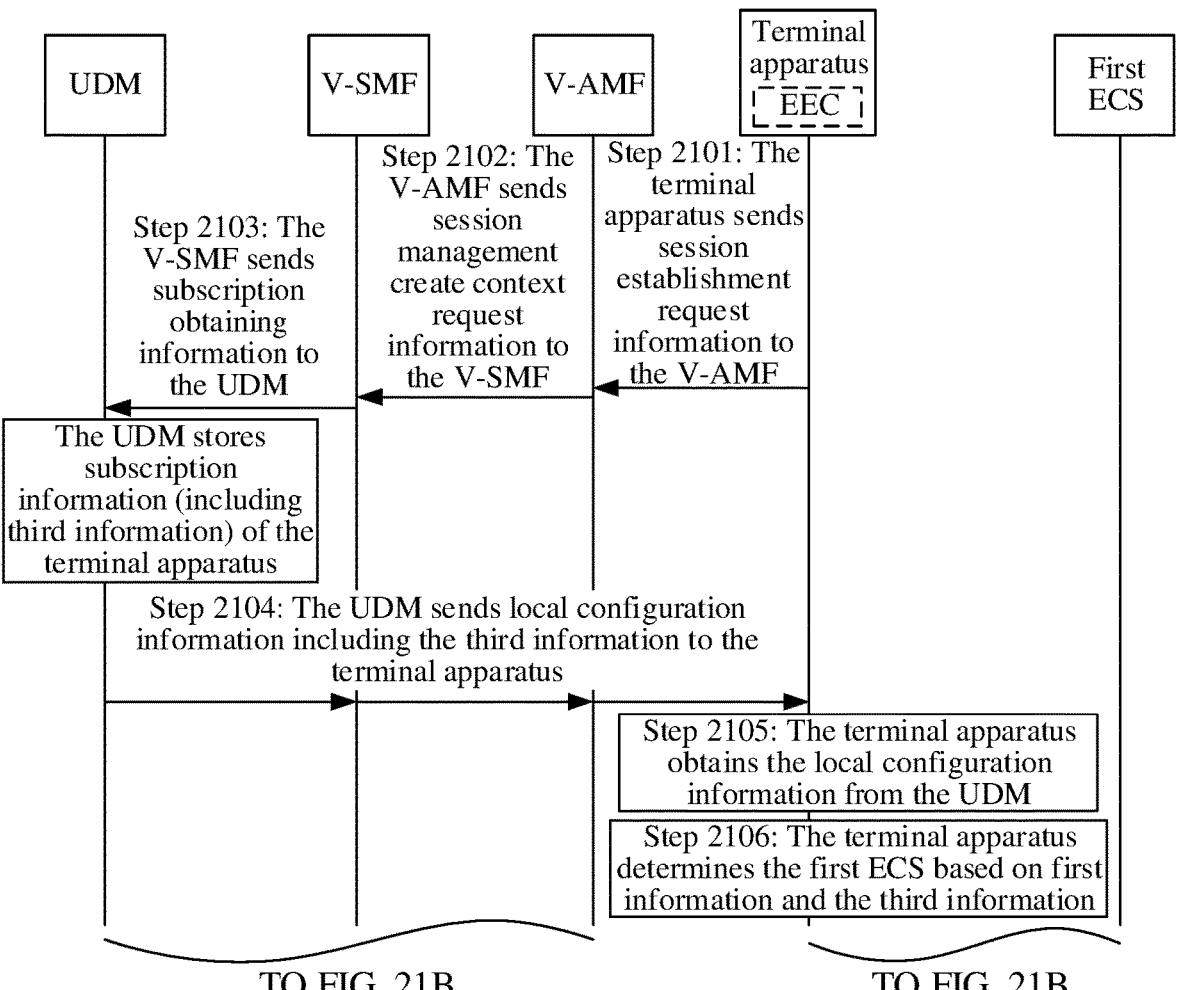

FIG. 21A and FIG. 21B are a flowchart of a method for determining an edge configuration server by a terminal apparatus in a process in which the terminal apparatus establishes a session with a network. Refer to FIG. 21A and FIG. 21B. The method for determining an edge configuration server provided in this embodiment of this application includes step 2101 to step 2109.

Step 2101: The terminal apparatus sends session establishment request information to a V-AMF.

Specifically, the terminal apparatus sends the session establishment request by using NAS information. The NAS information further includes network slice information (S-NSSAI(s)), a DNN requested by the terminal apparatus, an ID of a PDU session, a request type, an ID of an old PDU session, and the like.

Optionally, the NAS information may include service indication information of the terminal apparatus, for example, service type indication information and/or service quality indication information. The service type indication information indicates a current service type of the terminal apparatus, for example, a video service, an internet of vehicles service, or a game service. The service quality indication information indicates a requirement of service quality of the terminal apparatus. For example, the service quality indication information indicates QoS information of a service of the terminal apparatus.

Step 2102: The V-AMF sends session management create context request information to a V-SMF (for example, sends the session management create context request information to the V-SMF by using Nsmf_PDUSession_CreateSMContext Request).

In this embodiment of this application, after the V-AMF selects a proper V-SMF based on the network slice information, the DNN, and the like, the V-AMF sends the session management context create context request information to the V-SMF.

Step 2103: The V-SMF sends subscription obtaining information to a UDM.

The V-SMF sends the subscription obtaining information to the UDM, to obtain subscription information of the terminal apparatus from the UDM.

Step 2104: The UDM sends local configuration information including third information to the terminal apparatus.

Step 2105: The terminal apparatus obtains the local configuration information from the UDM.

It should be understood that the third information is from the subscription information of the terminal apparatus in the local configuration information of the UDM. Specifically, the UDM sends the third information to the terminal apparatus sequentially via the V-SMF and the V-AMF.

It should be noted that, after the V-SMF and the V-AMF receive the third information sent from the UDM, in a case in which the V-SMF and the V-AMF do not update content of the third information, the content of the third information is the same as content of the second information in the foregoing embodiment.

Optionally, in this embodiment of this application, the V-SMF may further include, in the third information, address information of an ECS that is determined by the V-SMF and that supports serving the terminal apparatus and identification information (referred to as fourth information) of a PLMN corresponding to the address information, and send the third information to the terminal apparatus via the V-AMF. The V-SMF includes the fourth information in the third information as a supplement to the third information, to avoid missing of an ECS when the third information cannot cover all ECSs that support serving the terminal apparatus.

Optionally, the V-SMF may send, to the terminal apparatus, a DNAI corresponding to a cell (cell ID) currently accessed by the terminal apparatus.

Step 2106: The terminal apparatus determines a first ECS based on first information and the third information.

It should be noted that, in the process in which the terminal apparatus establishes the session with the network, the first information may further include at least one of the service indication information of the terminal apparatus and home operator information of the terminal apparatus.

Similarly, for a specific method for determining the first ECS by the terminal apparatus based on the first information and the third information, refer to the related descriptions of step 1802 in the foregoing embodiment. Details are not described herein again.

Step 2107: The terminal apparatus sends service provisioning request information to the first ECS, where the service provisioning request information includes identification information of a PLMN currently accessed by the terminal apparatus.

Optionally, the service provisioning request information further includes a data network identifier (a DNAI or an SSID) of the terminal apparatus, where the DNAI may be the DNAI that is received by the terminal apparatus from the V-SMF and that is corresponding to the cell currently accessed by the terminal apparatus.

For the descriptions of information elements carried in the service provisioning request information, refer to content in Table 6. Details are not described herein again.

Step 2108: The first ECS determines, based on the identification information of the PLMN currently accessed by the terminal apparatus, an EES serving the terminal apparatus.

Optionally, the first ECS may alternatively determine, based on the location information of the terminal apparatus (for example, based on the cell ID and/or TAI of the terminal apparatus), the identification information of the PLMN currently accessed by the terminal apparatus, and the data network identifier (for example, the SSID or the DNAI) of the terminal apparatus, the EES serving the terminal apparatus.

Step 2109: The first ECS sends service provisioning response information to the terminal apparatus, where the service provisioning response information includes information about the EES serving the terminal apparatus.

For the descriptions of information elements carried in the service provisioning response information, refer to content in Table 7. Details are not described herein again.

For related descriptions of step 2107 to step 2109, refer to the descriptions of step 1204 to step 1206 in the foregoing embodiment. Details are not described herein again.

Correspondingly, an embodiment of this application provides a core network element. The core network element is configured to perform steps in the foregoing method for determining an edge configuration server. In this embodiment of this application, the core network element may be divided into functional modules based on the foregoing method example. For example, functional modules may be obtained through division based on corresponding functions, or two or more functions may be integrated into one processing module. The integrated module may be implemented in a form of hardware, or may be implemented in a form of a software functional module. In this embodiment of this application, the module division is an example, and is merely a logical function division. During actual implementation, another division manner may be used.

Figure 22:
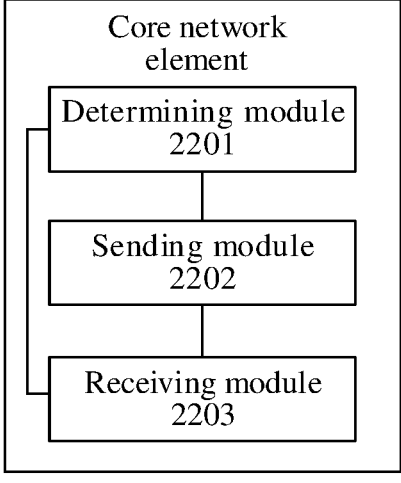
FIG. 22 is a schematic diagram 1 of a structure of a core network element according to an embodiment of this application.

When functional modules are obtained through division based on a corresponding function, FIG. 22 shows a schematic diagram of a possible structure of the core network element in the foregoing embodiment. As shown in FIG. 22, the core network element includes a determining module 2201 and a sending module 2202.

The determining module 2201 is configured to determine a first edge configuration server based on first information and second information. The first information includes identification information of a PLMN currently accessed by a terminal apparatus, and the second information includes address information of an edge configuration server that supports serving the terminal apparatus and identification information of a PLMN corresponding to the address information. For example, the determining module 2201 performs step 1201 (including step 1201*a*, step 1201*b*, or step 1201*c*), step 1403, step 1503, step 1604, and step 1705 in the foregoing method embodiments.

The sending module 2202 is configured to send address information of the first edge configuration server to the terminal apparatus, for example, perform step 1202, step 1404, step 1504, step 1605, and step 1706 in the foregoing method embodiments.

Optionally, when the core network element is a session management function network element, the core network element provided in this embodiment of this application further includes a receiving module 2203. The receiving module 2203 is configured to receive the second information from a unified data management function network element.

Optionally, the sending module 2202 is further configured to send, to the terminal apparatus, identification information of a PLMN corresponding to the address information of the first edge configuration server.

The modules of the core network element may be further configured to perform other actions in the foregoing method embodiments. All related content of steps in the foregoing method embodiments may be cited in function descriptions of corresponding functional modules. Details are not described herein again.

Figure 23:
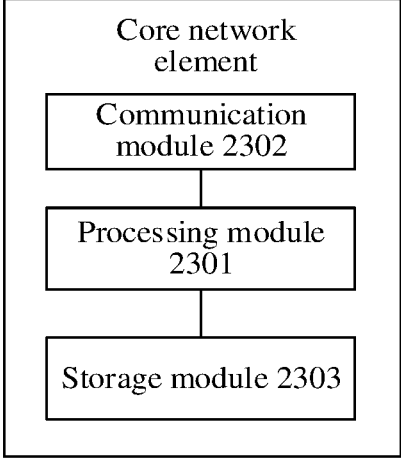
FIG. 23 is a schematic diagram 2 of a structure of a core network element according to an embodiment of this application.

When an integrated unit is used, a schematic diagram of a structure of the core network element provided in this embodiment of this application is shown in FIG. 23. In FIG. 23, the core network element includes a processing module 2301 and a communication module 2302. The processing module 2301 is configured to control and manage actions of the core network element, for example, perform steps performed by the determining module 2201, and/or is configured to perform other processes of the technologies described in this specification. The communication module 2302 is configured to support interaction between the core network element and another device, for example, perform steps of the sending module 2202 and the receiving module 2203. As shown in FIG. 23, the core network element may further include a storage module 2303. The storage module 2303 is configured to store program code and related data of the core network element.

The processing module 2301 may be a processor or a controller, for example, the processor 301 in FIG. 3. The communication module 2302 may be a transceiver, an RF circuit, a communication interface, or the like, for example, the network interface 303 in FIG. 3. The storage module 2303 may be a memory, for example, the memory 302 in FIG. 3.

Correspondingly, an embodiment of this application provides a terminal apparatus. The terminal apparatus is configured to perform steps in the foregoing method for determining an edge configuration server. In this embodiment of this application, the terminal apparatus may be divided into functional modules based on the foregoing method example. For example, functional modules may be obtained through division based on corresponding functions, or two or more functions may be integrated into one processing module. The integrated module may be implemented in a form of hardware, or may be implemented in a form of a software functional module. In this embodiment of this application, the module division is an example, and is merely a logical function division. During actual implementation, another division manner may be used.

Figure 24:
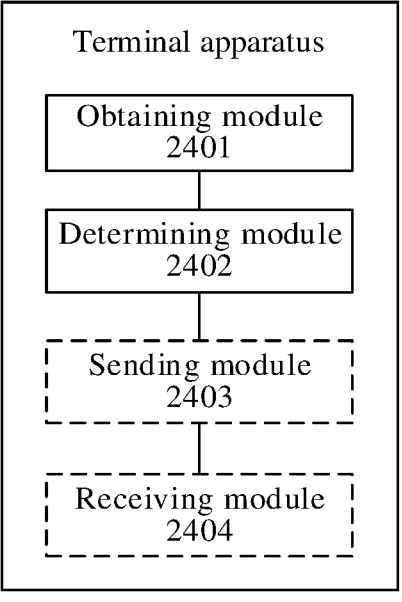
FIG. 24 is a schematic diagram 1 of a structure of a terminal apparatus according to an embodiment of this application.

When the functional modules are obtained through division based on the corresponding functions, FIG. 24 shows a schematic diagram of a possible structure of the terminal apparatus in the foregoing embodiment. As shown in FIG. 24, the terminal apparatus includes an obtaining module 2401 and a determining module 2402.

The obtaining module 2401 is configured to obtain third information, where the third information includes address information of an edge configuration server that supports serving the terminal apparatus and identification information of a public land mobile network PLMN corresponding to the address information, for example, perform step 1801, step 1904, step 2004, and step 2105 in the foregoing method embodiments.

The determining module 2402 is configured to determine a first edge configuration server based on first information and the third information, where the first information includes identification information of a PLMN currently accessed by the terminal apparatus, for example, perform step 1802 (including step 1802a, step 1802b, or step 1802c), step 1905, step 2005, and step 2106 in the foregoing method embodiments.

Optionally, the terminal apparatus provided in this embodiment of this application further includes a sending module 2403 and a receiving module 2404. The sending module 2403 is configured to send the service provisioning request information to the first edge configuration server, for example, perform step 1204, step 1406, step 1506, step 1607, step 1708, step 1803, step 1906, step 2006, and step 2107 in the foregoing method embodiments. The receiving module 2404 is configured to receive service provisioning response information from the first edge configuration server.

Optionally, the receiving module 2404 may further perform step 1405, step 1505, step 1606, and step 1707 in the foregoing method embodiments.

The modules of the terminal apparatus may be further configured to perform other actions in the foregoing method embodiments. All related content of steps in the foregoing method embodiments may be cited in function descriptions of corresponding functional modules. Details are not described herein again.

Figure 25:
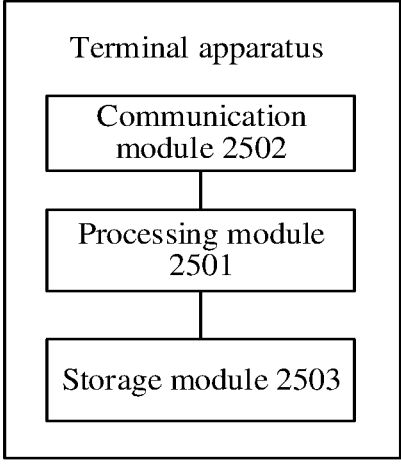
FIG. 25 is a schematic diagram 2 of a structure of a terminal apparatus according to an embodiment of this application.

When an integrated unit is used, a schematic diagram of a structure of the terminal apparatus provided in this embodiment of this application is shown in FIG. 25. In FIG. 25, the terminal apparatus includes a processing module 2501 and a communication module 2502. The processing module 2501 is configured to control and manage actions of the terminal apparatus, for example, perform steps performed by the obtaining module 2401 and the determining module 2402, and/or is configured to perform other processes of the technologies described in this specification. The communication module 2502 is configured to support interaction between the terminal apparatus and another device, for example, perform steps of the sending module 2403 and the receiving module 2404. As shown in FIG. 25, the terminal apparatus may further include a storage module 2503. The storage module 2503 is configured to store program code and the like of the terminal apparatus.

The processing module 2501 may be a processor or a controller, for example, the processor 410 in FIG. 4. The communication module 2502 may be a transceiver, an RF circuit, a communication interface, or the like, for example, the mobile communication module 450 or the wireless communication module 460 in FIG. 4. The storage module 2503 may be a memory, for example, the internal memory 421 or the external memory 420 in FIG. 4.

Correspondingly, an embodiment of this application provides an edge configuration server. The edge configuration server is configured to perform steps in the foregoing method for determining an edge enabler server. In this embodiment of this application, the edge configuration server may be divided into functional modules based on the foregoing method example. For example, functional modules may be obtained through division based on corresponding functions, or two or more functions may be integrated into one processing module. The integrated module may be implemented in a form of hardware, or may be implemented in a form of a software functional module. In this embodiment of this application, the module division is an example, and is merely a logical function division. During actual implementation, another division manner may be used.

Figure 26:
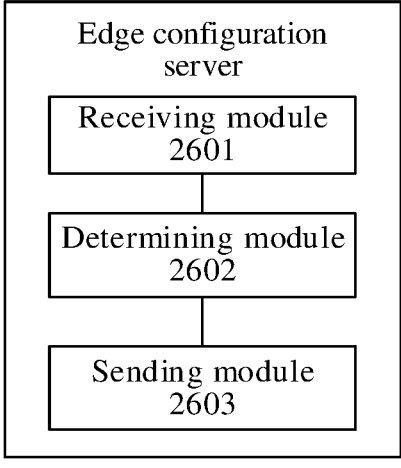
FIG. 26 is a schematic diagram 1 of a structure of an edge configuration server according to an embodiment of this application.

When the functional modules are obtained through division based on the corresponding functions, FIG. 26 shows a schematic diagram of a possible structure of the edge configuration server in the foregoing embodiment. As shown in FIG. 26, the edge configuration server includes a receiving module 2601, a determining module 2602, and a sending module 2603.

The receiving module 2601 is configured to receive service provisioning request information sent by a terminal apparatus, where the service provisioning request information includes at least identification information of a PLMN currently accessed by the terminal apparatus.

The determining module 2602 is configured to determine, based on the identification information of the PLMN currently accessed by the terminal apparatus, an edge enabler server serving the terminal apparatus, for example, perform step 1205, step 1407, step 1507, step 1608, step 1609, step 1709, step 1804, step 1907, step 2007, and step 2108 in the foregoing method embodiments.

The sending module 2603 is configured to send service provisioning response information to the terminal apparatus, where the service provisioning response information includes information about the edge enabler server serving the terminal apparatus, for example, perform step 1206, step 1408, step 1508, step 1710, step 1805, step 1908, step 2008, and step 2109 in the foregoing method embodiments.

The modules of the edge configuration server may be further configured to perform other actions in the foregoing method embodiments. All related content of steps in the foregoing method embodiments may be cited in function descriptions of corresponding functional modules. Details are not described herein again.

Figure 27:
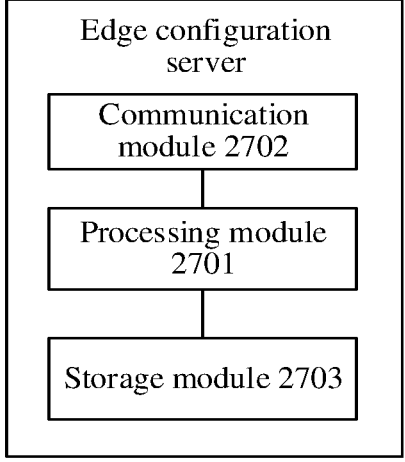
FIG. 27 is a schematic diagram 2 of a structure of an edge configuration server according to an embodiment of this application.

When an integrated unit is used, a schematic diagram of a structure of the edge configuration server provided in this embodiment of this application is shown in FIG. 27. In FIG. 27, the edge configuration server includes a processing module 2701 and a communication module 2702. The processing module 2701 is configured to control and manage actions of the edge configuration server, for example, perform steps performed by the determining module 2602, and/or is configured to perform other processes of the technologies described in this specification. The communication module 2702 is configured to support interaction between the edge configuration server and another device, for example, perform steps of the receiving module 2601 and the receiving module 2603. As shown in FIG. 27, the edge configuration server may further include a storage module 2703. The storage module 2703 is configured to store program code and the like of the edge configuration server.

All or some of the foregoing embodiments may be implemented by using software, hardware, firmware, or any combination thereof. When a software program is used to implement embodiments, all or some of the embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

The foregoing descriptions about the implementations allow a person skilled in the art to understand that, for the purpose of convenient and brief description, the foregoing functional module divisions are used as examples for illustration. During actual application, the foregoing functions may be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiments described above are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the existing technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining an edge configuration server, comprising:

determining, by a core network element based on edge configuration server information and a mobile network accessed by a terminal apparatus, a first edge configuration server serving the terminal apparatus, wherein at least one mobile network corresponding to the first edge configuration server comprises the mobile network accessed by the terminal apparatus; and sending, by the core network element to the terminal apparatus, information indicating the first edge configuration server;

wherein the core network element is a policy control function network element or a unified data management function network element, the core network element stores the edge configuration server information, and the edge configuration server information comprises identification information of the first edge configuration server and identification information of the at least one mobile network corresponding to the first edge configuration server.

2. The method according to claim 1, wherein the determining, by the core network element based on the mobile network accessed by the terminal apparatus, that the edge configuration server serving the terminal apparatus is the first edge configuration server comprises:

determining, by the core network element based on the mobile network accessed by the terminal apparatus and a home operator of the terminal apparatus, that the edge configuration server serving the terminal apparatus is the first edge configuration server, wherein the at least one mobile network corresponding to the first edge configuration server comprises the mobile network accessed by the terminal apparatus, and a home operator of the first edge configuration server is the home operator of the terminal apparatus.

3. The method according to claim 1, wherein the determining, by the core network element based on the mobile network accessed by the terminal apparatus, that the edge configuration server serving the terminal apparatus is the first edge configuration server comprises:

determining, by the core network element based on the mobile network accessed by the terminal apparatus and service indication information of the terminal apparatus, that the edge configuration server serving the terminal apparatus is the first edge configuration server, wherein the at least one mobile network corresponding to the first edge configuration server comprises the mobile network accessed by the terminal apparatus, and the first edge configuration server supports a requirement of a service type or service quality indicated by the service indication information.

4. A method for determining an edge configuration server, wherein the method comprises:

receiving, by a terminal apparatus from a core network element, one or more pieces of edge configuration server information wherein each piece of edge configuration server information comprises identification information of an edge configuration server and identification information of a public land mobile network (PLMN), and the identification information of the edge configuration server corresponds to the identification information of the PLMN;

wherein the core network element is a policy control function network element or a unified data management function network element; and determining, by the terminal apparatus based on the one or more pieces of edge configuration server information and identification information of a current PLMN accessed by the terminal apparatus, a first edge configuration server that corresponds to the identification information of the current PLMN and serves the terminal apparatus.

5. The method according to claim 4, wherein the method further comprises:

sending, by the terminal apparatus, service provisioning request information to the first edge configuration server, wherein the service provisioning request information comprises identification information of the mobile network accessed by the terminal apparatus; and receiving, by the terminal apparatus from the first edge configuration server, service provisioning response information in response to the service provisioning request information, wherein the service provisioning response information comprises information about a target edge enabler server, and the target edge enabler server is an edge enabler server in the mobile network accessed by the terminal apparatus.

6. The method according to claim 4, wherein the one or more pieces of edge configuration server information comprises a plurality of pieces of edge configuration server information corresponding to different edge configuration server providers, wherein each piece of edge configuration server information comprises a provider identifier, and the first edge configuration server is further determined based on the provider identifier in each piece of edge configuration server information.

7. The method according to claim 4, wherein at least one piece of edge configuration server information is received from a core network element that is a unified data management function network element.

8. The method according to claim 4, wherein at least one piece of edge configuration server information is received from a core network element that is a session management function network element.

9. The method according to claim 4, wherein the first edge configuration server is further determined based on home operator information of the terminal apparatus such that the first edge configuration server corresponds to a home operator of the terminal apparatus and the current PLMN accessed by the terminal apparatus.

10. The method according to claim 4, the method further comprising:

storing, by the terminal apparatus based on the one or more pieces of edge configuration server information, a mapping relation between address information of one or more edge configuration servers and one or more PLMNs, wherein in the mapping relationship, address information of an edge configuration server corresponds to address information of a visited PLMN and address information of a home PLMN.

11. A core network element, comprising a processor and a memory coupled to the processor, wherein the memory is configured to store computer instructions, and when the core network element runs, the processor executes the computer instructions stored in the memory, to perform the following operations:

determining, based on edge configuration server information and a mobile network accessed by a terminal apparatus, a first edge configuration server serving the terminal apparatus, wherein at least one mobile network corresponding to the first edge configuration server comprises the mobile network accessed by the terminal apparatus; and sending, to the terminal apparatus, information indicating the first edge configuration server;

wherein the core network element is a policy control function network element or a unified data management function network element, the core network element stores the edge configuration server information, and the edge configuration server information comprises identification information of the first edge configuration server and identification information of the at least one mobile network corresponding to the first edge configuration server.

12. The core network element according to claim 11, wherein the determining, based on the mobile network accessed by the terminal apparatus, that the edge configuration server serving the terminal apparatus is the first edge configuration server comprises:

determining, based on the mobile network accessed by the terminal apparatus and a home operator of the terminal apparatus, that the edge configuration server serving the terminal apparatus is the first edge configuration server, wherein the at least one mobile network corresponding to the first edge configuration server comprises the mobile network accessed by the terminal apparatus, and a home operator of the first edge configuration server is the home operator of the terminal apparatus.

13. He core network element according to claim 11, where in the determining, based on the mobile network accessed by the terminal apparatus, that the edge configuration server serving the terminal apparatus is the first edge configuration server comprises:

determining, based on the mobile network accessed by the terminal apparatus and service indication information of the terminal apparatus, that the edge configuration server serving the terminal apparatus is the first edge configuration server, wherein the at least one mobile network corresponding to the first edge configuration server comprises the mobile network accessed by the terminal apparatus, and the first edge configuration server supports a requirement of a service type or service quality indicated by the service indication information.

14. An apparatus, comprising:

a processor; and a memory storing a program code for execution by the processor, the program code comprising instructions for:

Receiving, from a core network element, one or more pieces of edge configuration server information that each comprises identification information of an edge configuration server and identification information of a public land mobile network (PLMN), wherein the identification information of the edge configuration server corresponds to the identification information of the PLMN;

wherein the core network element is a policy control function network element or a unified data management function network element; and determining, based on the one or more pieces of edge configuration server information and identification information of a current PLMN accessed by the apparatus, a first edge configuration server that corresponds to the identification information of the current PLMN and serves the apparatus.

15. The apparatus according to claim 14, wherein the one or more pieces of edge configuration servicer information comprises a plurality of pieces of edge configuration server information corresponding to different edge configuration server providers, wherein each piece of edge configuration server information comprises a provider identifier, and the first edge configuration server is further determined based on the provider identifier in each piece of edge configuration server information.

* * * * *